(12) United States Patent
Bian

(10) Patent No.: US 12,474,823 B2
(45) Date of Patent: Nov. 18, 2025

(54) PAGE SLIDING PROCESSING METHOD AND RELATED APPARATUS

(71) Applicant: HUAWEI TECHNOLOGIES CO., LTD., Guangdong (CN)

(72) Inventor: Chao Bian, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 18/266,916

(22) PCT Filed: Dec. 14, 2021

(86) PCT No.: PCT/CN2021/137925
§ 371 (c)(1),
(2) Date: Jun. 13, 2023

(87) PCT Pub. No.: WO2022/127786
PCT Pub. Date: Jun. 23, 2022

(65) Prior Publication Data
US 2024/0111403 A1    Apr. 4, 2024

(30) Foreign Application Priority Data
Dec. 14, 2020    (CN) .......................... 202011468134.8

(51) Int. Cl.
G06F 3/048     (2013.01)
G06F 3/04845   (2022.01)
G06F 3/0488    (2022.01)

(52) U.S. Cl.
CPC ........ G06F 3/04845 (2013.01); G06F 3/0488 (2013.01)

(58) Field of Classification Search
CPC .......................... G06F 3/04845; G06F 3/0488
See application file for complete search history.

(56) References Cited

U.S. PATENT DOCUMENTS

| | | | |
|---|---|---|---|
| 2013/0332892 A1* | 12/2013 | Matsuki ............. | G06F 3/04842 715/863 |
| 2014/0002502 A1* | 1/2014 | Han ......................... | G06T 3/40 345/646 |
| 2016/0357390 A1 | 12/2016 | Federighi et al. | |
| 2018/0336043 A1 | 11/2018 | Walkin et al. | |

FOREIGN PATENT DOCUMENTS

EP    4293488 A1    12/2023

* cited by examiner

*Primary Examiner* — Mahelet Shiberou
(74) *Attorney, Agent, or Firm* — WOMBLE BOND DICKINSON (US) LLP

(57) ABSTRACT

Methods and apparatus for page sliding are disclosed. The method includes detecting a sliding operation for a first module on a first page in a first direction. The method also includes controlling, in a first time period, a first module group to slide in a second direction based on displacement of the sliding operation in the second direction, and controlling, based on displacement of the first module group, a second module group to slide in the second direction based on a first preset motion law, in a second time period after the first time period, the second module group to slide within second displacement based on a second preset motion law, where the first displacement difference decreases at an end moment of the second time period compared with a start moment of the second time period. In this way, linkage performance and interestingness of page sliding are improved.

20 Claims, 48 Drawing Sheets

(a)

(b)

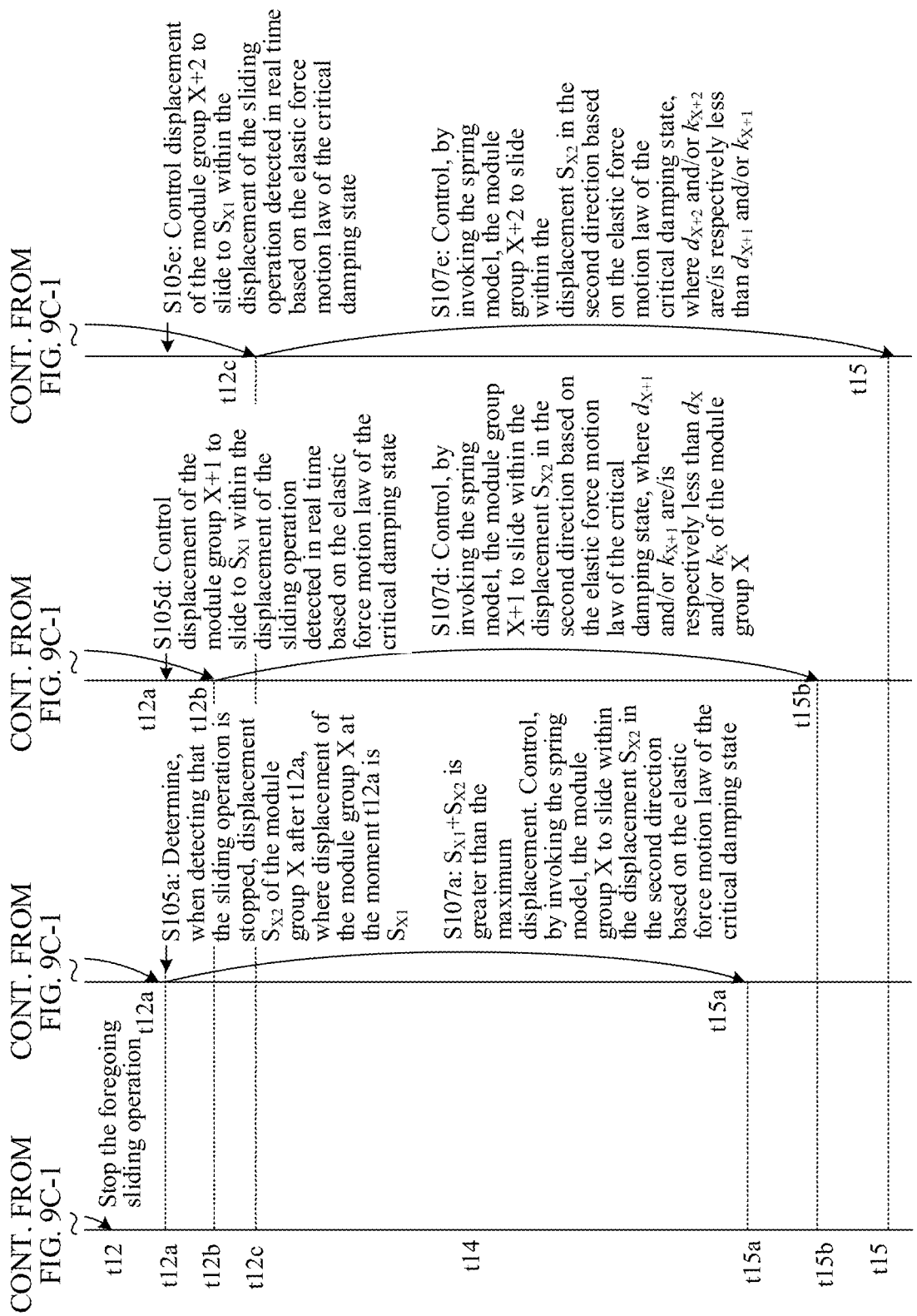

S201: An electronic device detects a sliding operation performed on a first module on a first page in a first direction S202: The electronic device controls, in a first time period in response to the sliding operation, a first module group to slide in a second direction based on detected displacement of the sliding operation in the second direction, and controls, based on displacement of the first module group, a second module group to slide in the second direction based on a first preset motion law, where the first module group includes the first module, the second module group includes at least one module other than the first module group on the first page, the second module group is determined by the electronic device based on a position relationship between a module in the second module group and the first module, and the second direction is determined based on the first direction; and the displacement of the first module group is greater than or equal to displacement of the second module group in the first time period, and a first displacement difference between the first module group and the second module group is greater than zero at an end moment of the first time period S203: Determine, based on first displacement of the first module group at the end moment of the first time period, second displacement of the second module group in the second direction in a second time period after the first time period S204: Control, in the second time period, the second module group to slide within the second displacement based on a second preset motion law, where the first displacement difference decreases at an end moment of the second time period compared with a start moment of the second time period

FIG. 16

PAGE SLIDING PROCESSING METHOD AND RELATED APPARATUS

CROSS-REFERENCE TO RELATED APPLICATION

This application is a national stage of International Application No. PCT/CN2021/137925, filed on Dec. 14, 2021, which claims priority to Chinese Patent Application No. 202011468134.8, filed on Dec. 14, 2020. Both of the aforementioned applications are hereby incorporated by reference in their entireties.

TECHNICAL FIELD

This application relates to the field of electronic technologies, and in particular, to a page sliding processing method and a related apparatus.

BACKGROUND

In a process of using an electronic device, a user often slides a page displayed by the electronic device, to view more page modules (for example, a card, an icon, and a floating window) on the page. Currently, in a page sliding process, all page modules are translated as a whole, resulting in a single page sliding effect, lack of linkage, and poor user experience.

SUMMARY

Embodiments of this application provide a page sliding processing method and a related apparatus, to improve linkage performance and interestingness of page sliding, and effectively improve user experience.

According to a first aspect, this application provides a page sliding processing method, including: An electronic device detects a sliding operation performed on a first module on a first page in a first direction; the electronic device controls, in a first time period in response to the sliding operation, a first module group to slide in a second direction based on detected displacement of the sliding operation in the second direction, and controls, based on displacement of the first module group, a second module group to slide in the second direction based on a first preset motion law, where the first module group includes the first module, the second module group includes at least one module other than the first module group on the first page, the second module group is determined by the electronic device based on a position relationship between a module in the second module group and the first module, and the second direction is determined based on the first direction; and the displacement of the first module group is greater than or equal to displacement of the second module group in the first time period, and a first displacement difference between the first module group and the second module group is greater than zero at an end moment of the first time period; determines, based on first displacement of the first module group at the end moment of the first time period, second displacement of the second module group in the second direction in a second time period after the first time period; and controls, in the second time period, the second module group to slide within the second displacement based on a second preset motion law, where the first displacement difference decreases at an end moment of the second time period compared with a start moment of the second time period.

In this embodiment of this application, after a sliding operation performed by a user on a module on a page is received, each module is controlled to slide in a second direction based on a sliding direction of the user, where an interval between module groups in the second direction is first compressed and then increased, and an interval between module groups in an opposite direction of the second direction is first stretched and then decreased, thereby improving linkage performance and interestingness of page sliding, increasing dynamic feedback on the sliding operation of the user, and effectively improving user experience.

In an embodiment, that the electronic device controls a first module group to slide in a second direction based on detected displacement of the sliding operation in the second direction, and controls, based on displacement of the first module group, a second module group to slide in the second direction based on a first preset motion law includes: The electronic device controls, based on the detected displacement of the sliding operation in the second direction, the first module group to start sliding in the second direction at a start moment of the first time period, and controls, at a moment separated by a first time difference from the start moment of the first time period based on the displacement of the first module group, the second module group to start sliding in the second direction based on the first preset motion law.

In an embodiment, that the electronic device controls a first module group to slide in a second direction based on detected displacement of the sliding operation in the second direction, and controls, based on displacement of the first module group, a second module group to slide in the second direction based on a first preset motion law includes: The electronic device controls, in a first refresh periodicity in the first time period, the first module group to slide by fourth displacement in the second direction based on third displacement of the sliding operation in the second direction in a previous refresh periodicity of the first refresh periodicity; and controls, based on the fourth displacement by which the first module group slides in the previous refresh periodicity, the second module group to slide by fifth displacement based on the first preset motion law, where the fourth displacement is equal to h times the third displacement, h is greater than 0 and less than or equal to 1, and the fifth displacement is less than or equal to the fourth displacement.

In an embodiment, when displacement of the first module group at a start moment of the first refresh periodicity is less than or equal to maximum displacement in the second direction, h is equal to 1; and when the displacement of the first module group at the start moment of the first refresh periodicity is greater than the maximum displacement in the second direction, h is greater than zero and less than 1, where the maximum displacement in the second direction is determined based on a position of a first edge module in an opposite direction of the second direction on the first page at the start moment of the first time period.

In an embodiment, maximum displacement in the first direction is equal to displacement of the first edge module sliding to a first preset position of a display screen of the electronic device in the second direction.

In an embodiment, the determining, based on first displacement of the first module group at the end moment of the first time period, second displacement of the second module group in the second direction in a second time period after the first time period includes: determining sixth displacement of the first module group in the second direction in the second time period based on the sliding operation; and determining that the second displacement is equal to the sixth displacement plus the first displacement minus seventh displacement, where the seventh displacement is displacement of the second module group at the end moment of the first time period, where from the start moment of the first time period to the end moment of the second time period, displacement of the first module group and the second module group in the second direction is equal to the first displacement plus the sixth displacement.

In an embodiment, the method further includes: controlling, in the second time period, the first module group to slide within the sixth displacement based on the second preset motion law.

In an embodiment, the second time period successively includes a third time period and a fourth time period, and the controlling, in the second time period, the second module group to slide within the second displacement based on a second preset motion law specifically includes: controlling, in the third time period, the second module group to slide within eighth displacement based on the first preset motion law, where the eighth displacement is equal to the first displacement minus the seventh displacement; and controlling, in the fourth time period, the second module group to slide within the sixth displacement based on the second preset motion law.

In an embodiment, in the second time period, velocities of the first module group and the second module group in the second direction are greater than or equal to zero, and displacement of the first module group is greater than or equal to displacement of the second module group; the first displacement difference increases from the start moment of the second time period to a first moment of the second time period; the first displacement difference decreases from the first moment to the end moment of the second time period; and the first displacement difference is equal to zero at the end moment of the second time period.

In an embodiment, from the start moment of the second time period to a second moment of the second time period, displacement of the first module group in the second direction is greater than or equal to displacement of the second module group in the second direction, and the first displacement difference first increases and then decreases to zero; and from the second moment to the end moment of the second time period, displacement of the first module group in the second direction is less than or equal to displacement of the second module group in the second direction, and the first displacement difference first increases and then decreases to zero.

In an embodiment, the first module group and the second module group stop sliding after the second time period.

In an embodiment, the first displacement plus the sixth displacement is greater than the maximum displacement, and the method further includes: controlling, in a fifth time period after the second time period, the first module group and the second module group to move by ninth displacement in the opposite direction of the second direction based on the first preset motion law, where in the fifth time period, displacement of the first module group in the second direction is less than displacement of the second module group in the second direction, and the first displacement difference first increases and then decreases to zero; the first module group and the second module group stop sliding after the fifth time period; and the ninth displacement is equal to the first displacement plus the sixth displacement minus the maximum displacement.

In an embodiment, the controlling, in the fifth time period after the second time period, the first module group and the second module group to move by the ninth displacement in the opposite direction of the second direction based on the first preset motion law includes: controlling, at a start moment of the fifth time period, the first module group to start moving by the ninth displacement in the opposite direction of the second direction based on the first preset motion law; and controlling, at a moment separated by a second time difference from the start moment of the fifth time period, the second module group to start moving by the ninth displacement in the opposite direction of the second direction based on the first preset motion law.

In an embodiment, the determining, based on first displacement of the first module group at the end moment of the first time period, second displacement of the second module group in the second direction in a second time period after the first time period includes: determining, based on the first displacement of the first module group at the end moment of the first time period, that the second displacement of the second module group in the second direction in the second time period after the first time period is the first displacement minus the seventh displacement.

In an embodiment, the first module group stops sliding after the first time period, and the second module group stops sliding after the second time period.

In an embodiment, the first displacement is greater than the maximum displacement, and the method further includes: controlling, in a sixth time period after the second time period, the first module group and the second module group to move by tenth displacement in the opposite direction of the second direction based on the first preset motion law, where in the sixth time period, displacement of the first module group in the second direction is less than displacement of the second module group in the second direction, and the first displacement difference first increases and then decreases to zero; and the first module group and the second module group stop sliding after the sixth time period.

In an embodiment, the method further includes: The electronic device controls, in the first time period in response to the sliding operation based on the displacement of the first module group, a third module group to slide in the second direction based on the first preset motion law, where the third module group includes at least one module other than the first module group and the second module group on the first page, and the third module group is determined by the electronic device based on a position relationship between a module in the third module group and the first module; and the displacement of the second module group is greater than or equal to displacement of the third module group in the first time period, and a second displacement difference between the first module group and the second module group is greater than zero at the end moment of the first time period; determines, based on the first displacement of the first module group at the end moment of the first time period, twelfth displacement of the third module group in the second direction in the second time period after the first time period; and controls, in the second time period, the third module group to slide within the twelfth displacement based on the second preset motion law, where the second displacement difference decreases at the end moment of the second time period compared with the start moment of the second time period.

In an embodiment, that the electronic device controls, in the first time period based on the displacement of the first module group, a third module group to slide in the second direction based on the first preset motion law includes: The electronic device controls, in the first time period based on the displacement of the first module group, the third module group to start sliding in the second direction based on the first preset motion law at a moment separated by a third time difference from the start moment of the first time period, where the third time difference is greater than the first time difference.

In an embodiment, that the electronic device controls, in the first time period based on the displacement of the first module group, a third module group to slide in the second direction based on the first preset motion law includes: The electronic device controls, in the first refresh periodicity in the first time period, the first module group to slide by the fourth displacement in the second direction based on the third displacement of the sliding operation in the second direction in the previous refresh periodicity of the first refresh periodicity; and controls, based on the fourth displacement by which the first module group slides in the previous refresh periodicity, the third module group to slide by eleventh displacement based on the first preset motion law, where the fourth displacement is equal to h times the third displacement, h is greater than 0 and less than or equal to 1, and the eleventh displacement is less than or equal to the fifth displacement.

In an embodiment, the determining, based on the first displacement of the first module group at the end moment of the first time period, twelfth displacement of the third module group in the second direction in the second time period after the first time period includes: determining that the twelfth displacement is equal to the sixth displacement plus the first displacement minus thirteenth displacement, where the thirteenth displacement is displacement of the third module group at the end moment of the first time period; and at the end moment of the second time period, displacement of the third module group in the second direction is equal to the first displacement plus the sixth displacement.

In an embodiment, the second time period successively includes a seventh time period and an eighth time period, and the controlling, in the second time period, the third module group to slide within the twelfth displacement based on the second preset motion law specifically includes: controlling, in the seventh time period, the third module group to slide within fourteenth displacement based on the first preset motion law, where the fourteenth displacement is equal to the first displacement minus the thirteenth displacement; and controlling, in the eighth time period, the third module group to slide within the sixth displacement based on the second preset motion law.

In an embodiment, in the second time period, a velocity of the third module group in the second direction is greater than or equal to zero, and displacement of the second module group is greater than or equal to displacement of the third module group; the second displacement difference increases from the start moment of the second time period to a third moment of the second time period; and the second displacement difference decreases from the third moment to the end moment of the second time period.

In an embodiment, from the start moment of the second time period to a fourth moment of the second time period, displacement of the second module group in the second direction is greater than or equal to displacement of the third module group in the second direction, and the second displacement difference first increases and then decreases to zero; and from the fourth moment to the end moment of the second time period, displacement of the second module group in the second direction is less than or equal to displacement of the third module group in the second direction, and the second displacement difference first increases and then decreases to zero.

In an embodiment, the third module group stops sliding after the second time period.

In an embodiment, the first displacement plus the sixth displacement is greater than the maximum displacement, and the method further includes: controlling, in the fifth time period after the second time period, the third module group to move by the ninth displacement in the opposite direction of the second direction based on the first preset motion law, where in the fifth time period, the displacement of the second module group in the second direction is less than displacement of the third module group in the second direction, and the second displacement difference first increases and then decreases to zero; the third module group stops sliding after the fifth time period; and the ninth displacement is equal to the first displacement plus the sixth displacement minus the maximum displacement.

In an embodiment, the controlling, in the fifth time period after the second time period, the third module group to move by the ninth displacement in the opposite direction of the second direction based on the first preset motion law includes: controlling, at a moment separated by a fourth time difference from the start moment of the fifth time period, the third module group to start moving by the ninth displacement in the opposite direction of the second direction based on the first preset motion law, where the fourth time difference is greater than the second time difference.

In an embodiment, the determining, based on the first displacement of the first module group at the end moment of the first time period, twelfth displacement of the third module group in the second direction in the second time period after the first time period includes: determining, based on the first displacement of the first module group at the end moment of the first time period, that the twelfth displacement of the third module group in the second direction in the second time period after the first time period is the first displacement minus the thirteenth displacement.

In an embodiment, the first module group stops sliding after the first time period, the second module group and the third module group stop sliding after the second time period, and a sliding stop moment of the third module group is later than a sliding stop moment of the second module group.

In an embodiment, the first displacement is greater than the maximum displacement, and the method further includes: controlling, in the sixth time period after the second time period, the third module group to move by the tenth displacement in the opposite direction of the second direction based on the first preset motion law, where in the sixth time period, the displacement of the second module group in the second direction is less than displacement of the third module group in the second direction, and the first displacement difference first increases and then decreases to zero; and the third module group stops sliding after the sixth time period.

In an embodiment, sliding stop moments of the first module group and the second module group are same; or a sliding stop moment of the first module group is earlier than a sliding stop moment of the second module group; or a sliding stop moment of the first module group is later than a sliding stop moment of the second module group.

In an embodiment, sliding stop moments of the first module group, the second module group, and the second module group are same; or a sliding stop moment of the first module group is earlier than a sliding stop moment of the second module group, and the sliding stop moment of the second module group is earlier than a sliding stop moment of the third module group; or a sliding stop moment of the first module group is later than a sliding stop moment of the second module group, and the sliding stop moment of the second module group is later than a sliding stop moment of the third module group.

In an embodiment, the determining sixth displacement by which the first module group slides in the first direction in the second time period based on the sliding operation includes: determining the sixth displacement based on at least one of a sliding velocity of the sliding operation, a friction model, and the maximum displacement, where the sliding velocity of the sliding operation is an instantaneous velocity before the sliding operation is stopped, or the sliding velocity of the sliding operation is an average velocity of the sliding operation; a larger sliding velocity of the sliding operation indicates larger sixth displacement; a larger friction coefficient of the friction model indicates smaller sixth displacement; and larger maximum displacement indicates smaller sixth displacement.

In an embodiment, both the first preset motion law and the second preset motion law are elastic force motion laws in a critical damping state; or the first preset motion law is an elastic force motion law in a critical state, and the second preset motion law is an elastic force motion law in an underdamping state, where an elastic force motion law of each module group is determined by an elastic force parameter of the module group.

In an embodiment, the first time difference, the second time difference, the third time difference, and the fourth time difference are greater than zero; and an elastic force parameter of the first module group, an elastic force parameter of the second module group, and an elastic force parameter of the third module group are equal; or an elastic force parameter of the first module group is greater than an elastic force parameter of the second module group, and the elastic force parameter of the second module group is greater than an elastic force parameter of the third module group.

In an embodiment, the first time difference and the second time difference are equal to zero, an elastic force parameter of the first module group is greater than an elastic force parameter of the second module group, and the elastic force parameter of the second module group is greater than an elastic force parameter of the third module group.

In an embodiment, the elastic force parameter of the first module group is greater than the elastic force parameter of the second module group, the elastic force parameter of the second module group is greater than the elastic force parameter of the third module group, and the elastic force parameters of the second module group and the third module group are determined based on the elastic force parameter of the first module group and a conductivity coefficient, where a larger conductivity coefficient indicates a larger elastic force parameter difference between the first module group and the second module group and a larger elastic force parameter difference between the first module and the second module group; and a larger elastic force parameter of the first module group indicates larger elastic force parameters of the first module group and the second module group.

In an embodiment, the elastic force parameter includes a ratio of a stiffness coefficient to a damping coefficient; or the elastic force parameter includes a stiffness coefficient and/or a damping coefficient.

In an embodiment, position distributions of the module in the second module group and the module in the third module group around the first module present a first-type distribution, and the second module group is closer to the first module group than the third module group.

In an embodiment, the first-type distribution includes: a circular distribution, an elliptical distribution, a rectangular distribution, a square distribution, and the like.

In an embodiment, a value of the conductivity coefficient is 0.9.

In an embodiment, a value range of the stiffness coefficient is 150 to 400, and a value range of the damping coefficient is 1 to 99.

In an embodiment, a value of the stiffness coefficient is 228, and a value of the damping coefficient is 30.

In this embodiment of this application, a spring model may be constructed for a module group, to control the module group to simulate an elastic force motion law of a spring, that is, control a change law of displacement of the module group to conform to a change law of a deformation of the spring. In addition, by adjusting an elastic force parameter (namely, a stiffness coefficient and/or a damping coefficient) of each module group and/or a time difference, each module group is controlled to present a different motion trend in an elastic force motion law of a same state, and a dynamic effect in which an interval between module groups in a sliding direction of a user's finger is compressed and then restored to an initial value and a reverse interval between the module groups in an opposite direction of the sliding direction of the user's finger is stretched and then restored to an initial value is created, thereby improving linkage performance of page sliding, and increasing dynamic feedback on a sliding operation of the user.

According to a second aspect, this application provides an electronic device, including one or more processors, a memory, and a display screen, where the memory and the display screen are coupled with the one or more processors, the memory is configured to store computer program code, the computer program code includes computer instructions, and when the one or more processors invoke the computer instructions, the electronic device is enabled to perform any possible embodiment in the first aspect.

According to a third aspect, an embodiment of this application provides a computer storage medium, including computer instructions, where when the computer instructions are run on an electronic device, the electronic device is enabled to perform any possible embodiment in the first aspect.

According to a fourth aspect, an embodiment of this application provides a computer program product, where when the computer program product runs on a computer, the computer is enabled to perform any possible embodiment in the first aspect.

BRIEF DESCRIPTION OF DRAWINGS

FIG. 9B-1 and FIG. 9B-2 and FIG. 9C-1 and FIG. 9C-2 are schematic flowcharts of a non-rebounding page sliding processing method according to an embodiment of this application;

FIG. 9D-1 and FIG. 9D-2 are a schematic flowchart of a cross-boundary rebounding page sliding processing method according to an embodiment of this application;

FIG. 16 is a schematic flowchart of a page sliding processing method according to an embodiment of this application.

DESCRIPTION OF EMBODIMENTS

The following clearly and thoroughly describes technical solutions in embodiments of this application with reference to the accompanying drawings. In the description of embodiments of this application, unless otherwise specified, "I" means "or". For example, A/B may represent A or B. "and/or" in the text is only an association relationship that describes associated objects, and indicates that three relationships may exist. For example, A and/or B may indicate that A exists alone, A and B exist at the same time, and B exists alone. In addition, In the description of embodiments of this application, "a plurality of" means two or more.

In the following, the terms "first" and "second" are only used for description purposes, and cannot be understood as indicating or implying relative importance or implicitly indicating a quantity of indicated technical features. Therefore, a feature defined to be "first" or "second" may explicitly or implicitly include one or more features. In the description of embodiments of this application, unless otherwise stated, "a plurality of" means two or more.

The following describes an electronic device 100 in embodiments of this application.

Figure 1:
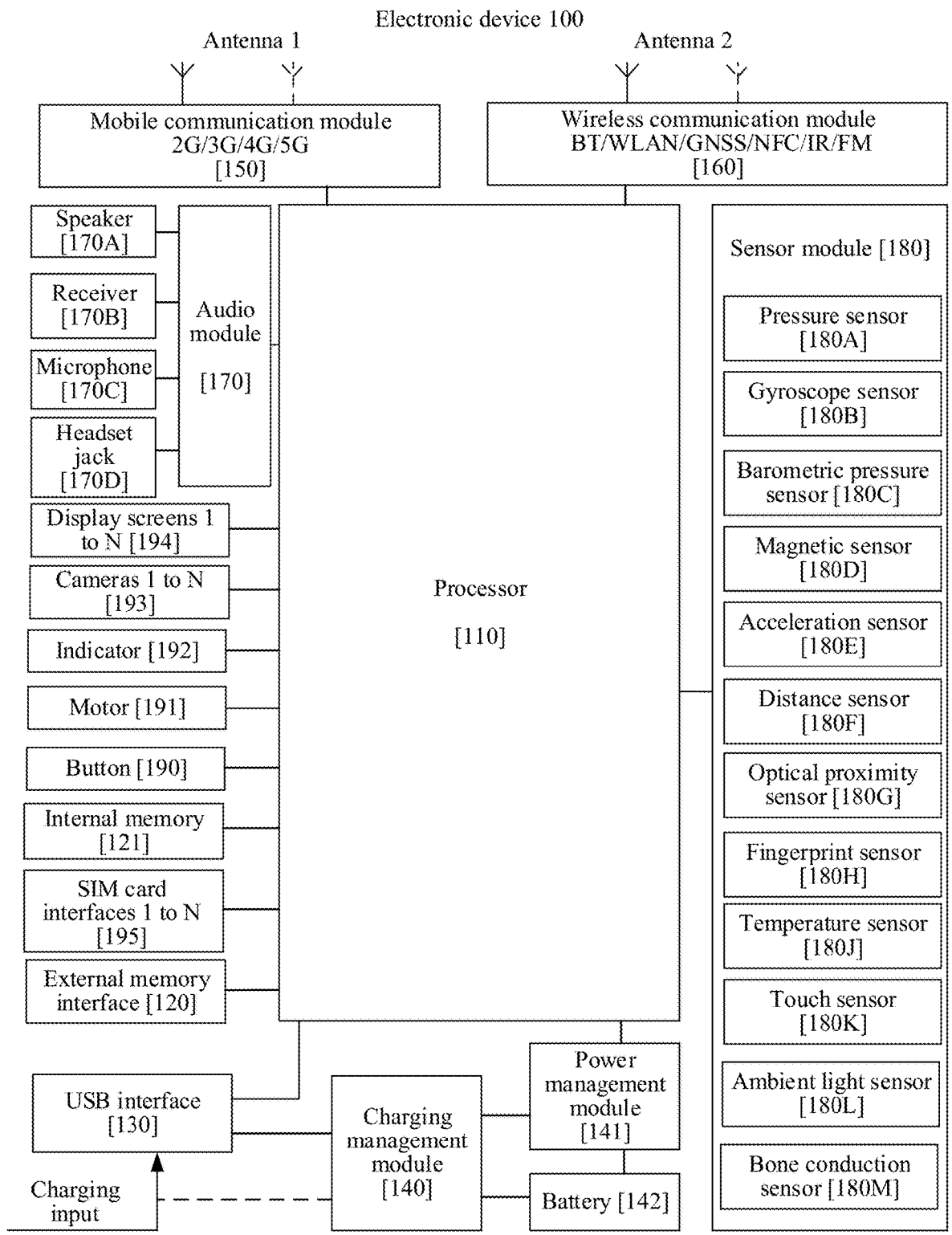
FIG. 1 is a schematic diagram of a structure of an electronic device according to an embodiment of this application.

FIG. 1 is a schematic diagram of a structure of an electronic device 100.

The electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, an in-vehicle device, or a smart home device and/or a smart city device. A specific type of the electronic device is not specifically limited in this embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The controller may generate an operation control signal based on an instruction operation code and a time-sequence signal, to implement control of fetching instructions and executing the instructions.

The processor 110 may be further configured with a memory, to store instructions and data. In some embodiments, the memory in the processor 110 is a cache memory. The memory may store an instruction or data that is just used or used cyclically by the processor 110. If the processor 110 needs to use the instruction or the data again, the processor 110 may directly invoke the instruction or the data from the memory, which avoids repeated access, and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 through the PCM bus interface. In some embodiments, the audio module 170 may alternatively transfer an audio signal to the wireless communication module 160 through the PCM interface, to implement the function of answering a call by using a Bluetooth headset. Both the I2S interface and the PCM interface may be used for audio communication.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through a UART interface, to implement a Bluetooth function. In some embodiments, the audio module 170 may transfer an audio signal to the wireless communication module 160 through a UART interface, to implement a function of playing music by using a Bluetooth headset.

The MIPI interface may be configured to connect the processor 110 to peripheral devices such as the display screen 194 and the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display screen 194 through a DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, or the like.

The USB interface 130 is an interface that conforms to a USB standard specification, and may be specifically a Mini USB interface, a Micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger, or may be a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device 100 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and is then transferred to the application processor. The application processor outputs a sound signal through an audio device (which is not limited to the speaker 170A, the receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another function module.

The wireless communication module 160 may provide a solution for wireless communication including a wireless local area network (WLAN) (such as a wireless fidelity (Wi-Fi) network), Bluetooth (BT), and a global navigation satellite system (GNSS), frequency modulation (FM), a near field communication (NFC) technology, an infrared (IR) technology, and the like to be applied to the electronic device 100. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), and a Beidou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute program instructions to generate or change display information.

The display screen 194 is configured to display an image, a video, or the like. The display screen 194 includes a display panel. The display panel may use a liquid crystal display screen (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the electronic device 100 may include 1 or N display screens 194, and N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may alternatively perform algorithm optimization on noise, luminance, and complexion of the image. The ISP may alternatively optimize parameters such as exposure and a color temperature of a photographing scene. In some embodiments, the ISP may be disposed in the camera 193.

The camera 193 is configured to capture a static image or a video. An optical image of an object is generated through a lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include 1 or N cameras 193, and N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (NN) computing processor, quickly processes input information by refer to a structure of a biological neural network, for example, a transfer mode between neurons in a human brain, and may further continuously perform self-learning. The NPU may be used to implement an application such as intelligent cognition of the electronic device 100, for example, image recognition, facial recognition, voice recognition, and text understanding.

The internal memory 121 may be one or more random access memories (RAM), and one or more non-volatile memories (NVM). The random access memory may include a static random access memory (SRAM), a dynamic random access memory (DRAM), a synchronous dynamic random access memory (SDRAM), a double data rate synchronous dynamic random access memory (DDR SDRAM, such as a 5th generation DDR SDRAM generally referred to as DDR5 SDRAM), or the like. The non-volatile memory may include a magnetic disk storage device and a flash memory. According to an operating principle, the flash memory may be divided into NOR FLASH, NAND FLASH, 3D NAND FLASH, and the like; according to potential orders of storage cells, the flash memory may be divided into a single-level storage cell (SLC), a multi-level storage cell (MLC), a triple-level cell (TLC), a quad-level cell (QLC), and the like; and according to storage specifications, the flash memory may be divided into a universal flash storage (UFS), an embedded multi media memory card (eMMC), and the like. The random access memory may be directly read and written by the processor 110, may be configured to store executable programs (such as machine instructions) of an operating system or another running program, and may also be configured to store data of users and application programs. The non-volatile memory may also store the executable programs, the data of the users and the application programs, and the like, and may be loaded into the random access memory in advance, to be directly read and written by the processor 110.

The external memory interface 120 may be configured to connect to an external non-volatile memory, to expand a storage capability of the electronic device 100. The external non-volatile memory communicates with the processor 110 through the external memory interface 120, to implement a data storage function, for example, storing a file such as a music or a video in the external non-volatile memory.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode by using the speaker 170A.

The receiver 170B, also referred to as an "earpiece", is configured to convert an audio electrical signal into a sound signal. When the electronic device 100 is configured to answer a call or receive voice information, the receiver 170B may be put close to a human ear to receive a voice.

The microphone 170C, also referred to as a "mic" and a "mike", is configured to convert a sound signal into an electrical signal. When making a call or sending voice information, a user may make a sound near the microphone 170C through the mouth of the user, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. When force is performed to the pressure sensor 180A, capacitance between electrodes changes. The electronic device 100 determines pressure strength based on a change in the capacitance. When a touch operation is performed on the display screen 194, the electronic device 100 detects strength of the touch operation based on the pressure sensor 180A. The electronic device 100 may further calculate a position of the touch based on a detection signal of the pressure sensor 180A. In some embodiments, touch operations that are performed on a same touch position but have different touch operation strength may correspond to different operation instructions.

The gyroscope sensor 180B may be configured to determine a motion posture of the electronic device 100. In some embodiments, an angular velocity of the electronic device 100 around three axes (namely, x, y, and z axes) may be determined by using the gyroscope sensor 180B. The gyroscope sensor 180B may be used for image stabilization in image capture. For example, when the shutter is pressed, the gyroscope sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyroscope sensor 180B may also be used in navigation and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect an opening state or a closing state of a flip leather case by using the magnetic sensor 180D. In some embodiments, when the electronic device 100 is a clamshell phone, the electronic device 100 may detect an opening state or a closing state of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect an acceleration value of the electronic device 100 in each direction (generally in three axes). When the electronic device 100 is stationary, a magnitude and a direction of gravity may be detected. The acceleration sensor may be further configured to recognize a posture of the electronic device, and is applied to an application such as switching between landscape orientation and portrait orientation or a pedometer.

The distance sensor 180F is configured to measure a distance. The electronic device 100 may measure a distance through infrared light or laser. In some embodiments, in a photographing scenario, the electronic device 100 may measure a distance by using the distance sensor 180F, to implement quick focusing. The optical proximity sensor 180G may include, for example, a light-emitting diode (LED) and an optical detector such as a photodiode. The light-emitting diode may be an infrared light-emitting diode. The electronic device 100 may emit infrared light by using the light-emitting diode. The electronic device 100 detects infrared reflected light from a nearby object by using the photodiode.

The ambient light sensor 180L is configured to perceive brightness of ambient light. The electronic device 100 may adaptively adjust brightness of the display screen 194 based on the perceived brightness of the ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection.

The touch sensor 180K is also referred to as a "touch device". The touch sensor 180K may be disposed on the display screen 194. The touch sensor 180K and the display screen 194 form a touchscreen, which is also referred to as a "touch control screen". The touch sensor 180K is configured to detect a touch operation on or near the touch sensor 180K. The touch sensor may transfer the detected touch operation to the application processor to determine a type of the touch event. The touch sensor may provide a visual output related to the touch operation by using the display screen 194. In some other embodiments, the touch sensor 180K may alternatively be disposed on a surface of the electronic device 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal.

The button 190 includes a power button, a volume button, and the like. The button 190 may be a mechanical button, or may be a touch-type button. The electronic device 100 may receive a button input, and generate a button signal input related to user setting and function control of the electronic device 100.

The motor 191 may generate a vibration prompt. The motor 191 may be configured to provide a vibration prompt for an incoming call, and may be further configured to provide a touch vibration feedback.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or plugged from the SIM card interface 195, to come into contact with or be separated from the electronic device 100.

The following describes related concepts involved in embodiments of this application, to facilitate understanding by a person skilled in the art.

Page: The term "page" in the specification, claims, and accompanying drawings of this application may also be referred to as a user interface (UI), is a medium interface for interaction and information exchange between an application program or operating system and a user, and implements the conversion between an internal form of information and a form of the information acceptable to the user. The user interface of the application program is source code written in a specific computer language such as java and an extensible markup language (XML). The interface source code is parsed and rendered on a terminal device, and is finally presented as content that can be recognized by the user. Attributes and content of controls on the interface are defined by tags or nodes. For example, the XML specifies the controls included on the interface by using nodes such as <Textview>, <ImgView>, and <VideoView>. One node corresponds to one control or property on the interface. After being parsed and rendered, the node is presented as content visible to the user. In addition, interfaces of many application programs, for example, hybrid applications (hybrid applications), usually further include web pages. A web page may be understood as a special control embedded in an application program interface. The web page is source code written in a specific computer language, for example, a hypertext markup language (HTML), cascading style sheets (CSS), or javascript (JS). The web page source code may be loaded and displayed as user-recognized content by a browser or a web page display assembly similar to a browser function. Specific content included on the web page is also defined by tags or nodes in the web page source code. For example, the HTML defines elements and properties of the web page through <p>, <img>, <video>, and <canvas>.

In embodiments of this application, controls may include but are not limited to: a window, a scrollbar, a tableview, a button, a menu bar, a text box, a navigation bar, a toolbar, an image, a statictext, a widget, and other visual interface elements.

Page module: A page may be divided into a plurality of consecutive page modules based on a layout and properties of controls on the page. A page module may carry one or more element types of a picture, text, an operation button, a link, an animation, a sound, a video, and the like. A page module may be presented as a collection of one or more controls. For example, the page module may be presented as an icon on a main interface, a picture in a gallery, a card on a minus-one screen, or the like. In embodiments of this application, different page modules may or may not overlap. In embodiments of this application, the page module may also be referred to as a module for short.

The following describes arrangement manners of page modules provided in embodiments of this application with reference to the accompanying drawings.

In some embodiments of this application, if the display screen 194 of the electronic device 100 cannot display all content on a page, a user may view more content on the page by sliding the page. Display content of the page displayed on the display screen 194 may include a part or all of one or more consecutive page modules on the page.

In embodiments of this application, the page modules on the page may be presented in a one-dimensional vertical arrangement, or may be presented in a one-dimensional horizontal arrangement, or may be presented in a two-dimensional array arrangement, or may be presented in an irregular arrangement. This is not specifically limited in embodiments of this application.

Figure 2A:
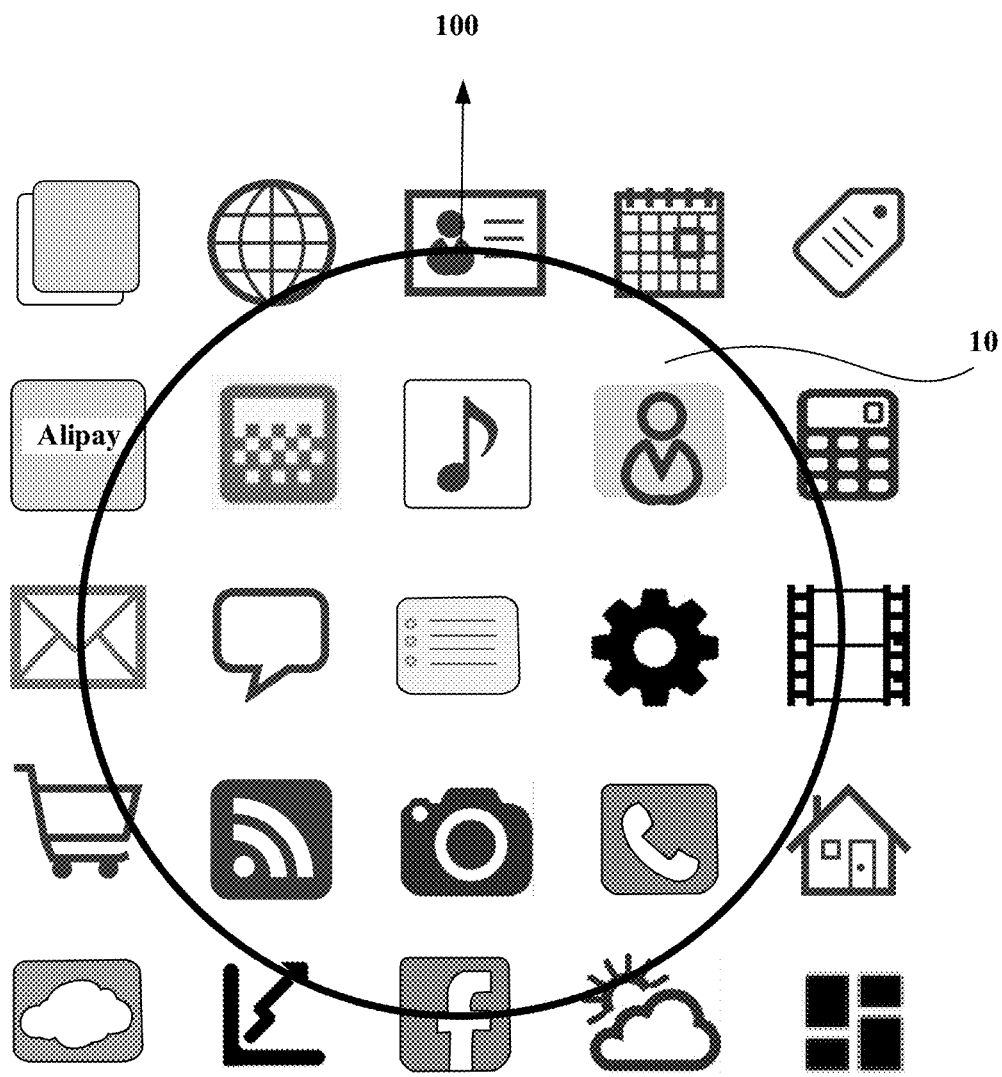
FIG. 2A is a schematic diagram of a two-dimensional array distribution of icons according to an embodiment of this application.
Figure 2B:
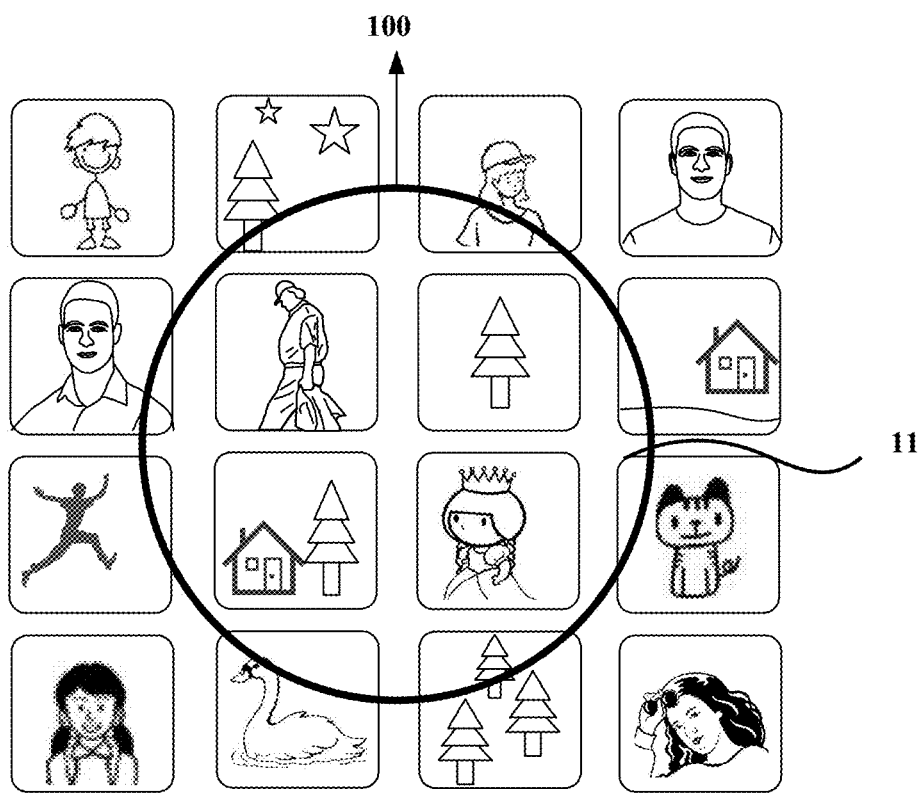
FIG. 2B is a schematic diagram of a two-dimensional array distribution of images according to an embodiment of this application.

For example, FIG. 2A and FIG. 2B are schematic diagrams of a page in a two-dimensional array arrangement according to an embodiment of this application. As shown in FIG. 2A, a page 10 of the electronic device 100 includes icons of a plurality of installed application programs, one page module may be presented as an icon of one application program, and the icons of the plurality of installed application programs are presented in the two-dimensional array arrangement on the page 10. As shown in FIG. 2B, a page 11 of the electronic device 100 includes a plurality of pictures in an album, one page module may be presented as one picture, and the plurality of pictures are presented in the two-dimensional array arrangement on the page 11.

Figure 2C:
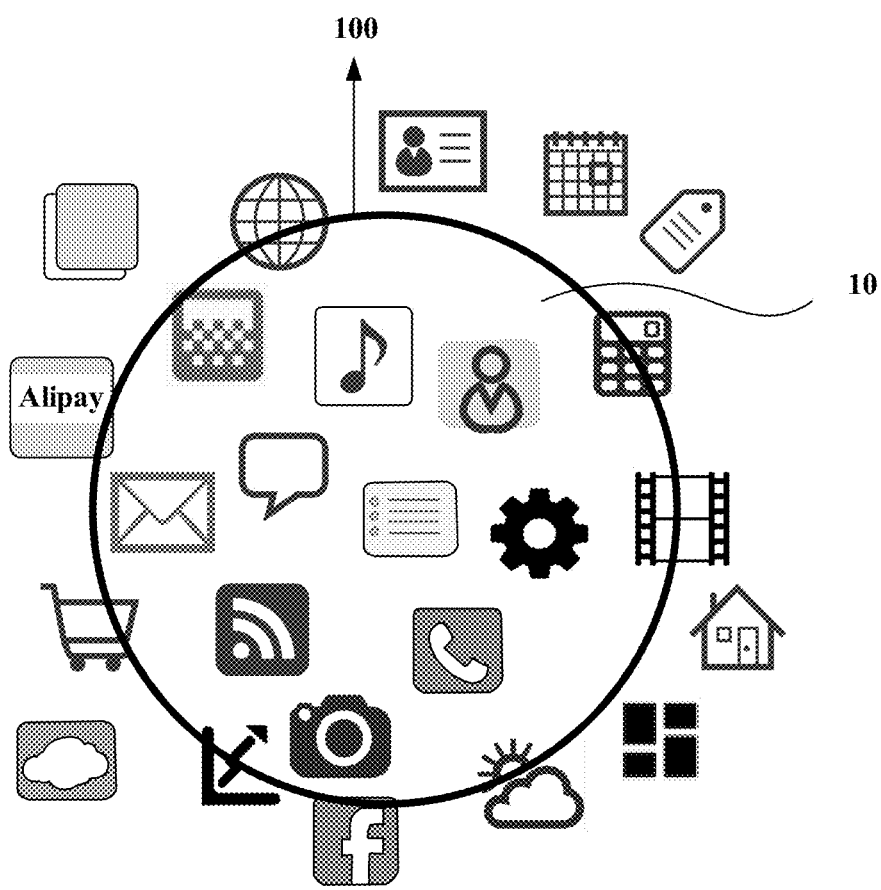
FIG. 2C is a schematic diagram of an irregular distribution of icons according to an embodiment of this application.

For example, FIG. 2C is a schematic diagram of a page in an irregular arrangement according to an embodiment of this application. As shown in FIG. 2C, icons of a plurality of installed application programs of the electronic device 100 are presented in the irregular arrangement on a page 10.

In FIG. 2A and FIG. 2C, the electronic device 100 may receive a sliding operation performed by the user on the page 10, and in response to the sliding operation, the electronic device 100 may move positions of the icons on the page 10, to display icons of more installed application programs. In FIG. 2B, the electronic device 100 may receive a sliding operation performed by the user on the page 11, and in response to the sliding operation, the electronic device 100 may move positions of the pictures on the page 11, to display more pictures in the album.

Figure 2D:
FIG. 2D is a schematic diagram of a square screen according to an embodiment of this application.

In FIG. 2A to FIG. 2C, a screen of the electronic device 100 is a circular screen. It should be noted that the circular screen is merely an example for description of this embodiment of this application, and should not constitute a limitation on this embodiment of this application. Not limited to the circular screen, a page sliding processing method provided in embodiments of this application is also applicable to a rectangular screen, a square screen, an irregular screen, and the like. For example, FIG. 2D is a schematic diagram of a page module on a square screen. It should be noted that FIG. 2A to FIG. 2D show merely example pages provided in embodiments of this application, and the electronic device 100 may display more or fewer page modules than those shown in the figure. In addition, in addition to the page modules shown in the figure, the page displayed by the electronic device 100 may further include other page elements, for example, a status bar and a floating menu. This is not specifically limited in embodiments of this application.

In addition, in embodiments of this application, based on display positions of the page modules on the display screen 194, layout manners of the page module may also be divided into two types: a limit layout manner and a non-limit layout manner.

In the limit layout manner, the electronic device 100 displays the page modules only at preset positions of the display screen 194. For such a layout manner, the electronic device 100 may receive a sliding operation performed on a page module, and the electronic device 100 controls the page module to slide on the display screen 194 in response to the foregoing sliding operation. Compared with before the page module slides, when the page modules all stop sliding, relative positions between the page modules remain unchanged, and the electronic device 100 displays the page modules only at the preset positions. In an embodiment, points at centers of the page modules are used as reference point of the preset positions, in other words, when the page modules stop sliding, the points at the centers of the page modules are located at the preset positions. It should be noted that the preset positions may be preset pixel points on the display screen, and a distance between adjacent preset pixel points is greater than a preset value. For example, the preset value is 1. It may be understood that the preset pixel points are discontinuous on the display screen, in other words, the preset positions of the page modules displayed on the display screen are discontinuous.

In some embodiments of this application, a minimum distance between the foregoing adjacent preset pixels may alternatively be limited, to avoid an overlap between the page modules.

Figure 2E:
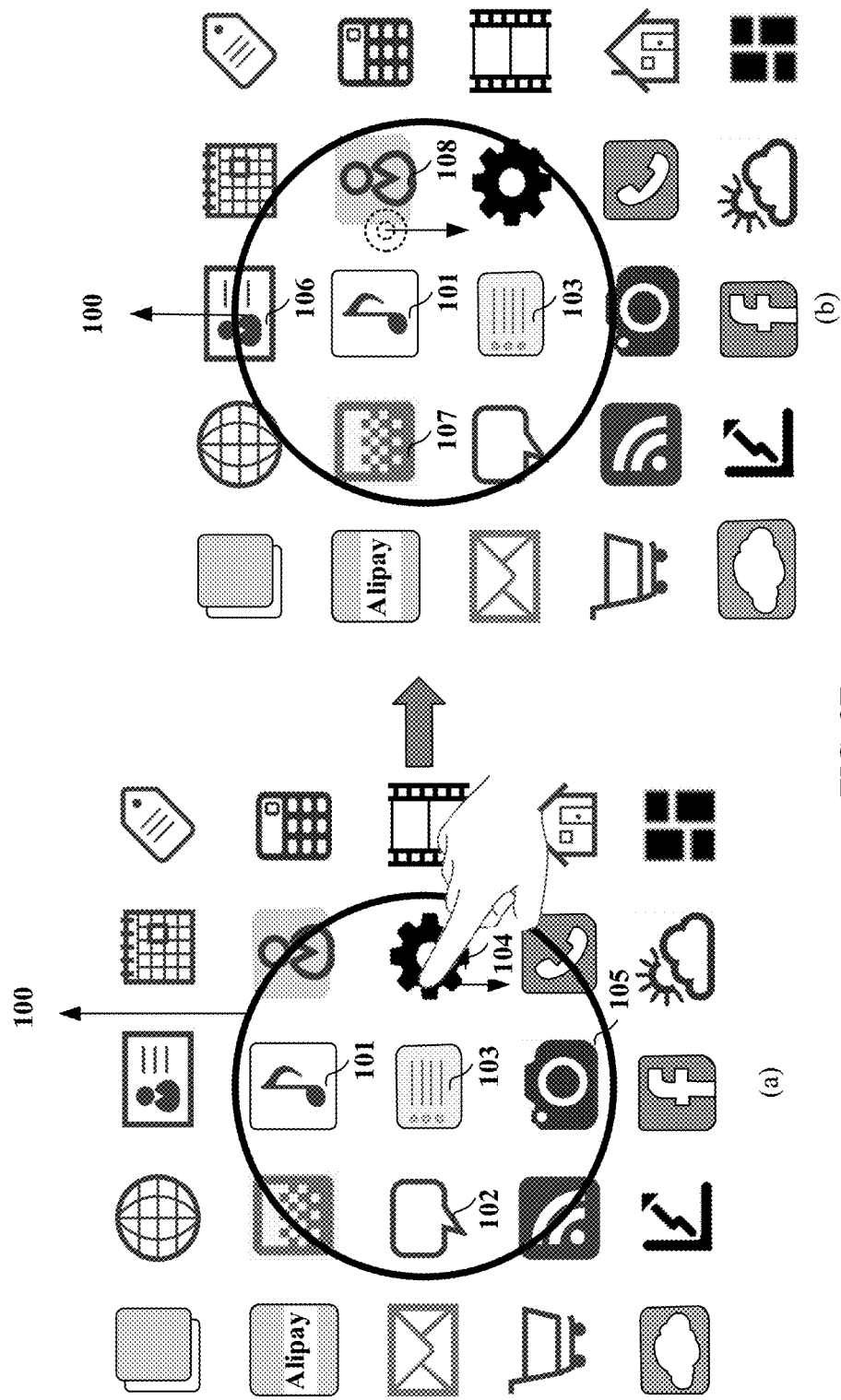
FIG. 2E is a schematic diagram of a limit layout according to an embodiment of this application.

For example, as shown in (a) of FIG. 2E, page modules are presented in a two-dimensional array distribution. The electronic device 100 respectively displays a page module 101, a page module 102, a page module 103, a page module 104, and a page module 105 only at 5 preset positions of the display screen 194. The user's finger slides down on the display screen 194, and the page modules slide on the display screen in response to a sliding operation. As shown in (b) of FIG. 2E, when the page modules stop sliding, the electronic device 100 respectively displays a page module 106, a page module 107, the page module 101, a page module 108, and the page module 103 at the foregoing 5 preset positions. In other words, a display position of a page module (for example, the page module 101) in (b) of FIG. 2E is the same as a display position of a page module (for example, the page module 103) in (a) of FIG. 2E. It should be noted that it is not limited to that the display screen shown in FIG. 2E displays page modules of 3 rows and 3 columns, and the display screen may also display page modules of n rows and m columns, where n and m may be equal, or may not be equal. For example, the display screen may display page modules of 4 rows and 4 columns, or the display screen may display page modules of 4 rows and 5 columns. In addition, a horizontal interval between adjacent page modules in a horizontal direction and a vertical interval between adjacent page modules in a vertical direction may be equal, or may not be equal, which is not specifically limited herein.

Figure 2F:
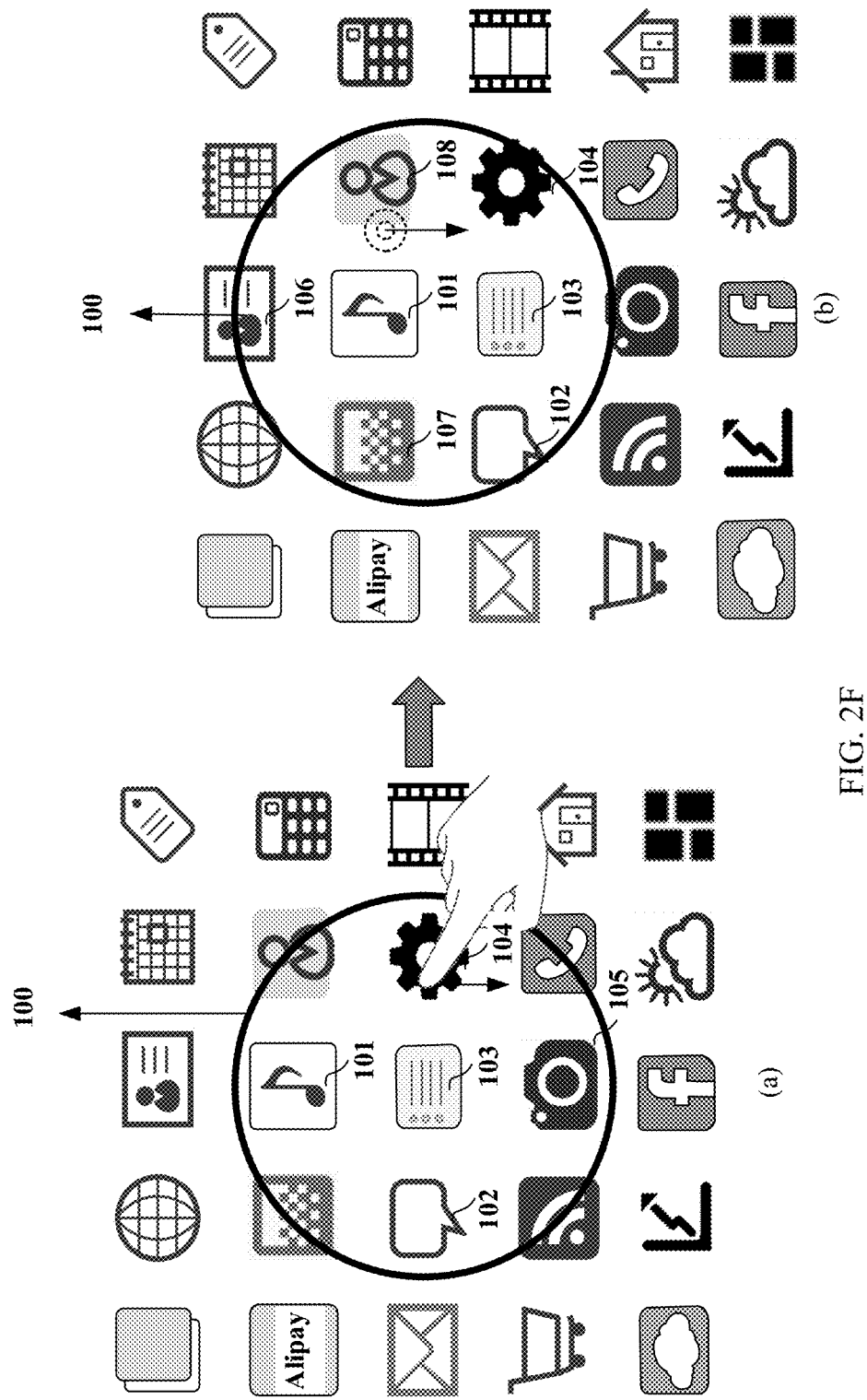
FIG. 2F is a schematic diagram of a non-limit layout according to an embodiment of this application.

In the non-limit layout manner, the electronic device 100 may display a page module at any position of the display screen 194, in other words, a display position of the page module is not limited. For such a layout manner, the electronic device 100 receives a sliding operation performed on a page module, and the page module slides on the display screen 194 in response to the foregoing sliding operation. When a page stops sliding, relative positions between page modules remain unchanged, and the electronic device 100 may display the page module at any position. For example, as shown in (a) of FIG. 2F, page modules are presented in a two-dimensional array distribution. The user's finger slides down on the display screen 194, and the page modules slide on the display screen in response to a sliding operation. As shown in (b) of FIG. 2F, when the page module stops sliding, a display position of any page module (namely, a page module 101, a page module 102, a page module 103, a page module 104, or a page module 105) in (a) of FIG. 2F may be different from a display position of any page module (namely, the page module 101, the page module 102, the page module 103, the page module 104, a page module 106, a page module 107, or a page module 108) in (b) of FIG. 2F.

For ease of description, in this embodiment of this application, a page module on which the user performs a sliding operation is referred to as a focus module. The electronic device 100 may divide page modules on a page into a plurality of module groups based on a position relationship between each of the page modules and the focus module on the page. In a page sliding process, page modules in a same module group slide as a whole. To be specific, sliding velocities and sliding directions in the same module group are the same.

Figure 3A:
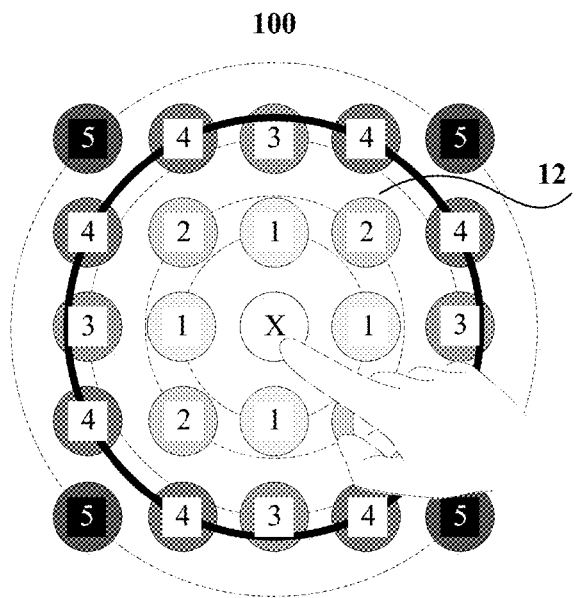
FIG. 3A to FIG. 3F are schematic diagrams of module groups in a two-dimensional array distribution according to an embodiment of this application.
Figure 3B:
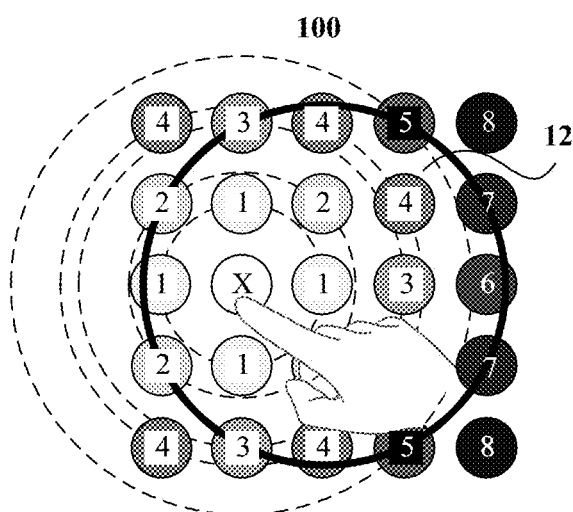

For example, as shown in FIG. 3A and FIG. 3B, a focus module on a page 12 on which the user performs a sliding operation is numbered X. For page modules in a square two-dimensional array arrangement, page modules in a same module group are presented around the focus module in a circular distribution. The electronic device 100 divides page modules that have a same distance from the focus module X (namely, page modules that are around the focus module X and belong to a same circular distribution) into one module group, and numbers module groups X+1, X+2, X+3, X+4, and X+5 respectively based on a distance between the circular distribution and the focus module.

Figure 3C:
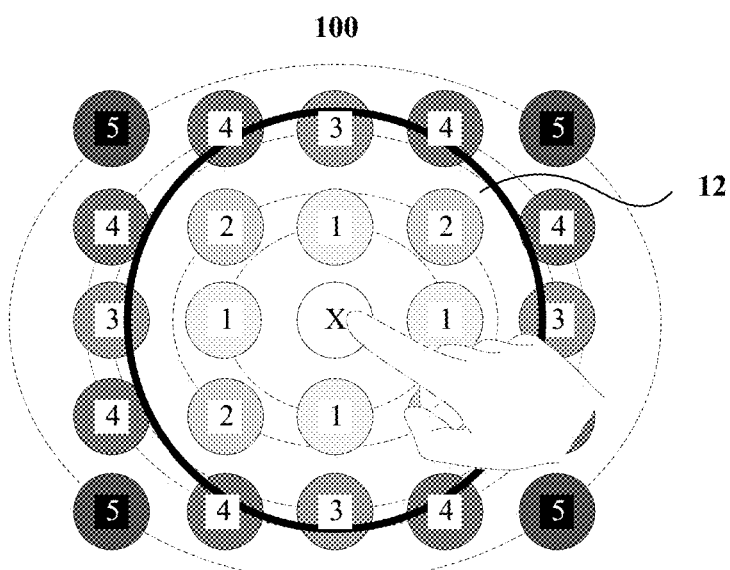
Figure 3D:
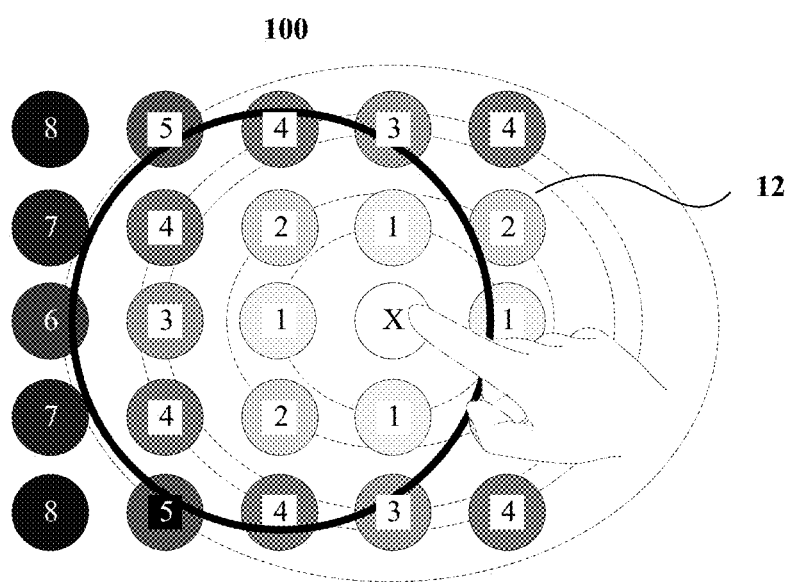

For example, as shown in FIG. 3C and FIG. 3D, for page modules in a matrix-shaped two-dimensional array arrangement, page modules in a same module group are presented around the focus module in an elliptical distribution. The electronic device 100 divides page modules that are around the focus module X and belong to a same elliptical distribution into one module group, and numbers module groups X+1, X+2, X+3, X+4, and X+5 respectively based on a distance between the elliptical distribution and the focus module.

Figure 3E:
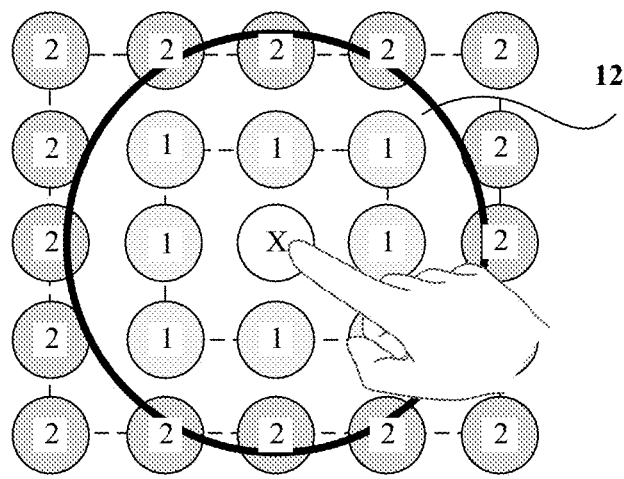
Figure 3F:
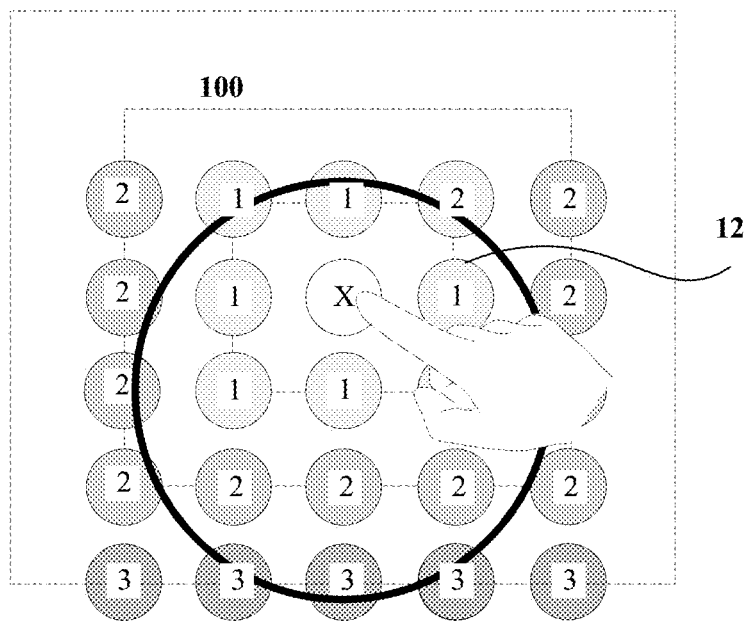

For example, as shown in FIG. 3E and FIG. 3F, for page modules in a matrix-shaped two-dimensional array arrangement, page modules in a same module group are presented around the focus module in a rectangular distribution. The electronic device 100 divides page modules that are around the focus module X and belong to a same rectangular distribution into one module group, and numbers module groups X+1 and X+2 respectively based on a distance between the rectangular distribution and the focus module.

Figure 3G:
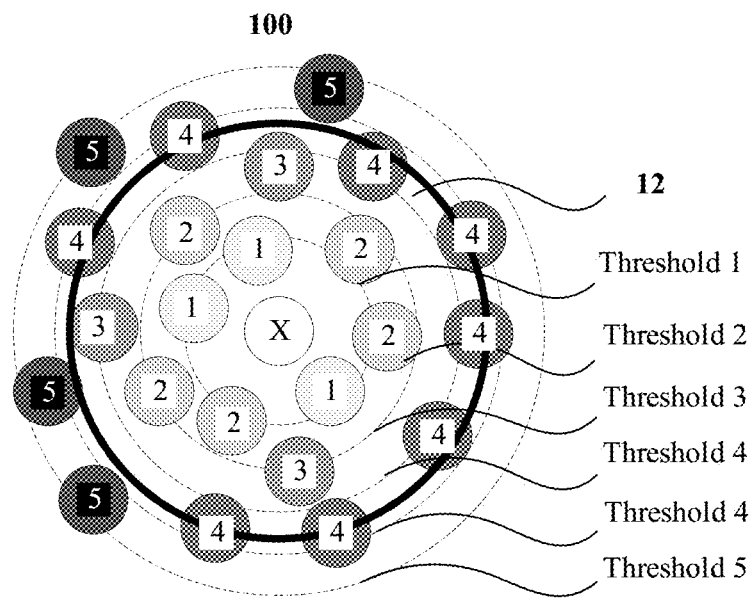
FIG. 3G is a schematic diagram of module groups in an irregular distribution according to an embodiment of this application.

Not limited to the circular distribution, the elliptical distribution, and the rectangular distribution shown in FIG. 3A to FIG. 3F, the page modules around the focus module X may be further presented in another distribution, for example, a diamond distribution or a square distribution. In conclusion, the electronic device 100 may divide, based on a distribution type of the page modules around the focus module X, page modules other than the focus module X on the page 12 into at least one module group, where distribution positions of different module groups are zoomed in and out based on a distance between a same distribution type and the focus module X by using the focus module X as a reference point. For example, as shown in FIG. 3G, for page modules in an irregular arrangement, the electronic device 100 divides page modules whose distances from the focus module X are less than or equal to a threshold 1 into one module group, and numbers the module group X+1; divides page modules whose distances from the focus module X are greater than the threshold 1 and less than or equal to a threshold 2 into one module group, and numbers the module group X+2; divides page modules whose distances from the focus module X are greater than the threshold 1 and less than or equal to a threshold 3 into one module group, and numbers the module group X+3; divides page modules whose distances from the focus module X are greater than the threshold 1 and less than or equal to a threshold 4 into one module group, and numbers the module group X+4; and divides page modules whose distances from the focus module X are greater than the threshold 1 and less than or equal to a threshold 5 into one module group, and numbers the module group X+5.

Figure 3H:
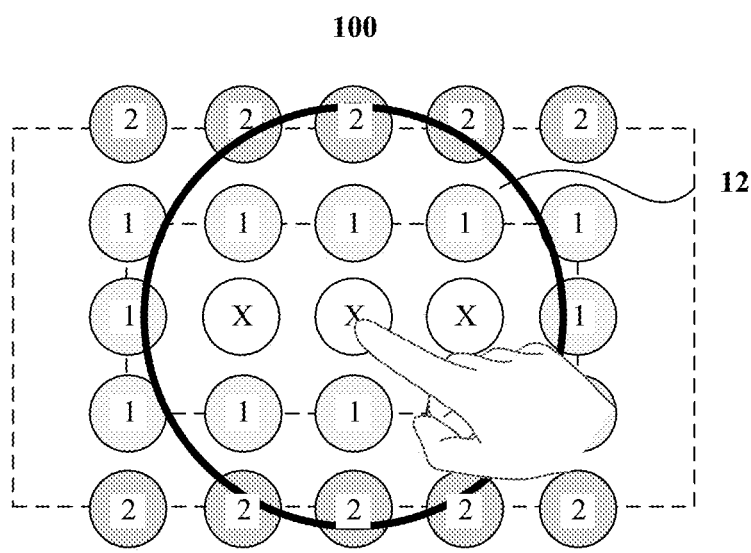
FIG. 3H is a schematic diagram of module groups in a two-dimensional array distribution according to an embodiment of this application.

It should be noted that, in embodiments of this application, a module group X includes the focus module X. As shown in FIG. 3A to FIG. 3C, for ease of observation, a page module in a module group X+c is identified by a number c in the figure, and c is a positive integer. For example, a page module in the module group X+2 is identified by a number 2 in the figure. In some embodiments, the module group X may further include other page modules X in addition to the focus module X that is performed on by the user's finger. For example, as shown in FIG. 3H, the module group X includes the focus module X and two adjacent page modules on left and right sides of the focus module X. Then, the electronic device 100 divides page modules that are around the module group X and belong to a same rectangular distribution into one module group, and numbers the module groups X+1 and X+2 respectively based on a distance between the elliptical distribution and the focus module.

In some embodiments, for page modules in an irregular distribution and page modules in a regular distribution (for example, a two-dimensional array distribution), the electronic device 100 may divide page modules other than the focus module X on the page 12 into at least one module group based on distances between the other page modules and the focus module X. In an embodiment, page modules that have an equal distance from the focus module X are divided into one group, and each module group is numbered based on a distance.

In some embodiments, when the user slides a page, if a contact surface between the user's finger and the display screen 194 falls on two adjacent page modules simultaneously, the electronic device 100 determines that a page module having a larger contact surface with the user's finger is the focus module X. In some embodiments, when the user slides a page, if a contact surface between the user's finger (or a stylus) and the display screen 194 falls in an area between page modules and does not fall on a page module, the electronic device 100 determines that a page module closest to the contact surface with the user's finger is the focus module X.

In embodiments of this application, the module group X may also be referred to as a first module group, the module group X+1 may also be referred to as a second module group, and the module group X+2 may also be referred to as a third module group.

By using an array distribution shown in FIG. 3A as an example, the following describes a page sliding effect provided in this embodiment of this application with reference to the accompanying drawings. It should be noted that a page sliding processing method provided in this embodiment of this application is also applicable to page modules arranged in an arrangement manner shown in FIG. 3B, FIG. 3C, or FIG. 3D.

A sliding direction of a page module (or a module group) in embodiments of this application is first described.

Figure 4A:
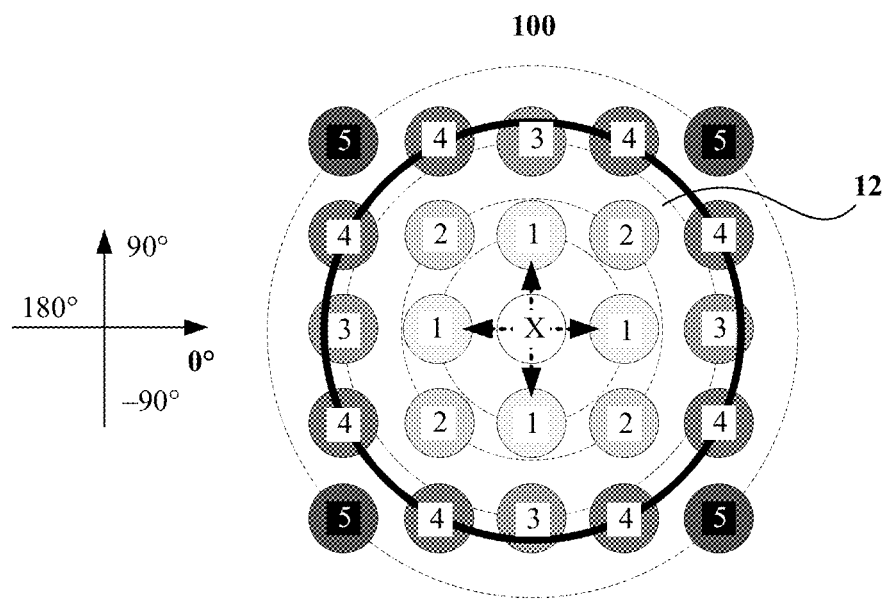
FIG. 4A and FIG. 4B are schematic diagrams of sliding directions of a page module according to an embodiment of this application.

In some embodiments of this application, refer to an angle coordinate system shown in FIG. 4A. A page module may have four sliding directions: a front right direction (0°), a front upper direction (90°), a front left direction (180°), and a front lower direction (−90°). The user may slide the page module to slide in the foregoing four sliding directions. It may be understood that, when a sliding direction of the user's finger is between 45° and −45°, the electronic device 100 controls the page module to slide in the front right direction; when the sliding direction of the user's finger is between 45° and 135°, the electronic device 100 controls the page module to slide in the front upper direction; when the sliding direction of the user's finger is between 135° and −135°, the electronic device 100 controls the page module to slide in the front left direction; and when the sliding direction of the user's finger is between −135° and −45°, the electronic device 100 controls the page module to slide in the front lower direction.

Figure 4B:
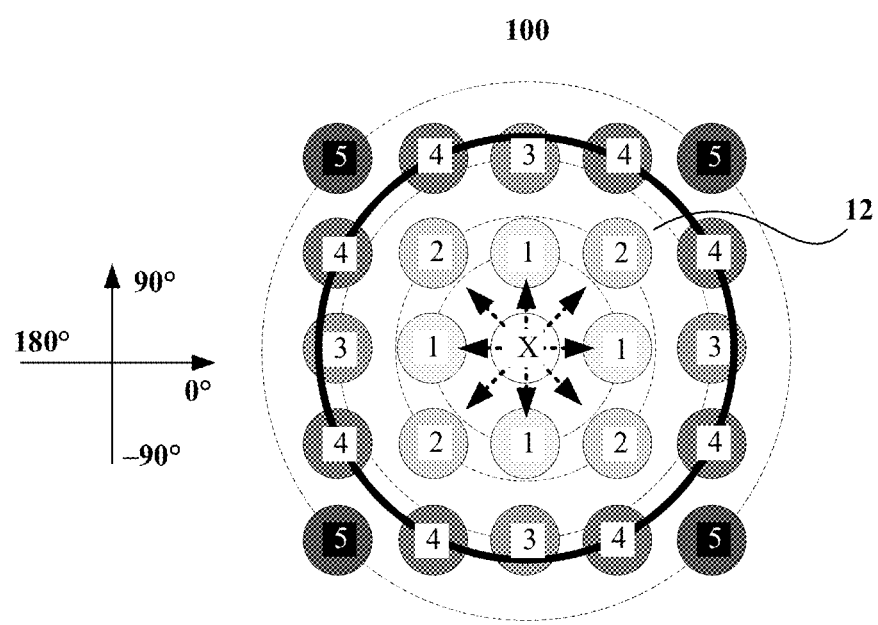

In some embodiments of this application, refer to an angle coordinate system shown in FIG. 4B. A page module may have eight sliding directions: a front right direction (0°), a right upper direction (45°), a front upper direction (90°), a left upper direction (135°), a front left direction (180°), a left lower direction (−135°), a front lower direction (−90°), and a right lower direction (−45°). The user may slide the page module to slide in the foregoing eight sliding directions. It may be understood that, when a sliding direction of the user's finger is between 22.5° and −22.5°, the electronic device 100 controls the page module to slide in the front right direction; when the sliding direction of the user's finger is between 22.5° and 67.5°, the electronic device 100 controls the page module to slide in the right upper direction; when the sliding direction of the user's finger is between 67.5° and 112.5°, the electronic device 100 controls the page module to slide in the front upper direction; and when the sliding direction of the user's finger is between 112.5° and 135°, the electronic device 100 controls the page module to slide in the left upper direction.

In some embodiments of this application, the page module may slide in any direction. It may be understood that the electronic device 100 receives a sliding operation performed on the focus module X in a direction 1, and the electronic device 100 controls module groups to slide in the direction 1 in response to the detected sliding operation. It should be noted that the front right direction, the front upper direction, the front left direction, the front lower direction, the right upper direction, the left upper direction, the left lower direction, and the right lower direction mentioned in embodiments of this application are all relative and are example descriptions in specific embodiments, which shall not constitute a limitation on embodiments of this application.

The following describes concepts such as an edge page module, maximum displacement of a page module (a module group), boundary crossing, and rebounding involved in embodiments of this application.

In embodiments of this application, the displacement of the page module (or the module group) is a projection of a sliding distance of the page module (or the module group) in a sliding direction. In a page module sliding process, the electronic device 100 presents a dynamic effect of page module sliding by displaying a plurality of frames of images in a page changing process. It may be understood that displacement of a page module 1 is displacement formed by a plurality of discrete pixels corresponding to a preset point (for example, a center point of the page module) of the page module in the foregoing plurality of frames of images in a sliding direction of the page module 1.

It should be noted that in embodiments of this application, displacement of a page module (or a module group) in a time period 1 may be a sliding displacement in a sliding direction of the page module (or the module group) from a start moment of the time period to an end moment of the time period. displacement of a page module (or a module group) at a moment 1 may be a sliding displacement in a sliding direction of the page module (or the module group) from a sliding start moment of the page module (or the module group) to the moment 1.

In embodiments of this application, a displacement difference between the page module 1 and a page module 2 in a sliding direction (for example, the direction 1) is equal to an absolute value of a difference between displacement of the page module 1 in the sliding direction and displacement of the page module 2 in the sliding direction, and the displacement difference is greater than or equal to 0.

In some embodiments of this application, a quantity of page modules displayed on a page is limited, and all page modules displayed on the page include an edge page module. For example, refer to FIG. 4C. Page modules of a leftmost column shown in the figure are an edge page module on the page 12. In other words, there is no other page module on a left side of the page modules of the column. As shown in (a) of FIG. 4D, the electronic device 100 may receive a sliding operation of the user in the direction 1 (the front right direction), and the electronic device 100 controls module groups to slide in the direction 1 in response to the sliding operation. When the page stops sliding, a maximum value between the edge page module displayed on the display screen 194 and an edge of the display screen 194 is a preset value 1 shown in (b) of FIG. 4C. Therefore, there is maximum displacement Smax in sliding displacement of each module group in the direction 1. It may be understood that, the quantity of page modules displayed on the page is limited, and the page includes an edge page module in an opposite direction of each sliding direction. Therefore, when the page module stops sliding, displacement of each module group in the sliding direction is restricted by a value of the maximum displacement Smax.

In embodiments of this application, for the following case: "Before detecting that the user stops a sliding operation, the electronic device 100 controls the module group X to slide by $S_{X1}$. After detecting that the user stops the sliding operation, the electronic device 100 determines, based on the foregoing sliding operation, that the module group X continues to slide by $S_{X2}$. If $S_{X1}+S_{X2}$ is greater than the maximum displacement Smax, a distance between an edge page module displayed on the display screen 194 and the edge of the display screen 194 is greater than the preset value 1", this is referred to as crossing a boundary for short in embodiments of this application.

In embodiments of this application, for the following case: "in the page module sliding process, after sliding in a sliding direction, the page module slides in an opposite direction of the sliding direction", this is referred to as rebounding for short in embodiments of this application.

Figure 4C:
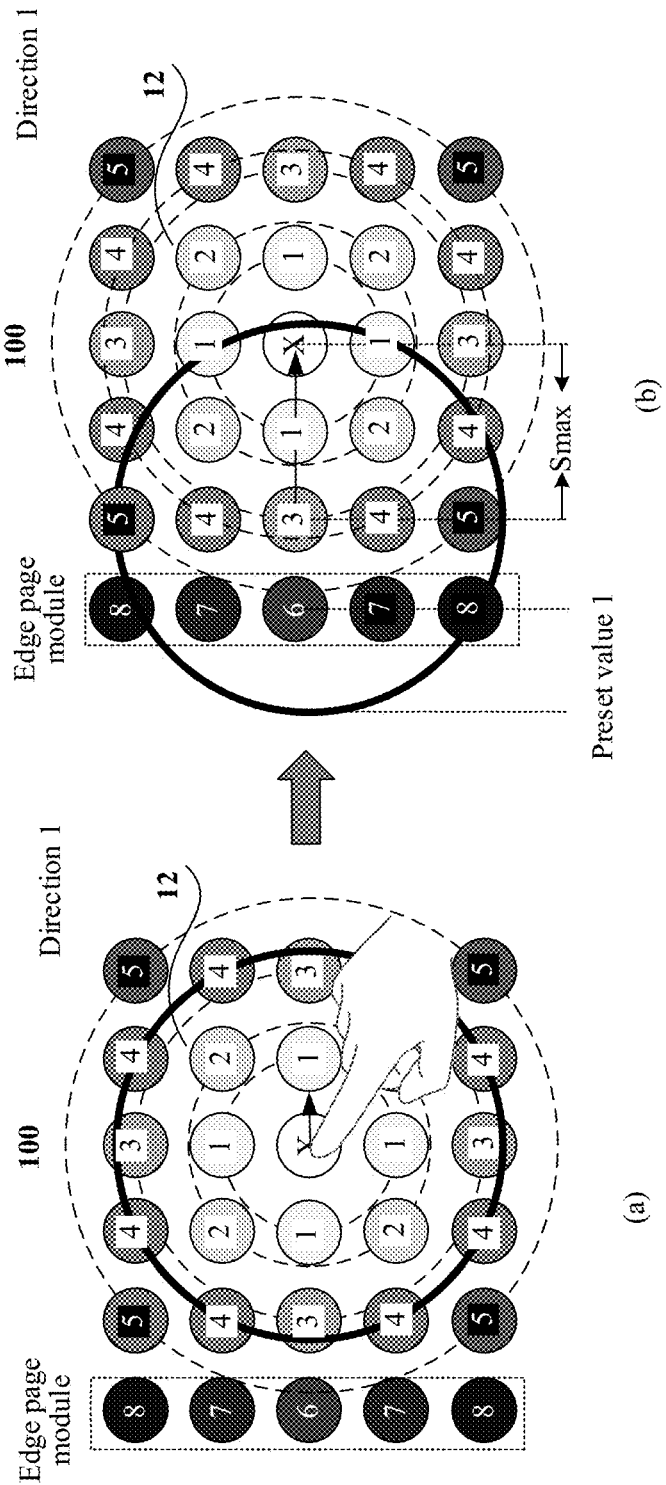
FIG. 4C is a schematic diagram of an edge module and maximum displacement according to an embodiment of this application.
Figure 4D:
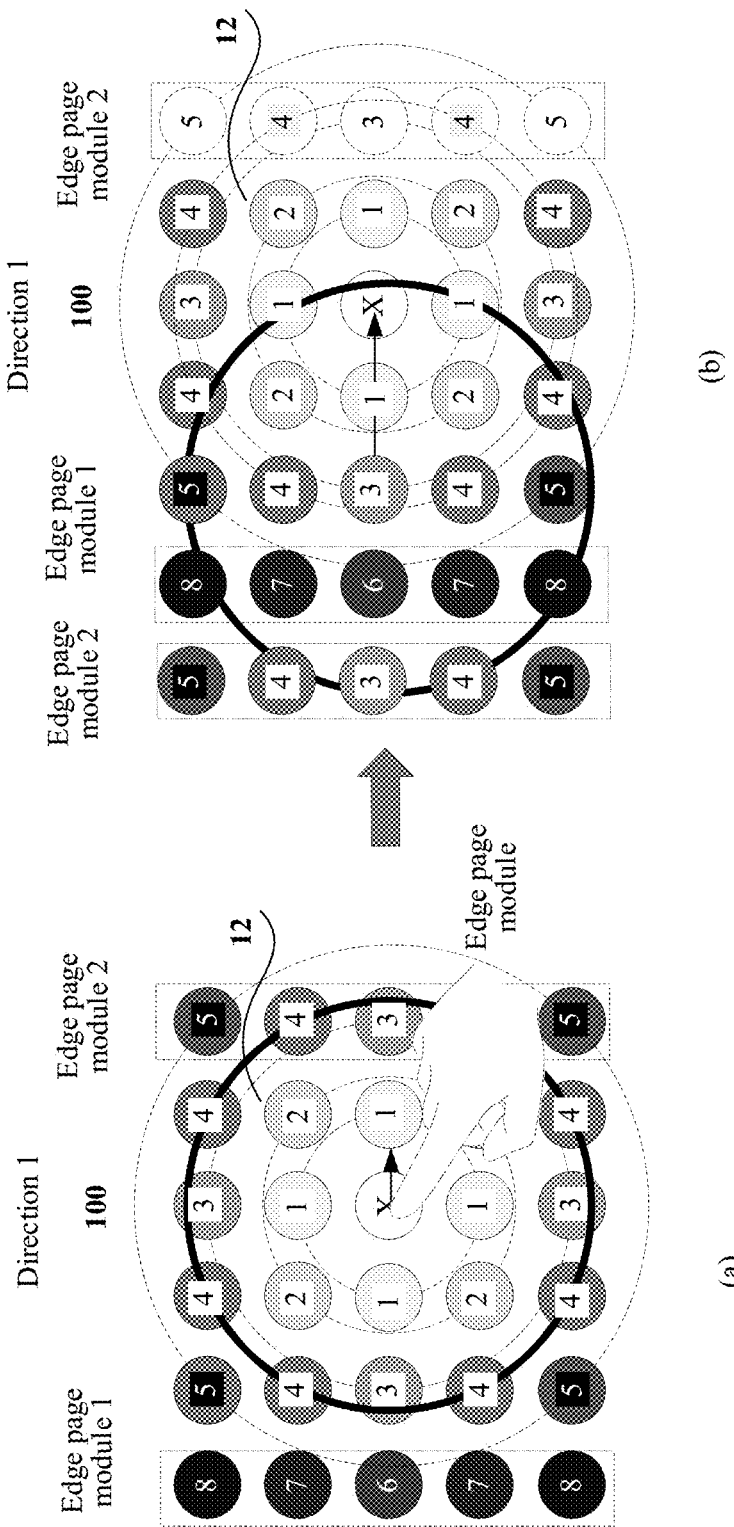
FIG. 4D is a schematic diagram of a module cycle according to an embodiment of this application.

In addition, it should be noted that, refer to FIG. 4C. When displaying the page 12, the electronic device 100 displays only some page modules of the page 12 on the display screen 194, and the electronic device 100 may not perform rendering on page modules that are not displayed.

The following further describes how to determine displacement by which the module group X continues to slide in a sliding direction and total displacement of each module group before and after the user's finger stops sliding.

In some embodiments of this application, the electronic device 100 detects a sliding operation of the user's finger in real time. Before the user stops the sliding operation, the electronic device 100 determines a sliding direction of each module group based on a sliding direction of the user's finger, and determines that displacement of the module group X is equal to a sliding distance of the user's finger in the sliding direction of the module group. After detecting that the user stops the sliding operation, the electronic device 100 determines, based on an instantaneous sliding direction when the user stops the sliding operation, the sliding direction of each module group after the sliding operation is stopped; and determines, based on at least one of a sliding velocity of the sliding operation, a friction model, maximum displacement, and a limited distance of a limit layout, displacement $S_{X2}$ of the module group X after the user stops the sliding operation. The sliding velocity of the foregoing sliding operation may be an instantaneous velocity before the user releases a hand, or may be an average velocity of the foregoing sliding operation. Total displacement of each module group is equal to the displacement $S_{X1}$ of the module group X before the user stops the sliding operation plus $S_{X2}$.

In some embodiments, when the sliding direction of the user's finger is consistent with a sliding direction of a page module, after the sliding operation of the user is detected, the module group X is controlled to synchronously slide following the user's finger.

For the non-limit layout manner, in some embodiments, the electronic device 100 determines, by using the friction model, the displacement $S_{X2}$ of the module group X after the user stops the sliding operation. It should be noted that the displacement $S_{X2}$ in the friction model is related to the sliding velocity of the sliding operation and a friction coefficient. A larger sliding velocity indicates larger displacement $S_{X2}$, and a larger friction coefficient indicates smaller displacement $S_{X2}$. In some embodiments, the electronic device 100 determines, by using the friction model, the displacement of the module group X after the user stops the sliding operation, total displacement 1, and maximum displacement Smax; determines that actual total displacement is equal to a smaller value between the total displacement 1 and Smax; and then determines that actual displacement $S_{X2}$ of the module group X after the user stops the sliding operation is equal to the foregoing actual total displacement minus the displacement $S_{X1}$. In some embodiments, the electronic device 100 determines, by using a preset velocity-displacement mapping table, the displacement $S_{X2}$ of the module group X after the user stops the sliding operation, where the foregoing velocity-displacement mapping table includes a mapping relationship between a plurality of velocity ranges and displacement. After the user stops the sliding operation, the electronic device 100 determines that the displacement $S_{X2}$ is displacement corresponding to the sliding velocity of the foregoing sliding operation in the velocity-displacement mapping table. In some embodiments, after detecting that the user stops the sliding operation, the electronic device 100 controls the module group X to stop sliding, and determines that current displacement of the module group X is the total displacement of each module group.

For the limit layout manner, a page module is distributed only at a preset position of a page, a sliding direction of the module group includes the foregoing preset position, total displacement by which the page module slides is one of a plurality of fixed limited distances, and the limited distance is related to an interval between page modules in a sliding direction. For example, if a page module shown in FIG. 4C is in a limit layout, a limited distance by which the page module slides in the direction 1 includes K times Cl, where Cl is an interval between adjacent page modules in the direction 1, and K is a positive integer. In FIG. 4C, total displacement by which the page module slides is at least one of the foregoing plurality of limited distances. In some embodiments, the electronic device 100 determines, by using the friction model, displacement 1 of the module group X after the user stops the sliding operation and total displacement 1; then determines that actual total displacement is equal to a limited distance that has a smallest difference from the total displacement 1 in the foregoing plurality of limited distances, or determines that the actual total displacement is equal to a smallest limited distance that is greater than the total displacement 1 in the foregoing plurality of limited distances, or determines that the actual total displacement is equal to a limited distance that is less than or equal to Smax and has a smallest difference from the total displacement 1 in the foregoing plurality of limited distances, or determines that the actual total displacement is equal to a smallest limited distance that is less than or equal to Smax and greater than the total displacement 1 in the foregoing plurality of limited distances; and then determines that actual displacement $S_{X2}$ of the module group X after the user stops the sliding operation is equal to the actual total displacement minus the displacement $S_{X1}$. In some embodiments, the electronic device 100 determines, by using the velocity-displacement mapping table, displacement 1 of the module group X after the user stops the sliding operation. After the user stops the sliding operation, the electronic device 100 determines displacement 2 corresponding to the sliding velocity of the sliding operation in the velocity-displacement mapping table; and determines that actual total displacement is a limited distance that has a smallest difference from the total displacement 1 in the foregoing plurality of limited distances, or determines that the actual total displacement is equal to a smallest limited distance that is greater than the total displacement 1 in the foregoing plurality of limited distances, or determines that the actual total displacement is equal to a limited distance that is less than or equal to Smax and has a smallest difference from the total displacement 1 in the foregoing plurality of limited distances, or determines that the actual total displacement is equal to a smallest limited distance that is less than or equal to Smax and greater than the total displacement 1 in the foregoing plurality of limited distances. The total displacement 1 is equal to the foregoing displacement 1 plus $S_{X1}$.

For the limit layout manner, in some embodiments, the displacement $S_{X2}$ is determined with reference to the foregoing non-limit layout manner. After detecting that the user stops the sliding operation, the electronic device 100 controls the module group X to continue to slide by $S_{X2}$. If a position of the module group X on the page after sliding by $S_{X2}$ is not a preset position of the limit layout, after the electronic device 100 controls the module group X to slide to a nearest preset position of the limit layout and controls another module group to slide by $S_{X1}+S_{X2}$, the another module group also follows the module group X to slide to the nearest preset position of the limit layout.

It can be learned from the foregoing embodiment that, in some embodiments, the electronic device 100 determines the displacement $S_{X2}$ of the module group X after the user stops the sliding operation based on the maximum displacement, and the displacement $S_{X2}$ is less than or equal to the maximum displacement Smax. In this case, a page does not cross a boundary in a page sliding process. In some embodiments, the electronic device 100 determines the displacement $S_{X2}$ of the module group X after the user stops the sliding operation based on the maximum displacement, and there is a possibility that the displacement $S_{X2}$ is greater than the maximum displacement Smax. In this case, when the displacement $S_{X2}$ is greater than the maximum displacement Smax, a distance between an edge module displayed on the display screen 194 and an edge of the display screen is greater than the preset value 1, and a page crosses a boundary. When the page crosses the boundary, after controlling the module group X to slide to the displacement $S_{X1}+S_{X2}$, the electronic device 100 controls each module group to slide in an opposite direction of the direction 1, and rebounds the total displacement to Smax. A rebound distance is equal to $S_{X1}+S_{X2}-$Smax.

In addition, in some embodiments, an edge page module in the sliding direction is connected to an edge page module in the opposite direction of the sliding direction, and the total displacement of each module group is not restricted by the maximum displacement. For example, refer to (a) of FIG. 4D. Page modules of a leftmost column shown in the figure are an edge page module 1 of the page 12, and page modules of a rightmost column are an edge page module 2 of the page 12. As shown in (a) of FIG. 4D and (b) of FIG. 4D, the electronic device 100 may receive a sliding operation performed by the user in the direction 1 (the front right direction), and the electronic device 100 controls each module group to slide in the direction 1 in response to the sliding operation. In a sliding process, if the electronic device 100 continues to slide in the direction 1 after displaying the edge page module 1, the electronic device 100 displays the edge page module 1. To be specific, the edge page module in the direction 1 is connected to the edge page module in the opposite direction of the direction 1 to form cyclic scrolling, so that total displacement of the page module is not limited by the maximum displacement.

By using the module group X, the module group X+1, and the module group X+2 as an example, the following describes a page sliding effect provided in embodiments of this application with reference to the accompanying drawings.

In embodiments of this application, the page sliding effect mainly includes a non-cross-boundary non-rebounding page sliding effect, a non-cross-boundary rebounding page sliding effect, a following-hand cross-boundary rebounding page sliding effect, and a releasing-hand cross-boundary rebounding page sliding effect. The following further describes the page sliding effects of the foregoing four types.

1. Non-Cross-Boundary Non-Rebounding Page Sliding Effect

First, anon-rebounding page sliding effect provided in embodiments of this application is described from a plurality of sliding directions by using a page sliding effect shown in FIG. 5A to FIG. 5D. In FIG. 5A to FIG. 5D, a boundary is not crossed in a page sliding process, that is, total displacement of each module group is less than or equal to maximum displacement.

In some embodiments of this application, the user may control a page module to slide in a front right direction, a front upper direction, a front left direction, or a front lower direction.

Figure 5A:
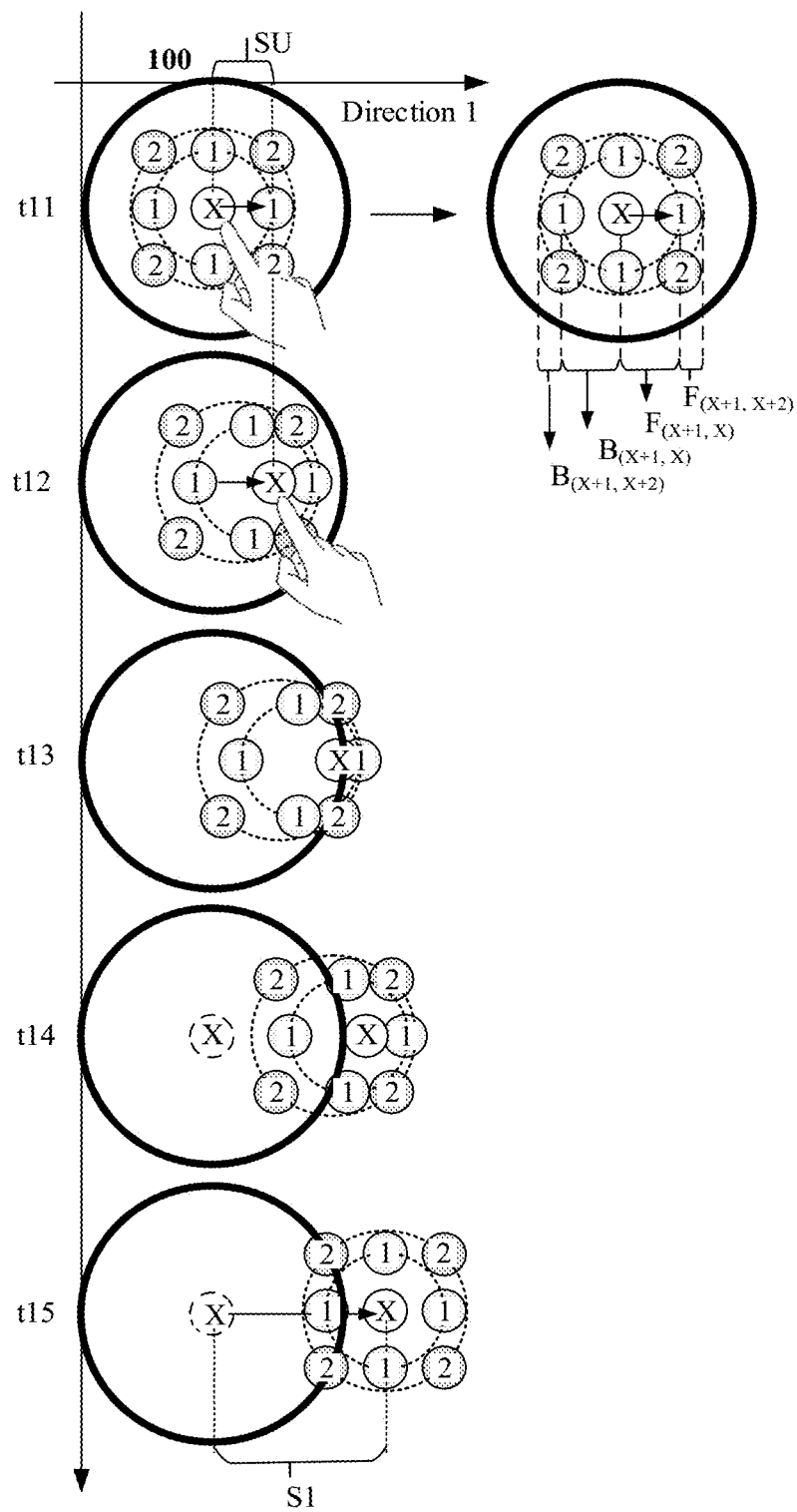
FIG. 5A is a schematic diagram of a non-cross-boundary page sliding effect in a front right direction according to an embodiment of this application.

For example, as shown in FIG. 5A, from a moment t11 to a moment t12, the user's finger slides by SU on the display screen 194 in a direction 1 by using an area in which the page module X is located as a start point. After detecting a sliding operation performed on the page module X, the electronic device 100 controls each module group on the page 12 to slide by S1 in the direction 1, where S1 is less than or equal to the maximum displacement Smax. As shown in FIG. 5A, the direction 1 may be the front right direction of the electronic device 100.

For ease of description, the following represents an interval distance between a module group X+v−1 and a module group X+v in the direction 1 as a forward interval $F_{(X+v-1, X+v)}$, and represents an interval distance between the module group X+v−1 and the module group X+v in an opposite direction of the direction 1 as a reverse interval $B_{(X+v-1, X+v)}$, where v is a positive integer. When the page module does not slide, an initial value of the forward interval $F_{(x+v-1, x+v)}$ is equal to an initial distance between the module group X+v−1 and the module group X+v in the direction 1, and an initial value of the reverse interval $B_{(x+v-1, x+v)}$ is equal to an initial distance between the module group X+v−1 and the module group X+v in the opposite direction of the direction 1.

As shown in FIG. 5A, from the moment t11 to a moment t15, displacement of the module group X is greater than or equal to displacement of the module group X+1, and the displacement of the module group X+1 is greater than or equal to displacement of the module group X+2. At the moment t15, the total displacement of each module group is equal to S1. Compared with the moment t11, at the moment t12, displacement of the module group X is greater than displacement of the module group X+1, and the displacement of the module group X+1 is greater than displacement of the module group X+2, so that forward intervals $F_{(X, X+1)}$ and $F_{(X+1, X+2)}$ in the direction 1 decrease, and reverse intervals $B_{(X, X+1)}$ and $B_{(X+1, X+2)}$ in the opposite direction of the direction 1 increase. Compared with the moment t12, at the moment t13, a displacement difference between the module group X and the module group X+1 increases, and a displacement difference between the module group X+1 and the module group X+2 increases, so that the forward intervals $F_{(X, X+1)}$ and $F_{(X+1, X+2)}$ in the direction 1 continue to decrease, and the reverse intervals $B_{(X, X+1)}$ and $B_{(X+1, X+2)}$ in the direction 1 continue to increase. Compared with the moment t13, at the moment t14, the displacement difference between the module group X and the module group X+1 decreases, and the displacement difference between the module group X+1 and the module group X+2 decreases, so that the forward intervals $F_{(X, X+1)}$ and $F_{(X+1, X+2)}$ in the direction 1 increase, and the reverse intervals $B_{(X, X+1)}$ and $B_{(X+1, X+2)}$ in the direction 1 decrease. Compared with the moment t14, at the moment t15, the displacement difference between the module group X and the module group X+1 decreases to 0, and the displacement difference between the module group X+1 and the module group X+2 decreases to 0, so that the forward intervals $F_{(X, X+1)}$ and $F_{(X+1, X+2)}$ in the direction 1 increase to initial values of the forward intervals, and the reverse intervals $B_{(X, X+1)}$ and $B_{(X+1, X+2)}$ in the direction 1 decrease to initial values of the reverse intervals. At the moment t15, total displacement of the page modules shown in FIG. 5A in the direction 1 is all S1. After the moment t15, the page modules shown in FIG. 5A all stop sliding.

In some embodiments of this application, the user may further control a page module to slide in a right upper direction, a left upper direction, a left lower direction, or a right lower direction.

Figure 5B:
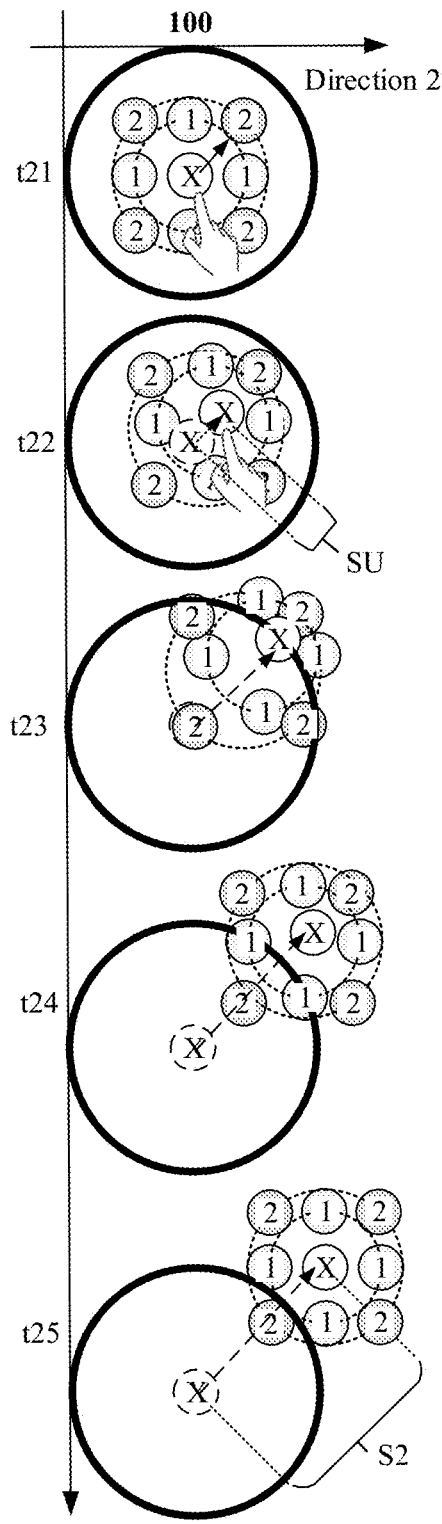
FIG. 5B is a schematic diagram of a non-cross-boundary page sliding effect in a right upper direction according to an embodiment of this application.

For example, as shown in FIG. 5B, from a moment t21 to a moment t22, the user's finger slides by SU on the display screen 194 in a direction 2 by using an area in which the page module X is located as a start point. After detecting a sliding operation performed on the page module X, the electronic device 100 controls each module group on the page 12 to slide by S2 in the direction 2, where S2 is less than or equal to the maximum displacement Smax. As shown in FIG. 5B, the direction 2 may be the right upper direction of the electronic device 100.

As shown in FIG. 5B, from the moment t21 to a moment t25, displacement of the module group X is greater than or equal to displacement of the module group X+1, and the displacement of the module group X+1 is greater than or equal to displacement of the module group X+2. At the moment t25, the total displacement of each module group is equal to S2. Similar to the page sliding effect shown in FIG. 5A, compared with the moment t21, at the moment t22 (and compared with the moment t22, at the moment t23), a displacement difference between the module group X and the module group X+1 increases, and a displacement difference between the module group X+1 and the module group X+2 increases, so that forward intervals $F_{(X, X+1)}$ and $F_{(X+1, X+2)}$ in the direction 2 decrease, and reverse intervals $B_{(X, X+1)}$ and $B_{(X+1, X+2)}$ in an opposite direction of the direction 2 increase. Compared with the moment t23, at the moment t24 (and compared with the moment t24, at the moment t25), the displacement difference between the module group X and the module group X+1 increases, and the displacement difference between the module group X+1 and the module group X+2 increases, so that the forward intervals $F_{(X, X+1)}$ and $F_{(X+1, X+2)}$ increase, and the reverse intervals $B_{(X, X+1)}$ and $B_{(X+1, X+2)}$ decrease. At the moment t25, the forward intervals $F_{(X, X+1)}$ and $F_{(X+1, X+2)}$ increase to initial values of the forward intervals, and the reverse intervals $B_{(X, X+1)}$ and $B_{(X+1, X+2)}$ decrease to initial values of the reverse intervals. At the moment t25, total displacement of the page modules shown in FIG. 5B in the direction 2 is all S2. After the moment t25, the page modules shown in FIG. 5B all stop sliding.

In some embodiments of this application, the user may change a sliding direction of a page module in a process of controlling the page module to slide.

Figure 5C:
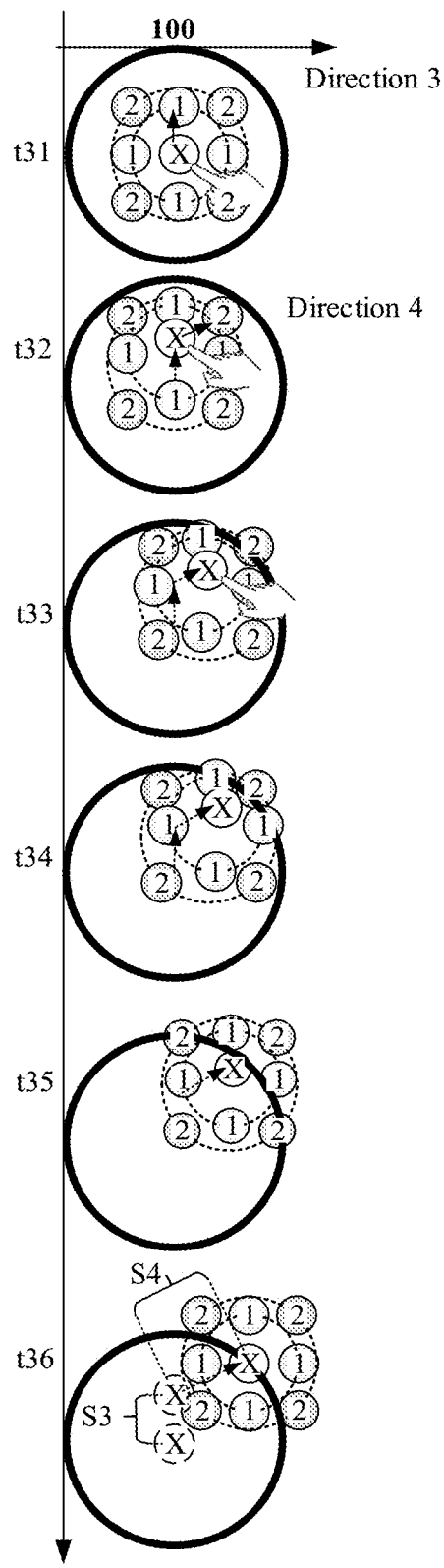
FIG. 5C is a schematic diagram of a non-cross-boundary page sliding effect of changing a sliding direction according to an embodiment of this application.

For example, as shown in FIG. 5C, from a moment t31 to a moment t32, the user's finger slides by S3 on the display screen 194 in a direction 3 by using an area in which the page module X is located as a start point. After detecting a sliding operation performed on the module group X, the electronic device 100 controls each module group on the page 12 to slide by S3 in the direction 3. In addition, at the moment t32, the user's finger changes a sliding direction to a direction 4. From the moment t32 to a moment t33, the user's finger continues to slide in the direction 4 by pressing the module group X. After detecting a sliding operation performed on the module group X, the electronic device 100 controls all page modules on the page 12 to slide by S4 in the direction 4 after sliding by S3 in the direction 3.

As shown in FIG. 5C, from the moment t31 to a moment t36, the module group X, the module group X+1, and the module group X+2 first slide by S3 in the direction 3, and then slide by S4 in a direction 4. Compared with the moment t31, at the moment t32, a displacement difference between the module group X and the module group X+1 in the direction 3 increases, and a displacement difference between the module group X+1 and the module group X+2 in the direction 3 increases, so that forward intervals $F_{(X, X+1)}$ and $F_{(X+1, X+2)}$ in the direction 3 decrease from an initial distance, and reverse intervals $B_{(X, X+1)}$ and $B_{(X+1, X+2)}$ in an opposite direction of the direction 3 increase from an initial distance. At the moment t32, displacement of the module group X is equal to S3. Compared with the moment t32, at the moment t33 (and compared with the moment t33, at the moment t34), a displacement difference between the module group X and the module group X+1 in the direction 4 increases, and a displacement difference between the module group X+1 and the module group X+2 in the direction 4 increases, so that forward intervals $F_{(X, X+1)}$ and $F_{(X+1, X+2)}$ in the direction 4 decrease, and reverse intervals $B_{(X, X+1)}$ and $B_{(X+1, X+2)}$ in the direction 4 increase. Compared with the moment t34, at the moment t35 (and compared with the moment t35, at the moment t36), the displacement difference between the module group X and the module group X+1 in the direction 4 decreases, and the displacement difference between the module group X+1 and the module group X+2 in the direction 4 decreases, so that the forward intervals $F_{(X, X+1)}$ and $F_{(X+1, X+2)}$ in the direction 4 increase, and the reverse intervals $B_{(X, X+1)}$ and $B_{(X+1, X+2)}$ in the direction 4 decrease. At the moment t36, the forward intervals $F_{(X, X+1)}$ and $F_{(X+1, X+2)}$ in the direction 4 increase to initial values of the forward intervals, the reverse intervals $B_{(X, X+1)}$ and $B_{(X+1, X+2)}$ in the direction 4 decrease to initial values of the reverse intervals, and displacement of the page modules shown in FIG. 5C in the direction 4 is all S4. After the moment t36, the page modules shown in FIG. 5C all stop sliding.

In some embodiments of this application, after detecting that the user stops the sliding operation, the electronic device 100 controls the module group X to stop sliding, and determines that current displacement of the module group X is the total displacement of each module group.

Figure 5D:
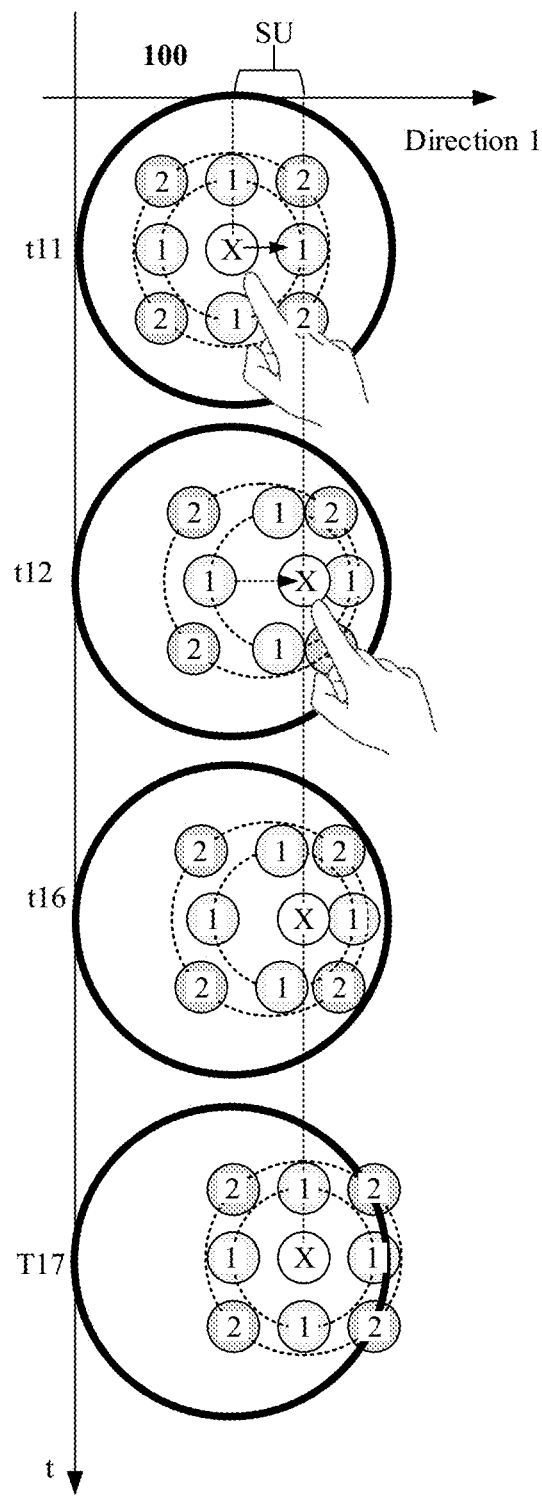
FIG. 5D is a schematic diagram of another non-cross-boundary page sliding effect in a front right direction according to an embodiment of this application.

For example, as shown in FIG. 5D, a moment t16 and a moment t17 are further included after the moment t12. For a motion law of each module group from the moment t11 to the moment t12, refer to FIG. 5A. At the moment t12, displacement of the module group X is equal to SU, and displacement of the module group X+1 and the module group X+2 is less than SU. After the moment t12, the user releases a hand to stop sliding, the module group X also stops sliding, and the module group X+1 and the module group X+2 continue to slide to the displacement SU in the direction 1. Compared with the moment t12, at the moment t16, the displacement difference between the module group X and the module group X+1 decreases, the forward intervals $F_{(X, X+1)}$ and $F_{(X+1, X+2)}$ in the direction 1 increase, and the reverse intervals $B_{(X, X+1)}$ and $B_{(X+1, X+2)}$ in the direction 1 decrease. Compared with the moment t16, at the moment t17, the displacement difference between the module group X and the module group X+1 continues to decrease to zero, the forward intervals $F_{(X, X+1)}$ and $F_{(X+1, X+2)}$ in the direction 1 continue to increase to the initial value of each forward interval, and the reverse intervals $B_{(X, X+1)}$ and $B_{(X+1, X+2)}$ in the direction 1 continue to decrease to the initial value of each reverse interval. At the moment t17, a velocity of each module group decreases to 0 and each module group stops sliding, and the total displacement of each module is equal to SU. Refer to FIG. 5A to FIG. 5D. In the page sliding effects provided in embodiments of this application, a forward interval between module groups in a sliding direction of the user's finger is first compressed and then restored to an initial value, and a reverse interval between the module groups in an opposite direction of the sliding direction of the user's finger is stretched and then restored to an initial value, so that a dynamic effect similar to stretching and compression of a spring is presented, thereby increasing dynamic feedback on a sliding operation of the user, improving interestingness of the sliding operation, and effectively improving user experience.

By using FIG. 5A and FIG. 5D as examples, the following further describes a motion law of each module group in non-rebounding page sliding effects.

It should be noted that, a time difference occurs from a moment when the user's finger starts sliding on the display screen to a moment when the electronic device 100 detects a sliding operation and controls the module group X to start sliding (for ease of description, the time difference is referred to as a detection delay for short). As a result, a sliding start moment of the module group X is later than a sliding start moment of the user's finger.

It should be noted that the foregoing detection delay is usually very small. From a perspective of the user, the module group X starts sliding synchronously with the user's finger.

Figure 5E:
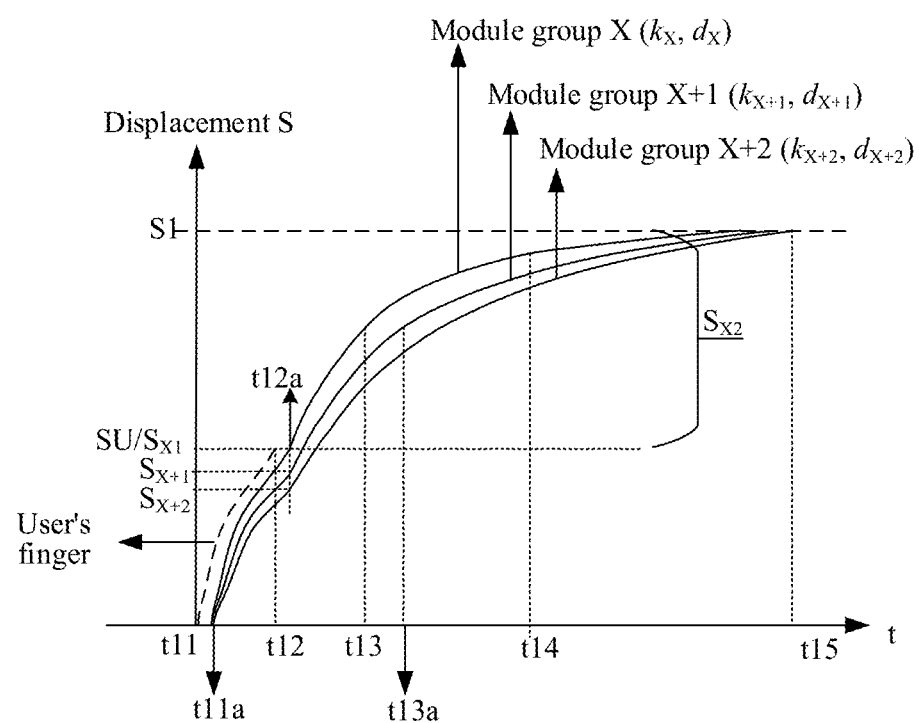
FIG. 5E to FIG. 5G are schematic curve diagrams of displacement changes of non-cross-boundary page modules according to an embodiment of this application.
Figure 5F:
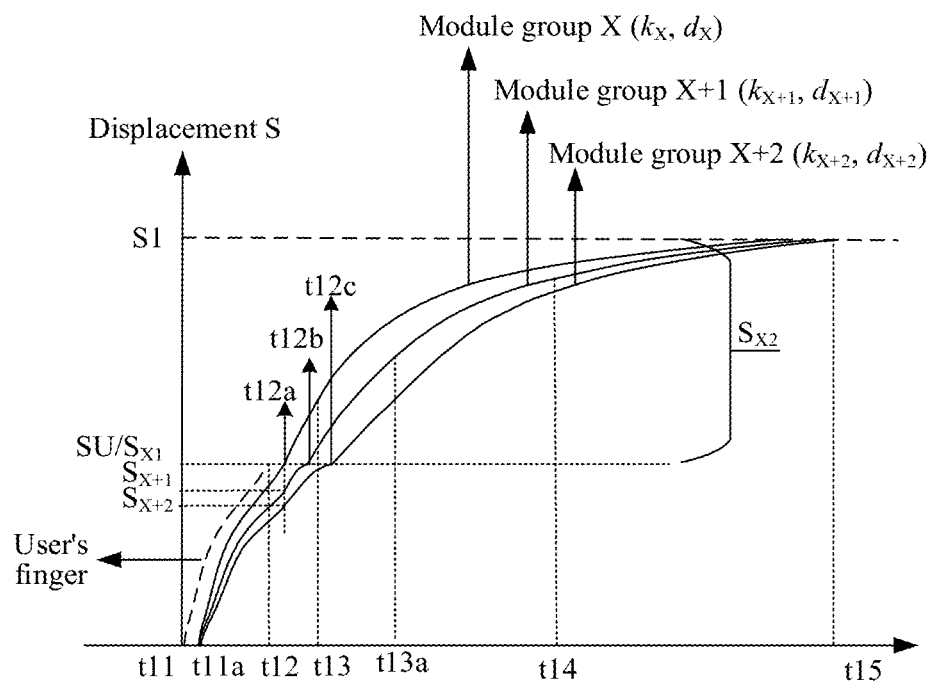

For example, FIG. 5E and FIG. 5F are two displacement curve diagrams of each module group in FIG. 5A according to an embodiment of this application.

As shown in FIG. 5E, at the moment t11, the user's finger starts sliding on the display screen 194 by using the area in which the module group X is located as the start point. In response to a detected sliding operation, the electronic device 100 controls, based on displacement SU of the foregoing sliding operation detected in real time in the direction 1, the module group X to start sliding following the user's finger at a moment t11a. At the moment t12, the user's finger stops sliding. In this case, displacement of the user's finger in a sliding direction of the module group is SU. At a moment t12a, in response to a detected sliding operation, the electronic device 100 controls the module group X to slide to $S_{X1}$, where $S_{X1}$ is equal to total displacement SU of the user's finger; and in response to detecting that the user stops the foregoing sliding operation, the electronic device 100 determines, based on at least one of a sliding velocity of the foregoing sliding operation, a friction model, and a limited distance of a limit layout manner, displacement $S_{X2}$ of the module group X after the moment t12a and total displacement S1 of the module group X after the moment t11a. After the moment t12a, the electronic device 100 controls the module group X to slide within the displacement $S_{X2}$ based on a preset motion law. In some embodiments, the total displacement S1 is less than maximum displacement Smax of a page module at the moment t11.

Figure 5G:
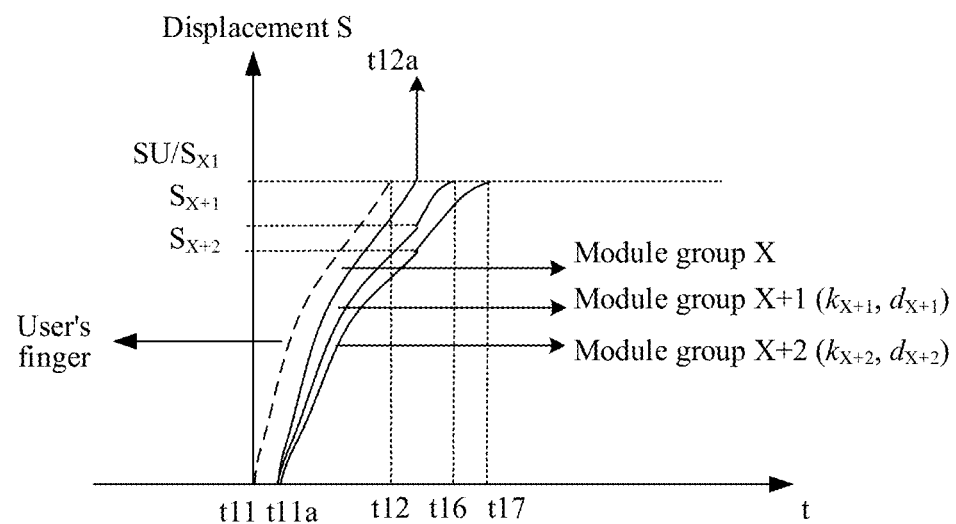

It may be understood that, before detecting that the user stops the sliding operation, the displacement of the module group X is equal to the displacement of the user's finger in the sliding direction of the module group that is detected by the electronic device 100. A displacement curve of the module group X from the moment t11a to the moment t12a is translation of a displacement curve of the user's finger from the moment t11 to the moment t12. It should be noted that the displacement curve of the user's finger in the sliding direction of the module group from the moment t11 to the moment t12 may be a regular linear curve (for example, a constant velocity curve or an acceleration curve), may be an irregular curve. For example, FIG. 5F and FIG. 5G are displacement curve diagrams of irregular motion of a user's finger from the moment t11 to the moment t12 according to an embodiment of this application.

In some embodiments, from the moment t11a to the moment t12a, the electronic device 100 controls, based on the displacement of the module group X, the module group X+1 and the module group X+2 to slide based on a preset motion law. For example, the electronic device 100 determines displacement Δsx of the module group X in a second refresh periodicity, and controls, based on Δsx, the module group X+1 and the module group X+2 to slide in a first refresh periodicity based on the preset motion law, to implement a sliding effect in which a displacement difference between adjacent module groups becomes larger from the moment t11a to the moment t12a. In other words, in the first refresh periodicity, displacement of the module group X+1 is less than Δsx, and displacement of the module group X+2 is less than the displacement of the module group X+1. The second refresh periodicity is a previous refresh periodicity of the first refresh periodicity.

In FIG. 5E and FIG. 5F, sliding start moments of the module groups are the same; or other module groups start sliding one refresh periodicity later than the module group X. Because a refresh periodicity is very small, it is not shown in the figure. From the perspective of the user, it may be considered that the other module groups start sliding together with the module group X. For example, a refresh frequency is 120 Hz, and a refresh periodicity is 8.3 ms.

In this embodiment of this application, after the module group X slides to the displacement $S_{X1}$, the module group X+1 and the module group X+2 have two sliding manners, namely, a sliding manner 1 and a sliding manner 2.

In the sliding manner 1, refer to FIG. 5E. At the moment t12a, displacement of the module group X increases to the displacement $S_{X1}$, displacement of the module group X+1 increases to $S_{X+1}$, and displacement of the module group X+2 increases to $S_{X+2}$, where $S_{X+1}$ is less than $S_{X1}$, and $S_{X+2}$ is less than $S_{X+1}$. The electronic device 100 determines the displacement $S_{X2}$ of the module group X after the moment t12a and the total displacement S1 of the module group X after the moment t11a, and determines, based on the total displacement S1 of the module group X, that displacement of the module group X+1 after the moment t12a is $S1-S_{X+1}$ and displacement of the module group $_{X+2}$ after the moment t12a is $S1-S_{X+2}$. After the moment t12a, the electronic device 100 controls the module group X+1 to slide within the displacement $S1-S_{X+1}$ based on a preset motion law, and controls the module group X+2 to slide within the displacement $S1-S_{X+2}$ based on the preset motion law, to implement a sliding effect in which a displacement difference between adjacent module groups first increases and then decreases to 0 from the moment t12a to the moment t15 shown in FIG. 5E.

In the sliding manner 2, refer to FIG. 5F. At the moment t12a, displacement of the module group X increases to $S_{X1}$, and after the moment t12a, the electronic device 100 controls the module group X+1 and the module group X+2 to slide based on a preset motion law by using $S_{X1}$ as target displacement. At a moment t12b, displacement of the module group X+1 increases to $S_{X1}$, and after the moment t12b, the electronic device 100 controls the module group X+1 to slide within the displacement $S_{X2}$ based on the preset motion law; and at a moment t12c, the displacement of the module group X+2 increases to $S_{X1}$, and after the moment t12c, the electronic device 100 controls the module group X+1 to slide within the displacement $S_{X2}$ based on the preset motion law, to implement a sliding effect in which a displacement difference between adjacent module groups first increases and then decreases to 0 from the moment t12a to the moment t15 shown in FIG. 5F.

In some embodiments of this application, the electronic device 100 constructs a virtual spring model, so that a motion law of each module group simulates an elastic force motion law of a spring. A stiffness coefficient and a damping coefficient are set for the foregoing virtual spring model. It may be understood that, a parameter of the spring includes a damping coefficient and a stiffness coefficient. Under different damping coefficients and/or stiffness coefficients, elastic force motion of the spring includes a critical damping state, an overdamping state, and an underdamping state. Therefore, in this embodiment of this application, by adjusting the stiffness coefficient and the damping coefficient of the virtual spring model, so that a module group can simulate an elastic force motion law in the critical damping state, an elastic force motion law in the overdamping state, or an elastic force motion law in the underdamping state.

For example, the foregoing preset motion law in FIG. 5E and FIG. 5F is an elastic force motion law in in a critical damping state. The module group simulates an elastic force motion law in the critical damping state, in other words, a change law of displacement S of the module group conforms to a change law of a deformation of the spring in the critical damping state. As shown in the figures, stiffness coefficients of the module group X, the module group X+1, and the module group X+2 are represented as $k_X$, $k_{X+1}$, and $k_{X+2}$ respectively, and damping coefficients of module group X, the module group X+1, and the module group X+2 are represented as $d_X$, $d_{X+1}$, and $d_{X+2}$. Refer to FIG. 5E and FIG. 5F. The electronic device 100 may adjust the damping coefficient and/or the stiffness coefficient of each module group, so that the damping coefficient and/or the stiffness coefficient of the module group X are/is largest, and a damping coefficient and/or a stiffness coefficient of a module group farther away from the module group X are/is smaller. In this way, the module group X, the module group X+1, and the module group X+2 present displacement change trends in the critical damping state in FIG. 5E and FIG. 5F, so that the module group X, the module group X+1, and the module group X+2 present a dynamic effect shown in FIG. 5A in a sliding process, that is, a page sliding effect in which a forward interval between module groups in a sliding direction of the user's finger is first compressed and then restored to an initial value and a reverse interval is first stretched and then restored to an initial value.

Specifically, in some embodiments, as shown in FIG. 5E, from the moment t11a to the moment t12a, an initial velocity and an average velocity of the module group X are respectively greater than an initial velocity and an average velocity of the module group X+1, and the initial velocity and the average velocity of the module group X+1 are respectively greater than an initial velocity and an average velocity of the module group X+2. After it is detected that the user stops the sliding operation, from the moment t12a to the moment t15, a velocity of each module group gradually decreases to 0, and a reverse acceleration of each module group gradually decreases. From the moment t12a to the moment t13, a velocity of the module group X is greater than a velocity of the module group X+1, and the velocity of the module group X+1 is greater than a velocity of the module group X+2; and a reverse acceleration of the module group X is greater than or equal to a reverse acceleration of the module group X+1, and the reverse acceleration of the module group X+1 is greater than or equal to a reverse acceleration of the module group X+2. From the moment t12 to the moment t13, a displacement difference between the module group X and the module group X+1 gradually increases, so that a forward interval $F_{(X, X+1)}$ between the module group X and the module group X+1 decreases, and a reverse interval $B_{(X, X+1)}$ increases. At the moment t13, the velocity of the module group X is equal to the velocity of the module group X+1. From the moment t13 to the moment t15, the velocity of the module group X is less than or equal to the velocity of the module group X+1, and the displacement difference between the module group X and the module group X+1 gradually decreases, so that the forward interval $F_{(X, X+1)}$ gradually increases to an initial value of the forward interval. and the reverse interval $B_{(X, X+1)}$ gradually decreases to an initial value of the reverse interval. From the moment t12 to a moment t13a, the velocity of the module group X+1 is greater than the velocity of the module group X+2, and the displacement difference between the module group X+1 and the module group X+2 gradually increases, so that a forward interval $F_{(X+1, X+2)}$ decreases, and a reverse interval $B_{(X+1, X+2)}$ increases. At the moment t13a, the velocity of the module group X+1 is equal to the velocity of the module group X+2. From the moment t13a to the moment t15, the velocity of the module group X+1 is less than or equal to the velocity of the module group X+2, and the displacement difference between the module group X+1 and the module group X+2 gradually decreases, so that the forward interval $F_{(X+1, X+2)}$ between the module group X+1 and the module group X+2 increases to an initial value, and the reverse interval $B_{(X+1, X+2)}$ decreases to an initial value. The moment t13a is equal to or later than the moment t13.

It should be noted that, because a refresh periodicity is very small, in the foregoing second refresh periodicity, displacement of the module group X+1 and the module group X+2 is usually less than the foregoing Δsx. In addition, the electronic device 100 adjusts the damping coefficient and/or the stiffness coefficient of the module group X+2 to be less than the damping coefficient and/or the stiffness coefficient of the module group X+1, so that the displacement of the module group X+2 in the second refresh periodicity can be less than the displacement of the module group X+1.

In this embodiment of this application, in addition to the elastic force motion law, the electronic device 100 may further control each module group to implement the sliding effect shown in FIG. 5A by using another motion law. This is not specifically limited herein.

It should be noted that, in this embodiment of this application, a reverse acceleration refers to an acceleration in an opposite direction of a sliding direction of a page module, and a value of the reverse acceleration is greater than or equal to zero. The reverse acceleration may also be considered as an absolute value of the acceleration of the page module.

In addition, in this embodiment of this application, page modules may or may not overlap. In some embodiments, the electronic device 100 may set a maximum displacement difference, a minimum forward interval, or a minimum reverse interval of adjacent module groups, to avoid overlapping between the page modules in a page sliding process.

For example, FIG. 5G is a displacement curve diagram of each module group in FIG. 5D according to an embodiment of this application.

As shown in FIG. 5G, for a curve change before the moment t12, refer to FIG. 5E.

Details are not described herein again. At the moment t12, the user's finger stops sliding. In this case, displacement of the user's finger in a sliding direction of the module group is SU. At a moment t12a, in response to a detected sliding operation, the electronic device 100 controls the module group X to continue to slide to displacement $S_{X1}$, where $S_{X1}$ is equal to total displacement SU of the user's finger in the direction 1; and in response to detecting that the user stops the foregoing sliding operation, the electronic device 100 controls the module group X to stop sliding. After the moment t12a, the electronic device 100 controls the module group X+1 and the module group X+2 to slide based on a preset motion law by using $S_{X1}$ as target displacement. In some embodiments, the foregoing preset motion law is an elastic force motion law in a critical damping state, and a damping coefficient and/or a stiffness coefficient of a module group farther away from the module group X are/is smaller.

Not limited to curves shown in FIG. 5E to FIG. 5G, displacement change trends of the module group X, the module group X+1, and the module group X+2 within the total displacement S1 in FIG. 5A may also meet other curves. Not limited to curves shown in FIG. 5G, displacement change trends of the module group X+1 and the module group X+2 within the displacement SU in FIG. 5D may also meet other curves. Alternatively, the foregoing preset law may be another motion law. In the foregoing preset law, a displacement change trend of each module group may be a linear change or another non-linear change, and the displacement change trend of each module group may be continuous or discontinuous. This is not specifically limited herein.

It should be noted that "from a moment 1 to a moment 2" in embodiments of this application does not include the moment 1 and the moment 2. For example, "from the moment t11 to the moment t15" does not include the moment t11 and the moment t15.

In some embodiments of this application, there is a time difference between sliding start moments of the module groups. The electronic device 100 detects a sliding operation performed on the module group X in a direction 1, and the electronic device 100 controls each page module to slide in the direction 1 in response to the foregoing sliding operation. There is a time difference between sliding start moments of adjacent module groups, where a module group close to the module group X first slides.

Figure 6A:
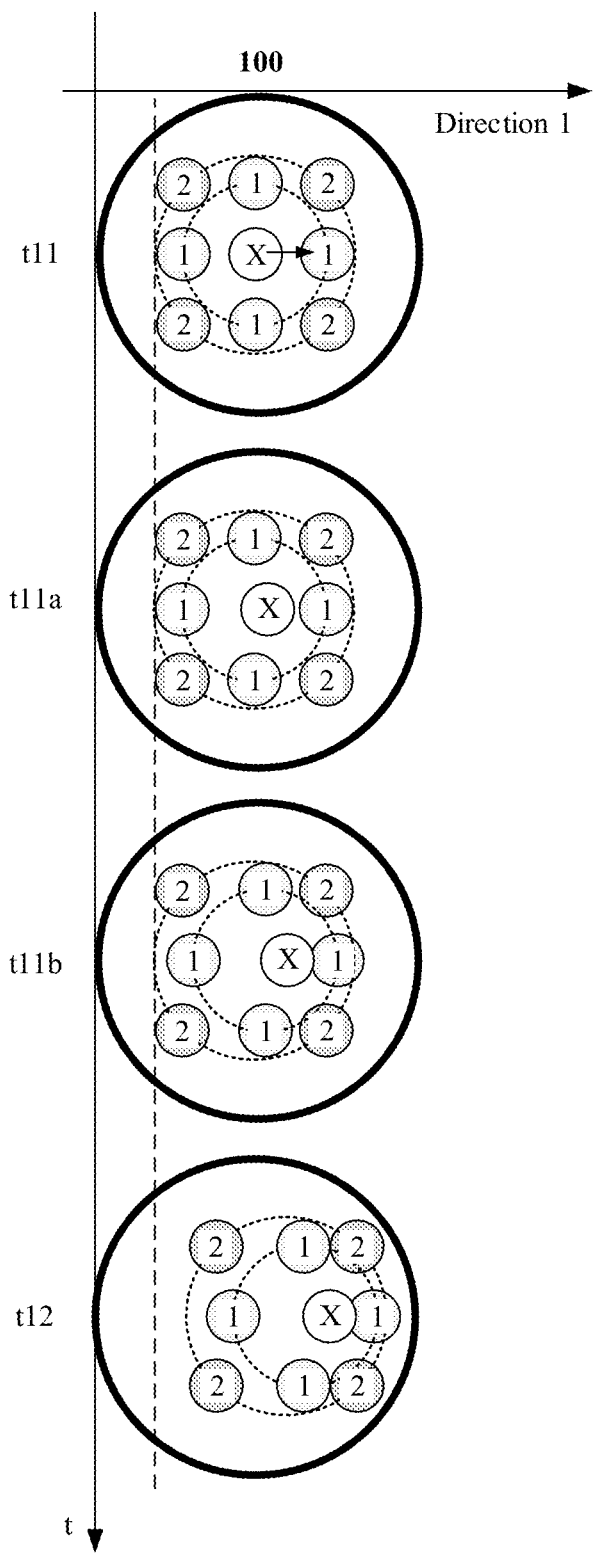
FIG. 6A shows a page sliding effect of a sliding start time difference according to an embodiment of this application.

For example, as shown in FIG. 6A, a moment t16 and a moment t17 may be further included between the moment t11 and the moment t12. The electronic device 100 detects the sliding operation performed on the module group X in the direction 1, and the electronic device 100 controls each page module to slide in the direction 1. From the moment t11 to the moment t16, the module group X slides in the direction 1, and positions of the module group X+1 and the module group X+2 remain unchanged. Compared with the moment t11, at the moment t16, a displacement difference between the module group X and the module group X+1 increases, and displacement of the module group X+1 and the module group X+2 is equal to 0, so that a forward interval $F_{(X, X+1)}$ between the module group X and the module group X+1 decreases, and a reverse interval $B_{(X, X+1)}$ increases; and a forward interval $F_{(X+1, X+2)}$ and a reverse interval $B_{(X+1, X+2)}$ between the module group X+1 and the module group X+2 remain unchanged. From the moment t16 to the moment t17, the module group X continues to slide in the direction 1, the module group X+1 also starts sliding in the direction 1, and the position of the module group X+2 remains unchanged. Compared with the moment t16, at the moment t17, the displacement difference between the module group X and the module group X+1 continues to increase, and a displacement difference between the module group X+1 and the module group X+2 also increases, so that the forward interval $F_{(X, X+1)}$ between the module group X and the module group X+1 continues to decrease, and the reverse interval $B_{(X, X+1)}$ continues to increase; and the forward interval $F_{(X+1, X+2)}$ between the module group X+1 and the module group X+2 also decreases, and the reverse interval $B_{(X+1, X+2)}$ also increases. From the moment t17 to the moment t12, the module group X and the module group X+1 continue to slide in the direction 1, and the module group X+2 also starts sliding in the direction 1. A sliding start moment difference between the module group X and the module group X+1 is $\Delta t_1$, namely, a time difference between the moment t11 and the moment t16. A sliding start moment difference between the module group X+1 and the module group X+2 is $\Delta t_2$, namely, a time difference between the moment t16 and the moment t17.

$\Delta t_1$ and $\Delta t_2$ may be set by the electronic device 100 by default, or may be preset by the user, or may be determined by the electronic device 100 based on a sliding velocity of a sliding operation. In addition, $\Delta t_1$ and $\Delta t_2$ may be equal, or may not be equal. This is not specifically limited herein. In an embodiment, a greater sliding velocity of the sliding operation indicates smaller $\Delta t_1$ and $\Delta t_2$.

In some embodiments of this application, there may alternatively be no time difference between sliding start moments of the module groups. The electronic device 100 detects a sliding operation performed on the module group X in a direction 1, and the electronic device 100 controls each module group to simultaneously slide in the direction 1 in response to the foregoing sliding operation.

In this embodiment of this application, by using the page sliding effect shown in FIG. 5A as an example, sliding stop moments of the module groups include the following three cases: (1) The sliding stop moments of the module groups are the same. For example, the module groups in FIG. 5E and FIG. 5F simultaneously stop sliding at the moment t15. (2) There is a time difference between sliding stop moments of adjacent module groups, the module group X first stops sliding, and a module group farther away from the module group X stops sliding later. For example, in FIG. 5E and FIG. 5F, the module group X+2 stops sliding at the moment t15, and the module group X and the module group X+1 stop sliding before the moment t15. (3) There is a time difference between sliding stop moments of adjacent module groups, the module group X stops sliding at the latest, and a module group farther away from the module group X stops sliding earlier. For example, in FIG. 5E and FIG. 5F, the module group X stops sliding at the moment t15, and the module group X+1 and the module group X+2 stop sliding before the moment t15. The foregoing case (2) is used as an example in the following for further description.

In some embodiments of this application, there is a time difference between sliding stop moments of the module groups. The electronic device 100 detects a sliding operation performed on the module group X in a direction 1, and the electronic device 100 controls each page module to slide in the direction 1 in response to the foregoing sliding operation. There is a time difference between sliding stop moments of adjacent module groups, where the module group X stops sliding at the earliest, and a module group closer to the module group X in other module groups slides earlier.

Figure 6B:
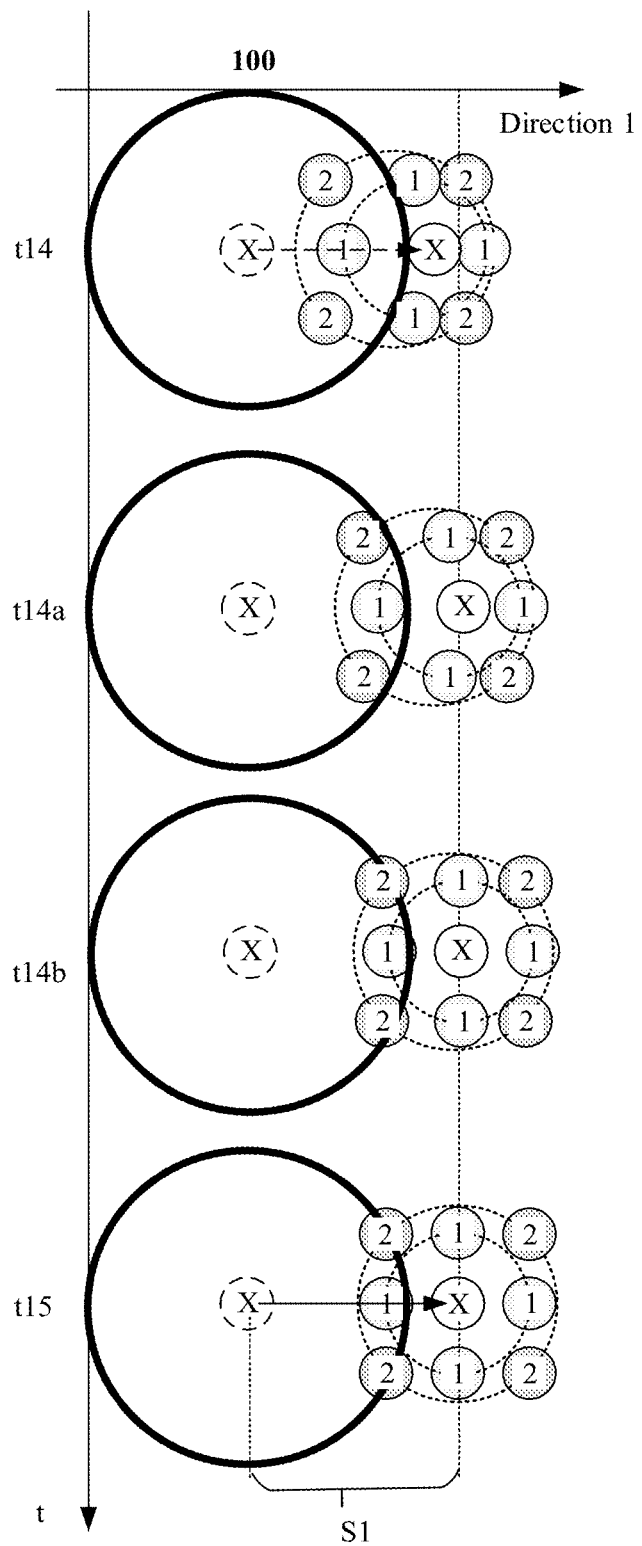
FIG. 6B shows a page sliding effect of a sliding stop time difference according to an embodiment of this application.

For example, as shown in FIG. 6B, a moment t18 and a moment t19 are further included between the moment t14 and the moment t15. The electronic device 100 detects the sliding operation performed on the module group X in the direction 1, and the electronic device 100 controls each page module to slide in the direction 1. From the moment t14 to the moment t18, each module group slides in the direction 1, a displacement difference between the module group X and the module group X+1 decreases, and a displacement difference between the module group X+1 and the module group X+2 also decreases, so that a forward interval $F_{(X, X+1)}$ between the module group X and the module group X+1 increases, and a reverse interval $B_{(X, X+1)}$ decreases; and a forward interval $F_{(X+1, X+2)}$ between the module group X+1 and the module group X+2 also increases, and a reverse interval $B_{(X+1, X+2)}$ also decreases. From the moment t18 to the moment t19, the module group X stops sliding, the module group X+1 and the module group X+2 continue to slide in the direction 1, the displacement difference between the module group X and the module group X+1 continues to decrease to 0, and the displacement difference between the module group X+1 and the module group X+2 also continues to decrease, so that at the moment t19, the forward interval $F_{(X, X+1)}$ between the module group X and the module group X+1 increases to an initial value of the forward interval, and the reverse interval $B_{(X, X+1)}$ decreases to an initial value of the reverse interval; and the forward interval $F_{(X+1, X+2)}$ between the module group X+1 and the module group X+2 also increases, and the reverse interval $B_{(X+1, X+2)}$ also decreases. From the moment t19 to the moment t15, positions of the module group X and the module group X+1 remain unchanged, the module group X+2 continues to slide in the direction 1, the displacement difference between the module group X and the module group X+1 is equal to 0, and the displacement difference between the module group X+1 and the module group X+2 continues to decrease to 0, so that both the forward interval $F_{(X, X+1)}$ and the reverse interval $B_{(X, X+1)}$ between the module group X and the module group X+1 remain unchanged; and the forward interval $F_{(X+1, X+2)}$ between the module group X+1 and the module group X+2 increases to an initial value of the forward interval, and the reverse interval $B_{(X+1, X+2)}$ decreases to an initial value of the reverse interval. A sliding stop moment difference between the module group X and the module group X+1 is $\Delta t_3$, namely, a time difference between the moment t18 and the moment t19. A sliding stop moment difference between the module group X+1 and the module group X+2 is $\Delta t_4$, namely, a time difference between the moment t19 and the moment t15.

$\Delta t_3$ and $\Delta t_4$ may be set by the electronic device 100 by default, or may be preset by the user, or may be determined by the electronic device 100 based on another manner. $\Delta t_3$ and $\Delta t_4$ may be equal, or may not be equal. This is not specifically limited herein.

In some embodiments of this application, there is a time difference between sliding start moments of the module groups, and there is also a time difference between sliding stop moments of the module groups. For example, FIG. 6C is another displacement curve diagram of each module group in FIG. 5A according to an embodiment of this application.

Figure 6C:
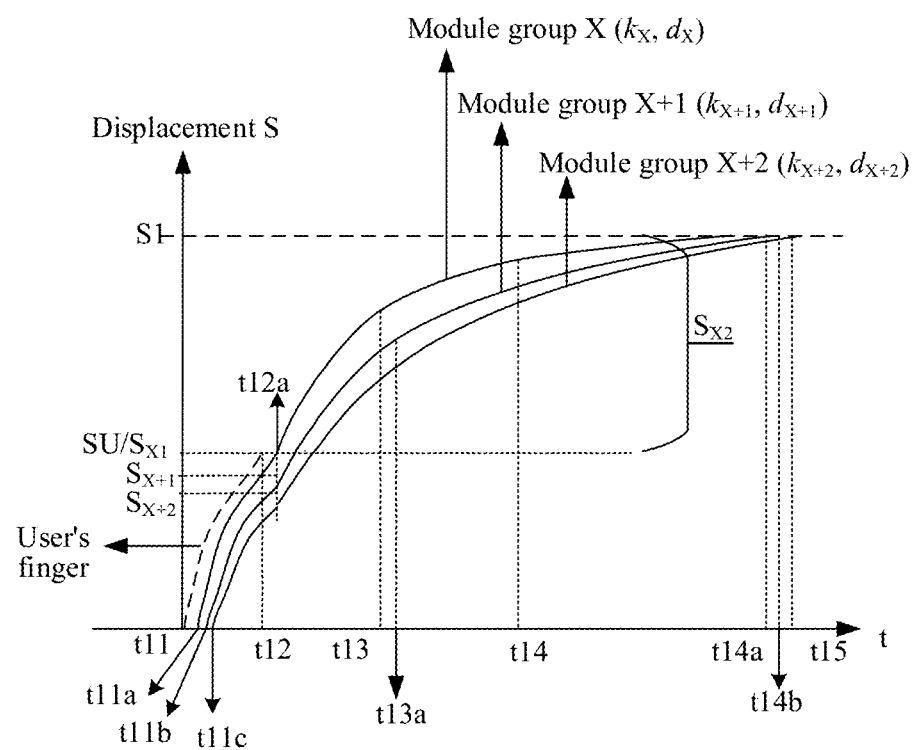
FIG. 6C is a schematic curve diagram of a displacement change of setting a sliding start time difference and a sliding stop time difference according to an embodiment of this application.

As shown in FIG. 6C, in response to a detected sliding operation, the electronic device 100 controls, based on displacement SU of the sliding operation detected in real time, the module group X to start sliding at a moment t11a; controls, at a moment tub separated by $\Delta t_1$ from the moment t11a based on displacement of the module group X, the module group X+1 to slide based on an elastic force motion law; and controls, at a moment t11c separated by $\Delta t_2$ from the moment t11b based on the displacement of the module group X, the module group X+2 to slide based on the elastic force motion law. After it is detected that the user stops the sliding operation, for sliding manners of the module group X+1 and the module group X+2, refer to the foregoing sliding manner 1 and sliding manner 2. Details are not described herein again. As shown in FIG. 6C, the electronic device 100 controls the module group X to stop sliding at a moment t14a; controls the module group X+1 to stop sliding at a moment t14b separated by $\Delta t_3$ from the moment t14a; and controls the module group X+2 to stop sliding at a moment t15 separated by $\Delta t_4$ from the moment t14b. $\Delta t_1$ and $\Delta t_2$ may be equal, or may not be equal; and $\Delta t_3$ and $\Delta t_4$ may be equal, or may not be equal. This is not specifically limited herein.

In an embodiment, in FIG. 6C, a damping coefficient and/or a stiffness coefficient of the module group X are/is largest, and a damping coefficient and/or a stiffness coefficient of a module group farther away from the module group X are/is smaller. In an embodiment, in FIG. 6C, damping coefficients and stiffness coefficients of all module groups are equal. When there is the time difference between the sliding start moments of the module groups, a dynamic sliding effect shown in FIG. 5A can be implemented in both the foregoing two embodiments.

2. Non-Cross-Boundary Rebounding Page Sliding Effect

Figure 7A:
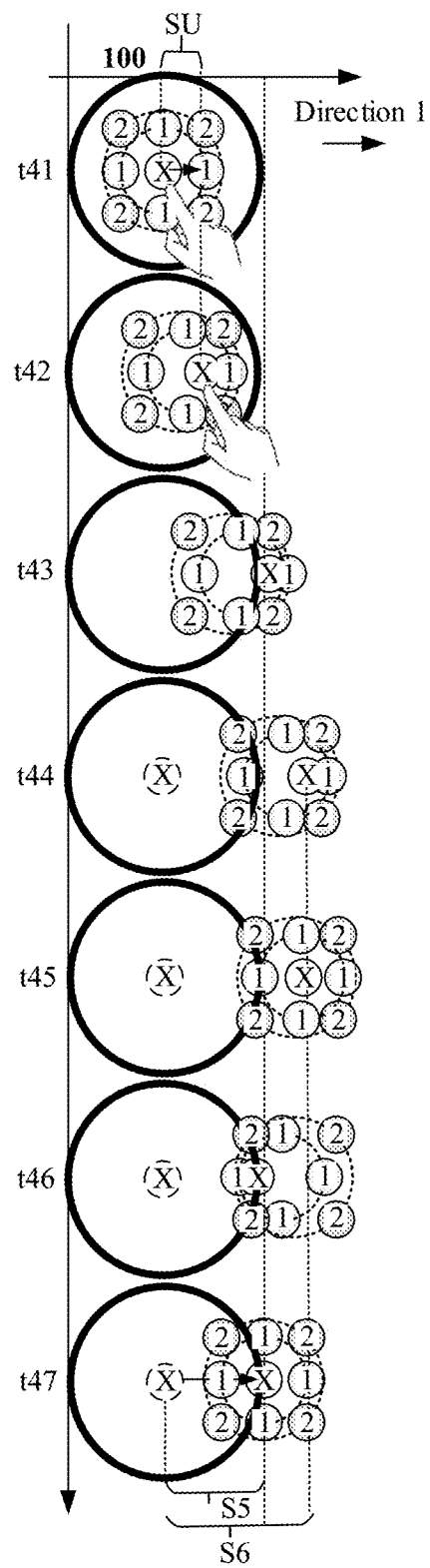
FIG. 7A is a schematic diagram of a non-cross-boundary page-rebounding page sliding effect according to an embodiment of this application.

First, the non-cross-boundary rebounding page sliding effect provided in embodiments of this application is described by using a page sliding effect shown in FIG. 7A. In FIG. 7A, a boundary is not crossed in a page sliding process, that is, total displacement of each module group is less than or equal to maximum displacement.

In embodiments of this application, a page module may rebound at least once in the sliding process. FIG. 7A shows an example of a page sliding effect with one rebound.

As shown in FIG. 7A, from a moment t41 to a moment t42, the user's finger slides by SU on the display screen 194 in a direction 1 by using an area in which the page module X is located as a start point. After detecting a sliding operation performed on the module group X, the electronic device 100 controls total displacement of each module group on the page 12 in the direction 1 to be S5. From the moment t41 to a moment t44, each page module is controlled to slide in the direction 1, displacement of the module group X is greater than displacement of the module group X+1, and the displacement of the module group X+1 is greater than displacement of the module group X+2. Compared with the moment t41, at the moment t42 (and compared with the moment t42, at the moment t43), a displacement difference between the module group X and the module group X+1 increases, and a displacement difference between the module group X+1 and the module group X+2 also increases, so that forward intervals $F_{(X, X+1)}$ and $F_{(X+1, X+2)}$ in the direction 1 decrease, and reverse intervals $B_{(X, X+1)}$ and $B_{(X+1, X+2)}$ in the direction 1 increase. Compared with the moment t43, at the moment t44, the displacement difference between the module group X and the module group X+1 decreases, and the displacement difference between the module group X+1 and the module group X+2 also decreases, so that the forward intervals $F_{(X, X+1)}$ and $F_{(X+1, X+2)}$ in the direction 1 increase, and the reverse intervals $B_{(X, X+1)}$ and $B_{(X+1, X+2)}$ in the direction 1 decrease. At the moment t44, the displacement of the module group X in the direction 1 is S6. From the moment t44 to a moment t47, the module group X is controlled to slide in an opposite direction of the direction 1. Compared with the moment t44, at the moment t45, the displacement difference between the module group X and the module group X+1 decreases to 0, and the displacement difference between the module group X+1 and the module group X+2 also decreases. Compared with the moment t45, at the moment t46, the displacement difference between the module group X and the module group X+1 increases, and the displacement difference between the module group X+1 and the module group X+2 also increases, so that the forward interval $F_{(X, X+1)}$ in the direction 1 increases, and the reverse intervals $B_{(X, X+1)}$ in the direction 1 decreases. Compared with the moment t46, at the moment t47, the displacement difference between the module group X and the module group X+1 decreases to 0, and the displacement difference between the module group X+1 and the module group X+2 also decreases to 0, so that the forward intervals in the direction 1 increase to initial values of the forward intervals, and the reverse intervals in the direction 1 decrease to initial values of the reverse intervals. At the moment t47, total displacement of the page modules shown in FIG. 7A in the direction 1 is all S5, where S5 is less than S6. After the moment t47, the page modules shown in FIG. 7A all stop sliding.

It can be learned from FIG. 7A that, in the page sliding process, displacement of the module group X, the module group X+1, and the module group X+2 rebounds to the total displacement S5 after exceeding the total displacement S5.

Not limited to the one rebound shown in FIG. 7A, the electronic device 100 may control each page module to perform page rebounds for a plurality of times by using the total displacement S5 as target displacement.

Figure 7B:
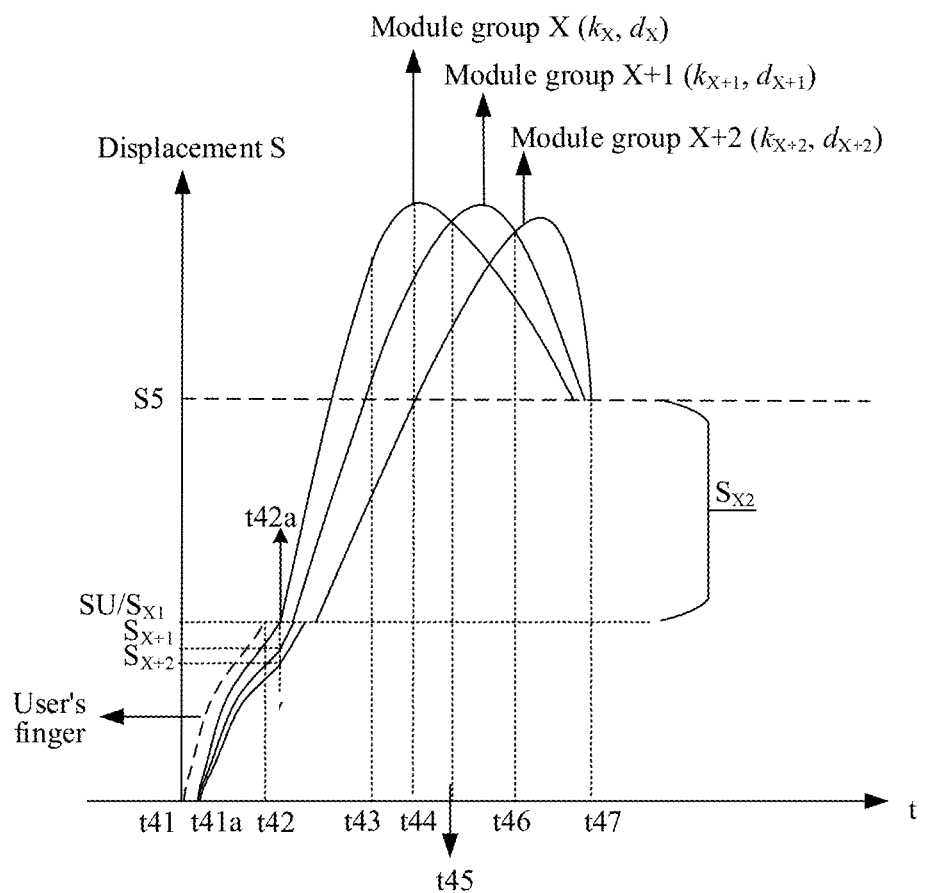
FIG. 7B to FIG. 7D are schematic curve diagrams of displacement changes of non-cross-boundary page rebounding according to an embodiment of this application.
Figure 7C:
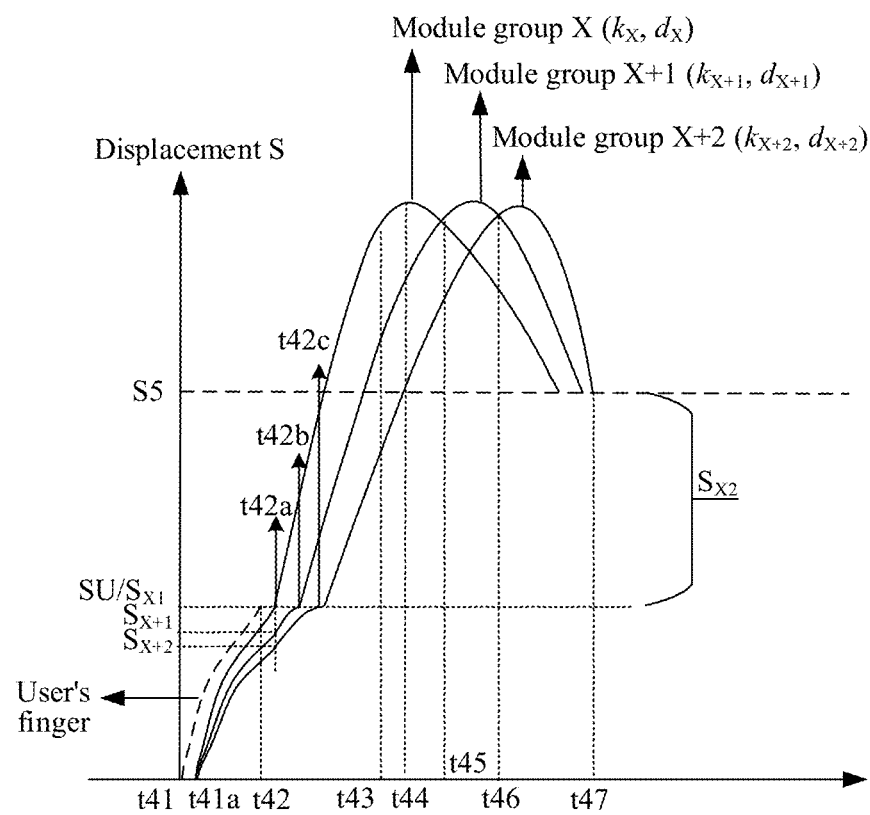

For example, FIG. 7B and FIG. 7C are displacement curve diagrams of each module group in FIG. 7A according to an embodiment of this application.

As shown in FIG. 7B and FIG. 7C, at the moment t41, the user's finger starts sliding on the display screen 194 by using the area in which the module group X is located as the start point. In response to a detected sliding operation, the electronic device 100 controls, based on displacement SU of the foregoing sliding operation detected in real time in the direction 1, the module group X to start sliding following the user's finger at a moment t41a. At the moment t42, the user's finger stops sliding. In this case, displacement of the user's finger in a sliding direction of the module group X is SU. At a moment t42a, in response to a detected sliding operation, the electronic device 100 controls the module group X to slide to $S_{X1}$, where $S_{X1}$ is equal to total displacement SU of the user's finger; and in response to detecting that the user stops the foregoing sliding operation, the electronic device 100 determines, based on at least one of a sliding velocity of the foregoing sliding operation, a friction model, and a limited distance of a limit layout manner, displacement $S_{X2}$ of the module group X after the moment t42a and total displacement S5 of the module group X after the moment t41a. After the moment t42a, the electronic device 100 controls the module group X to slide within the displacement $S_{X2}$ based on a preset motion law. For determining of $S_{X2}$ and the total displacement, refer to determining of $S_{X2}$ and the total displacement in related embodiments of the foregoing non-cross-boundary non-rebounding page sliding effect. Details are not described herein again.

In some embodiments, similar to the displacement curve diagram shown in FIG. 5E, from the moment t41a to the moment t42a, the electronic device 100 controls, based on the displacement of the module group X, the module group X+1 and the module group X+2 to slide within the foregoing target displacement based on a preset motion law. In this embodiment of this application, after the module group X slides to the displacement $S_{X1}$, the module group X+1 and the module group X+2 have two sliding manners. Specifically, for FIG. 7B, refer to the foregoing sliding manner 1 in a related embodiment of FIG. 5E. For FIG. 7C, refer to the foregoing sliding manner 2 in a related embodiment of FIG. 5F. For t42a, t42b, and t42c in FIG. 7A and FIG. 7B, refer to related descriptions of t12a, t12b, and t12c in the foregoing embodiments respectively. Details are not described herein again.

For example, the foregoing preset motion law in FIG. 7B and FIG. 7C is an elastic force motion law in an underdamping state. A module group simulates the elastic force motion law in the underdamping state, in other words, a change law of displacement S of the module group conforms to a change law of a deformation of a spring in the underdamping state. The electronic device 100 may adjust a damping coefficient and/or a stiffness coefficient of each module group, so that a damping coefficient and/or a stiffness coefficient of the module group X are/is largest, and a damping coefficient and/or a stiffness coefficient of a module group farther away from the module group X are/is smaller. In this way, the module group X, the module group X+1, and the module group X+2 present displacement change trends in the underdamping state in FIG. 7B, so that the module group X, the module group X+1, and the module group X+2 present the page sliding effect shown in FIG. 7A in a sliding process, where the page sliding effect shown in FIG. 7A includes one rebound.

By using a motion trend between the module group X and the module group X+1 in FIG. 7B as an example, the following describes in detail a motion trend between adjacent module groups. Similarly, a motion trend between the module group X+1 and the module group X+2 may be deduced, and details are not described in the following.

As shown in FIG. 7B, from the moment t41 to a moment t45, displacement of the module group X is greater than or equal to displacement of the module group X+1. From the moment t41 to the moment t44, each module group slides in the direction 1. From the moment t42 to the moment t43, a velocity of the module group X is greater than or equal to a velocity of the module group X+1, and a displacement difference between the module group X and the module group X+1 gradually increases. At the moment t43, the velocity of the module group X is equal to the velocity of the module group X+1, and the displacement difference between the module group X and the module group X+1 reaches a maximum value. From the moment t43 to the moment t44, the velocity of the module group X is less than or equal to the velocity of the module group X+1, and the displacement difference between the module group X and the module group X+1 gradually decreases. At the moment t44, the module group X reaches a maximum displacement value. From the moment t44 to a moment t47, the module group X slides in an opposite direction of the direction 1. From the moment t44 to the moment t45, the displacement of the module group X is greater than or equal to the displacement of the module group X+1, and the displacement difference between the module group X and the module group X+1 decreases. At the moment t45, the displacement difference between the module group X and the module group X+1 decreases to 0. From the moment t45 to the moment t47, the displacement of the module group X is less than the displacement of the module group X+1. From the moment t45 to the moment t46, the module group X moves in the opposite direction of the direction 1, the module group X+1 moves in the direction 1, and the displacement difference between the module group X and the module group X+1 gradually increases, so that a forward interval $F_{(X+1, X+2)}$ between the module group X+1 and the module group X+2 decreases, and a reverse interval $B_{(X+1, X+2)}$ increases. At the moment t46, the displacement of the module group X+1 reaches maximum displacement. From the moment t46 to the moment t47, the displacement difference between the module group X and the module group X+1 first increases and then decreases to 0, so that the forward interval $F_{(X+1, X+2)}$ in the direction 1 first increases and then decreases to an initial value, and the reverse interval $B_{(X+1, X+2)}$ first decreases and then increases to an initial value. At the moment t47, total displacement of all module groups is all S5. After the moment t47, all the module groups stop sliding.

In FIG. 7A, at the moment t47 and before the moment t47, there are also three cases for sliding stop moments of the module groups. For details, refer to the three cases for the sliding stop moments of the module groups in the foregoing non-cross-boundary non-rebounding page sliding effect. Details are not described herein again.

For example, in the page sliding process shown in FIG. 7A, there may also be a time difference between sliding start moments of the module groups, and there may also be a time difference between sliding stop moments of the module groups. As shown in a schematic curve diagram of a displacement change in FIG. 7D, a sliding start moment difference between the module group X and the module group X+1 is $\Delta t_1$, a sliding start moment difference between the module group X+1 and the module group X+2 is $\Delta t_2$, a sliding stop moment difference between the module group X and the module group X+1 is $\Delta t_3$, and a sliding stop moment difference between the module group X+1 and the module group X+2 is $\Delta t_4$. For details, refer to a related embodiment of FIG. 6C. Details are not described herein again.

3. Following-Hand Cross-Boundary Rebounding Page Sliding Effect

Figure 8A:
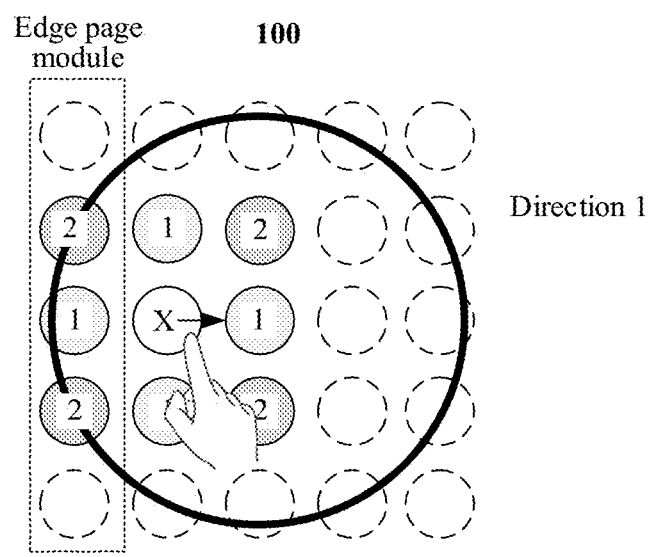
FIG. 8A is a schematic diagram of an edge page module according to an embodiment of this application.

As shown in FIG. 8A, page modules of a leftmost column on a page shown in FIG. 8A are an edge page module. When the page modules stop sliding, a maximum distance between the edge page module displayed by the electronic device 100 and an edge of the display screen 194 of the electronic device 100 is a preset value 1. The following describes the cross-boundary rebounding page sliding effect provided in embodiments of this application by using the page shown in FIG. 8A.

In embodiments of this application, in a process in which the user's finger slides the page shown in FIG. 8A in a direction 1 (namely, a front right direction), if a distance between the edge page module and the edge of the display screen 194 of the electronic device 100 is greater than the preset value 1, after the user stops a sliding operation and releases a hand, the electronic device 100 controls each module group to slide in an opposite direction of the direction 1, until the distance between the edge page module and the edge of the display screen rebounds to the preset value 1. In embodiments of this application, the page sliding effect in the foregoing case is referred to as following-hand cross-boundary rebounding for short.

Figure 8B:
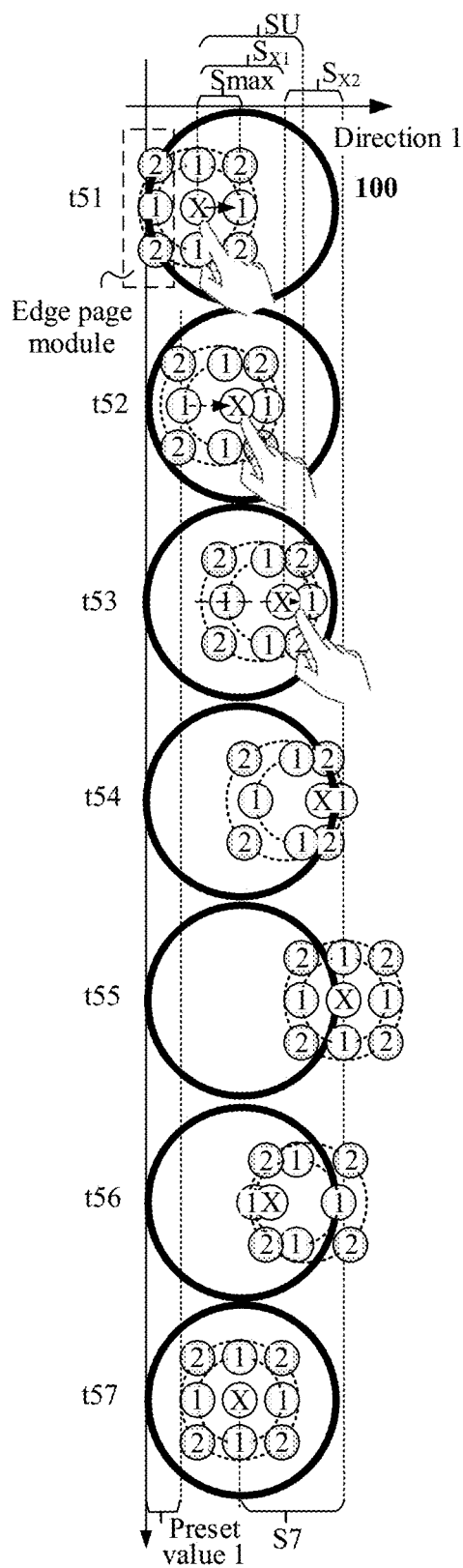
FIG. 8B is a schematic diagram of a cross-boundary rebounding page sliding effect according to an embodiment of this application.

For example, FIG. 8B shows a page sliding effect of following-hand cross-boundary rebounding according to this embodiment of this application.

For example, as shown in FIG. 8B, from a moment t51 to a moment t53, the user's finger slides by SU on the display screen 194 in the direction 1 by using an area in which the page module X is located as a start point, where SU is greater than maximum displacement Smax of the current page in the direction 1. After detecting a sliding operation performed on the module group X, the electronic device 100 controls each module group on the page 12 to slide in the direction 1. From the moment t51 to the moment t53, the module group X, the module group X+1, and the module group X+2 slide in the direction 1, displacement of the module group X is greater than displacement of the module group X+1, and the displacement of the module group X+1 is greater than displacement of the module group X+2. From the moment t51 to the moment 52, a distance between an edge page module displayed on the display screen 194 and an edge of the display screen 194 is less than or equal to a preset value 1, and the module group X synchronously slides following the user's finger. From the moment t52 to the moment 53, the distance between the edge page module displayed on the display screen 194 and the edge of the display screen 194 is greater than the preset value 1, and a sliding velocity of the module group X is h times a detected sliding velocity (namely, a sliding velocity of the user's finger in a sliding direction of the module group) of the user's finger, where h is a preset value greater than 0 and less than or equal to 1. At the moment t53, displacement $S_{X1}$ of the module group X is less than SU. Compared with the moment t51, at the moment t52 (and compared with the moment t52, at the moment t53), a displacement difference between the module group X and the module group X+1 increases, so that a forward interval $F_{(X, X+1)}$ in the direction 1 decreases, and a reverse interval $B_{(X, X+1)}$ in the direction 1 increases. From the moment t53 to a moment t55, the module group X continues to slide by $S_{X2}$ in the direction 1, the displacement of the module group X is greater than or equal to the displacement of the module group X+1, and the displacement of the module group X+1 is greater than or equal to the displacement of the module group X+2. Compared with the moment t53, at the moment t54, the displacement difference between the module group X and the module group X+1 increases, so that the forward interval $F_{(X, X+1)}$ in the direction 1 decreases, and the reverse interval $B_{(X, X+1)}$ in the direction 1 increases. Compared with the moment t54, at the moment t55, the displacement difference between the module group X and the module group X+1 decreases to 0, so that the forward interval $F_{(X, X+1)}$ in the direction 1 increases to an initial value, and the reverse interval $B_{(X, X+1)}$ in the direction 1 decreases to an initial value. From the moment t55 to a moment t57, each module group slides by S7 in an opposite direction of the direction 1, a sliding distance of the module group X in the opposite direction is greater than or equal to the displacement of the module group X+1, and a sliding distance of the module group X+1 in the opposite direction is greater than or equal to the displacement of the module group X+2. Compared with the moment t55, at the moment t56 (and compared with the moment t56, at the moment t57), the module group X, the module group X+1, and the module group X+2 move in the opposite direction of the direction 1, and the displacement difference between the module group X and the module group X+1 decreases, so that the forward interval $F_{(X, X+1)}$ in the direction 1 increases, and the reverse interval $B_{(X, X+1)}$ decreases. At the moment t57, the sliding stops after the displacement differences between the module groups decrease to 0, and a distance between an edge module of the module group X+1 and the edge of the display screen 194 is equal to the preset value 1, in other words, total displacement of each module group in the direction 1 is equal to the maximum displacement.

$S_{X2}$ is determined by the electronic device 100 based on at least one of a sliding velocity of the sliding operation, a friction model, and a limited distance of a limit layout manner. From the moment t55 to the moment t57, a sliding distance S7 of each module group in the opposite direction of the direction 1 is equal to a sliding distance of each module group in the direction 1 minus the maximum displacement Smax, in other words, S7 is equal to $S_{X1}+S_{X2}-$Smax.

It may be understood that, before the electronic device 100 detects that the user stops the sliding operation, the electronic device 100 detects that displacement of the user's finger in the sliding direction of the module group in a second refresh periodicity is displacement 1, and the electronic device 100 controls displacement of the module group X in a first refresh periodicity to be equal to h times the foregoing displacement 1. When current displacement of the module group X is less than or equal to the maximum displacement, h is equal to 1. When the current displacement of the module group X is greater than the maximum displacement, h is greater than zero and less than 1. Therefore, when the distance between the edge page module and the edge of the display screen 194 is greater than the preset value 1, h is less than 1, and a sliding distance of the module group X is less than a sliding distance of the user's finger, which creates a sense of resistance for the user to continue to slide after crossing a boundary.

The following further describes the page sliding effect shown in FIG. 8A. For example, FIG. 8C is a displacement curve diagram of each module group in FIG. 8B according to an embodiment of this application.

Figure 8C:
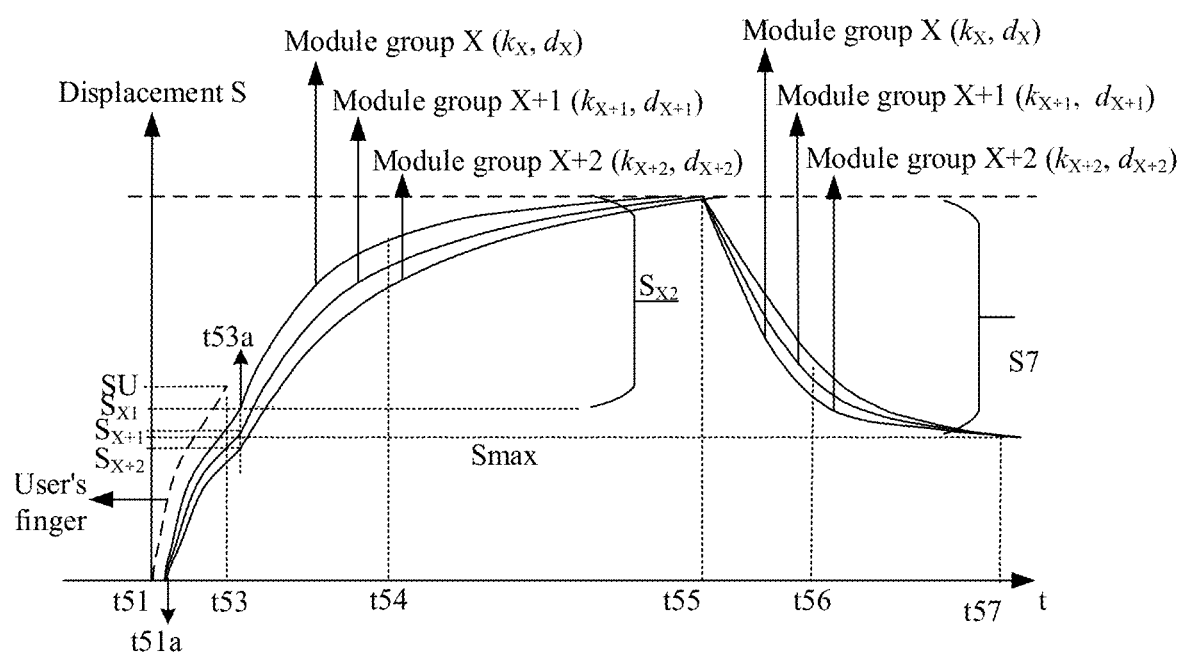
FIG. 8C is a schematic curve diagram of displacement changes of cross-boundary rebounding page modules according to an embodiment of this application.

As shown in FIG. 8C, from the moment t51 to t53, the user's finger slides on the display screen 194 by using the area in which the module group X is located as the start point. In response to a detected sliding operation, the electronic device 100 controls, based on displacement SU of the foregoing sliding operation detected in real time in the direction 1, the module group X to start sliding following the user's finger at a moment t51a. After detecting that the displacement of the user's finger is greater than the maximum displacement Smax, the electronic device 100 controls the velocity of the module group X to be h times the detected velocity of the user's finger, where h is greater than zero and less than 1. At the moment t53, the user's finger stops sliding. In this case, displacement of the user's finger in a sliding direction of the module group is SU. At a moment t53a, in response to a detected sliding operation, the electronic device 100 controls the module group X to slide to $S_{X1}$, where $S_{X1}$ is less than SU; and in response to detecting that the user stops the foregoing sliding operation, the electronic device 100 determines, based on at least one of a sliding velocity of the foregoing sliding operation, a friction model, and a limited distance of a limit layout manner, a sliding distance $S_{X2}$ of the module group X in the direction 1 after the moment t53a. After the moment t53a, the electronic device 100 controls the module group X to slide within the displacement $S_{X2}$ based on a preset motion law. At the moment t55, displacement of each module group in the direction 1 is $S_{X1}+S_{X2}$. After determining rebound displacement S7 based on the maximum displacement Smax, the electronic device 100 controls, from the moment t55 to t57, each module group to slide in the opposite direction of the direction 1 by using S7 as target displacement based on a preset motion law. From the moment t55 to t57, a rebound distance of the module group X in the opposite direction of the direction 1 is greater than or equal to a rebound distance of the module group X+1, the rebound distance of the module group X+1 is greater than or equal to a rebound distance of the module group X+2, and a displacement difference between adjacent module groups first increases and then decreases to zero.

In some embodiments, similar to the displacement curve diagram shown in FIG. 5E, from the moment t51a to the moment t53a, the electronic device 100 controls, by using the displacement of the module group X as target displacement, the module group X+1 and the module group X+2 to slide within the foregoing target displacement based on a preset motion law. In this embodiment of this application, after the module group X slides to $S_{X1}$, the module group X+1 and the module group X+2 have two sliding manners. For details, refer to the foregoing sliding manner 1 and sliding manner 2 in a related embodiment of FIG. 5E. Details are not described herein again.

For example, the foregoing preset motion law in FIG. 8C is an elastic force motion law in a critical damping state. A module group simulates the elastic force motion law in the critical damping state. The electronic device 100 may adjust a damping coefficient and/or a stiffness coefficient of each module group, so that a damping coefficient and/or a stiffness coefficient of the module group X are/is largest, and a damping coefficient and/or a stiffness coefficient of a module group farther away from the module group X are/is smaller. In this way, the module group X, the module group X+1, and the module group X+2 present displacement change trends in the critical damping state in FIG. 8C, so that the module group X, the module group X+1, and the module group X+2 present a page sliding effect shown in FIG. 8B in a sliding process, where the page sliding effect shown in FIG. 8B includes one page rebound. In addition, when adjacent module groups slide in the direction 1, a forward interval between the module groups is first compressed and then restored to an initial value, and a reverse interval is first stretched and then restored to an initial value; and when the adjacent module groups rebound in the opposite direction of the direction 1, the reverse interval between the module groups is first compressed and then restored to the initial value, and the forward interval is stretched and then restored to the initial value.

Figure 8D:
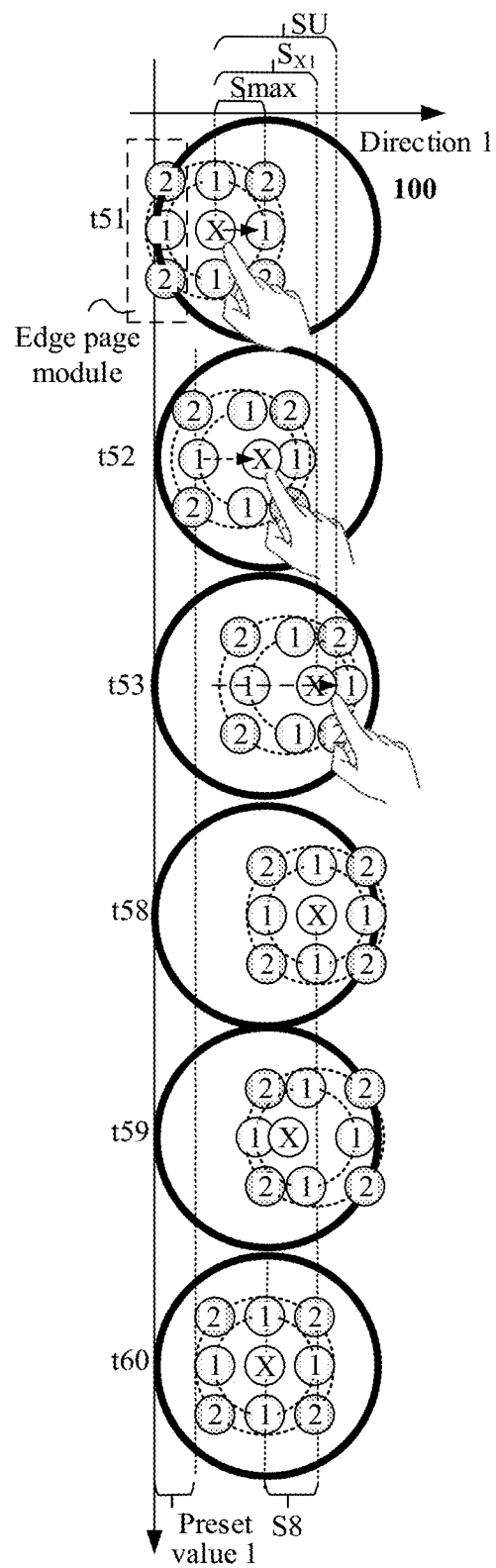
FIG. 8D is a schematic diagram of another cross-boundary rebounding page sliding effect according to an embodiment of this application.

For example, by using the module group X, the module group X+1, and the module group X+2 in FIG. 8A as an example, FIG. 8D shows another following-hand rebounding page sliding effect.

As shown in FIG. 8D, a moment t58, a moment t59, and a moment t60 are further included after a moment t53. For a sliding effect of each module group from a moment t51 to the moment t53, refer to a related embodiment of FIG. 8A. From the moment t53 to the moment t58, the module group X stops sliding, and the module group X+1 and the module group X+2 continue to slide to $S_{X1}$ in the direction. Compared with the moment t53, at the moment t58, a displacement difference between the module group X and the module group X+1 decreases to 0, so that a forward interval $F_{(X, X+1)}$ in the direction 1 increases to an initial value, and a reverse interval $B_{(X, X+1)}$ in the direction 1 decreases to an initial value. From the moment t58 to the moment t60, each module group slides by S7 in the opposite direction of the direction 1. Compared with the moment t58, at the moment t59 (and compared with the moment t59, at the moment t60), the module group X, the module group X+1, and the module group X+2 move in the opposite direction of the direction 1, and the displacement difference between the module group X and the module group X+1 decreases, so that the forward interval $F_{(X, X+1)}$ in the direction 1 increases, and the reverse interval $B_{(X, X+1)}$ decreases. At the moment t57, the sliding stops after the displacement differences between the module groups decrease to 0, and a distance between an edge module of the module group X+1 and the edge of the display screen 194 is equal to the preset value 1, in other words, total displacement of each module group in the direction 1 rebounds to the maximum displacement.

The following further describes the page sliding effect shown in FIG. 8D. For example, FIG. 8E is a displacement curve diagram of each module group in FIG. 8D according to an embodiment of this application.

Figure 8E:
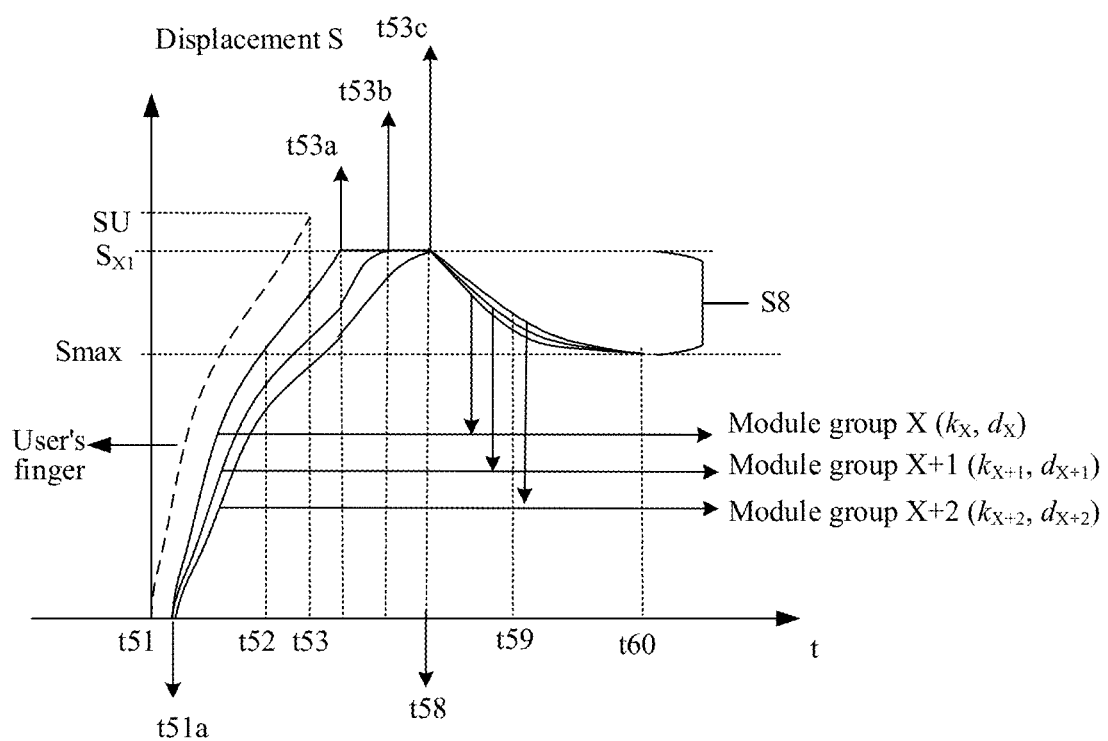
FIG. 8E is another schematic curve diagram of displacement changes of cross-boundary rebounding page modules according to an embodiment of this application.

As shown in FIG. 8E, similar to the displacement curve diagram shown in FIG. 8B, for a displacement change from the moment t51 to the moment t53, refer to a related embodiment of FIG. 8C. Details are not described herein again. At the moment t53, the user's finger stops sliding. In this case, displacement of the user's finger in a sliding direction of the module group is SU. At a moment t53a, in response to a detected sliding operation, the electronic device 100 controls the module group X to slide to $S_{X1}$, where $S_{X1}$ is less than SU; and in response to detecting that the user stops the foregoing sliding operation, the electronic device 100 controls, from t53a to t53b, the module group X+1 to slide to $S_{X1}$ in the direction 1 based on a preset motion law, and the electronic device 100 controls, from t53a to t53c, the module group X+2 to slide to $S_{X1}$ in the direction 1 based on the preset motion law. The module group X stops sliding from t53a to t53c, and the module group X+1 stops sliding from t53b to t53c. From the moment t58 to the moment t60, the electronic device 100 controls each module group to slide in the opposite direction of the direction 1 based on the preset motion law by using S8 as target displacement. From the moment t58 to t60, a rebound distance of the module group X in the opposite direction of the direction 1 is greater than or equal to a rebound distance of the module group X+1, the rebound distance of the module group X is greater than or equal to the rebound distance of the module group X+1, and a sliding displacement difference between adjacent module groups in the opposite direction of the direction 1 first increases and then decreases to zero.

For example, the foregoing preset motion law in FIG. 8E is an elastic force motion law in a critical damping state. A module group simulates an elastic force motion law in the critical damping state. The electronic device 100 may adjust a damping coefficient and/or a stiffness coefficient of each module group, so that a damping coefficient and/or a stiffness coefficient of the module group X are/is largest, and a damping coefficient and/or a stiffness coefficient of a module group farther away from the module group X are/is smaller. In this way, the module group X, the module group X+1, and the module group X+2 present displacement change trends in the critical damping state in FIG. 8E, so that the module group X, the module group X+1, and the module group X+2 present a page sliding effect shown in FIG. 8D in a sliding process, where the page sliding effect shown in FIG. 8D includes one page rebound. In addition, when adjacent module groups slide in the direction 1, a forward interval between the module groups is first compressed and then restored to an initial value, and a reverse interval is first stretched and then restored to an initial value; and when the adjacent module groups rebound in the opposite direction of the direction 1, the reverse interval between the module groups is first compressed and then restored to the initial value, and the forward interval is stretched and then restored to the initial value.

4. Releasing-Hand Cross-Boundary Rebounding Page Sliding Effect

By using the module group X, the module group X+1, and the module group X+2 in FIG. 8A as an example, the following describes the releasing-hand cross-boundary rebounding page sliding effect provided in embodiments of this application.

In embodiments of this application, in a process in which the user's finger slides in a direction 1, if a distance between an edge page module and an edge of the display screen 194 of the electronic device 100 is less than or equal to a preset value 1, after the user stops a sliding operation and releases a hand, each module group continues to slide displacement $S_{X2}$ in the direction 1. If continuing to slide by $S_{X2}$, displacement of module group X is greater than maximum displacement. The electronic device 100 controls each module group to slide in an opposite direction of the direction 1, until the distance between the edge page module and the edge of the display screen rebounds to the preset value 1. In embodiments of this application, the page sliding effect in the foregoing case is referred to as releasing-hand cross-boundary rebounding for short.

Figure 8F:
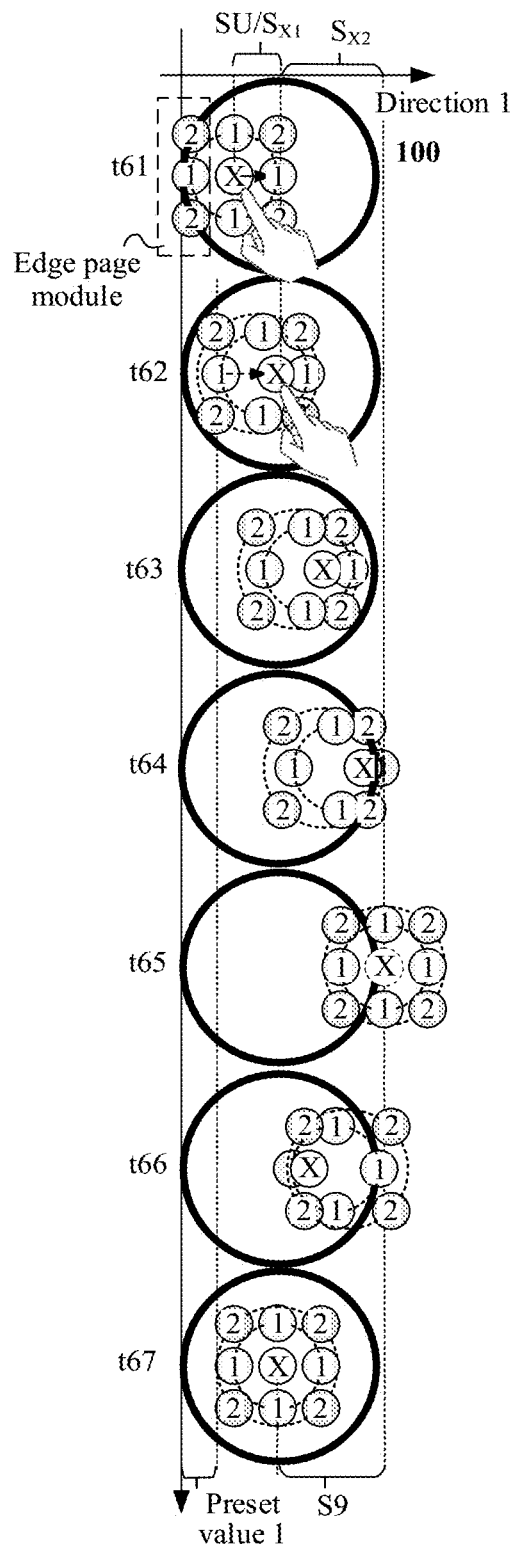
FIG. 8F is a schematic diagram of another cross-boundary rebounding page sliding effect according to an embodiment of this application.

For example, FIG. 8F shows a releasing-hand cross-boundary rebounding page sliding effect.

For example, as shown in FIG. 8B, from a moment t61 to a moment t62, the user's finger slides by SU on the display screen 194 in the direction 1 by using an area in which the page module X is located as a start point, where SU is less than maximum displacement Smax of the current page in the direction 1. After detecting a sliding operation performed on the module group X, the electronic device 100 controls each module group on the page 12 to slide by SU in the direction 1. From the moment t61 to the moment t62, the module group X, the module group X+1, and the module group X+2 slide in the direction 1, displacement of the module group X is greater than displacement of the module group X+1, and the displacement of the module group X+1 is greater than displacement of the module group X+2. From the moment t62 to a moment t65, the electronic device 100 controls the module group X to continue to slide by $S_{X2}$ in the direction 1. For change trends of displacement differences, forward intervals, and reverse intervals between the module groups, refer to a related embodiment of displacement changes from the moment t53 to the moment t55 in FIG. 8C. Details are not described herein again. From the moment t65 to a moment t67, the electronic device 100 controls each module group to slide by S9 in the opposite direction of the direction 1. For change trends of displacement differences, forward intervals, and reverse intervals between the module groups, refer to a related embodiment of displacement changes from the moment t53 to the moment t55 in FIG. 8C. Details are not described herein again. At the moment t67, the sliding stops after the displacement differences between the module groups decrease to 0, and a distance between an edge module of the module group X+1 and the edge of the display screen 194 is equal to the preset value 1.

Figure 8G:
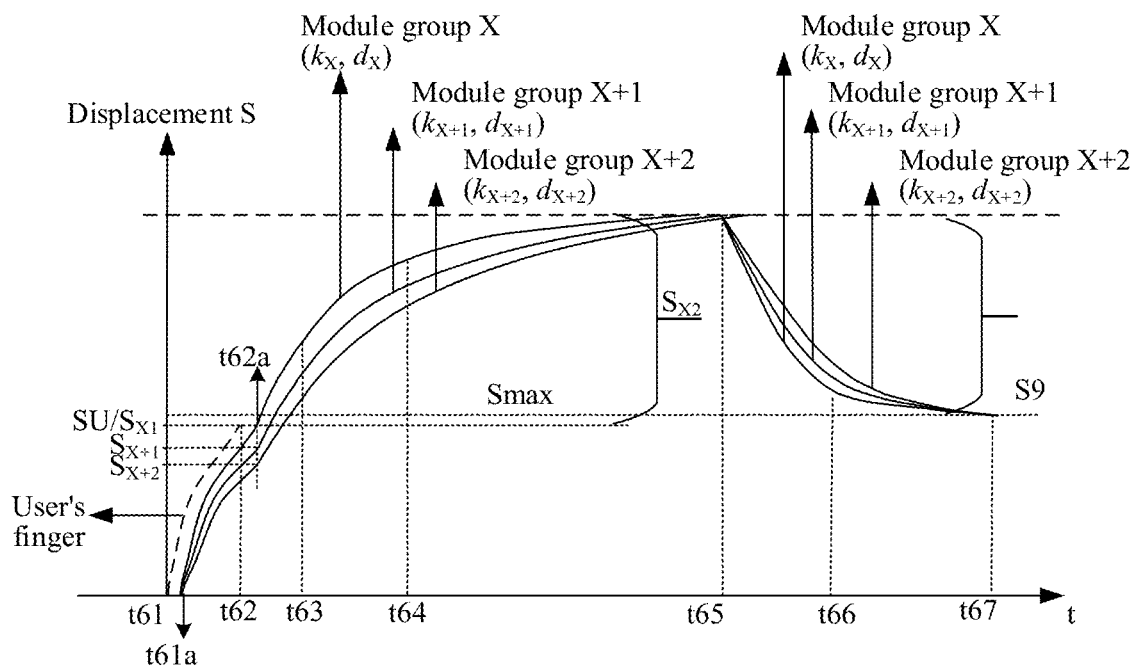
FIG. 8G is another schematic curve diagram of displacement changes of cross-boundary rebounding page modules according to an embodiment of this application.

For example, FIG. 8G is a displacement curve diagram of each module group in FIG. 8F according to an embodiment of this application.

In FIG. 8G, after detecting that the user stops the sliding operation, the electronic device 100 controls the module group X to continue to slide by $S_{X2}$ in the direction 1, and controls each module group to slide by S9 in the opposite direction of the direction 1 based on a preset motion law after displacement of each module group in the direction 1 reaches $SU+S_{X2}$, where S9 is equal to $SU+S_{X2}-Smax$. Specifically, for a displacement change trend of each module group in FIG. 8G after the user stops the sliding operation, refer to a displacement change trend of each module group in FIG. 8C after the user stops the sliding operation. Details are not described herein again.

It should be noted that, in page sliding effects of sliding across a boundary following a hand and sliding across a boundary releasing a hand, there are three cases for reaching moments when displacement of the module groups in the direction 1 increases to $S_{X1}+S_{X2}$. (1) The reaching moments of the module groups are the same. For example, in FIG. 8C, the displacement of the module groups simultaneously reaches $S_{X1}+S_{X2}$ at the moment t55. (2) There is a time difference between reaching moments of adjacent module groups, the module group X first reaches, and a module group farther away from the module group X reaches later. For example, in FIG. 8C, the displacement of the module group X+2 reaches $S_{X1}+S_{X2}$ at the moment t55, and the displacement of the module group X and the module group X+1 reaches $S_{X1}+S_{X2}$ before the moment t55. (3) There is a time difference between reaching moments of adjacent module groups, the module group X reaches at the latest, and a module group farther away from the module group X reaches earlier. For example, in FIG. 8C, the displacement of the module group X reaches $S_{X1}+S_{X2}$ at the moment t55, and the displacement of the module group X+1 and the module group X+2 reaches $S_{X1}+S_{X2}$ before the moment t55. In addition, there are also three cases for final sliding stop moments of the module groups. For details, refer to the three cases for the sliding stop moments of the module groups in the foregoing non-cross-boundary non-rebounding page sliding effect. Details are not described herein again.

Not limited to one cross-boundary rebound shown in FIG. 8B, FIG. 8D, and FIG. 8F, when a page crosses a boundary, module groups on the page may perform cross-boundary rebounding for a plurality of times.

Based on the foregoing page sliding effects shown in FIG. 5A to FIG. 8F, the following describes in detail a page sliding processing method provided in embodiments of this application.

Figure 9A:
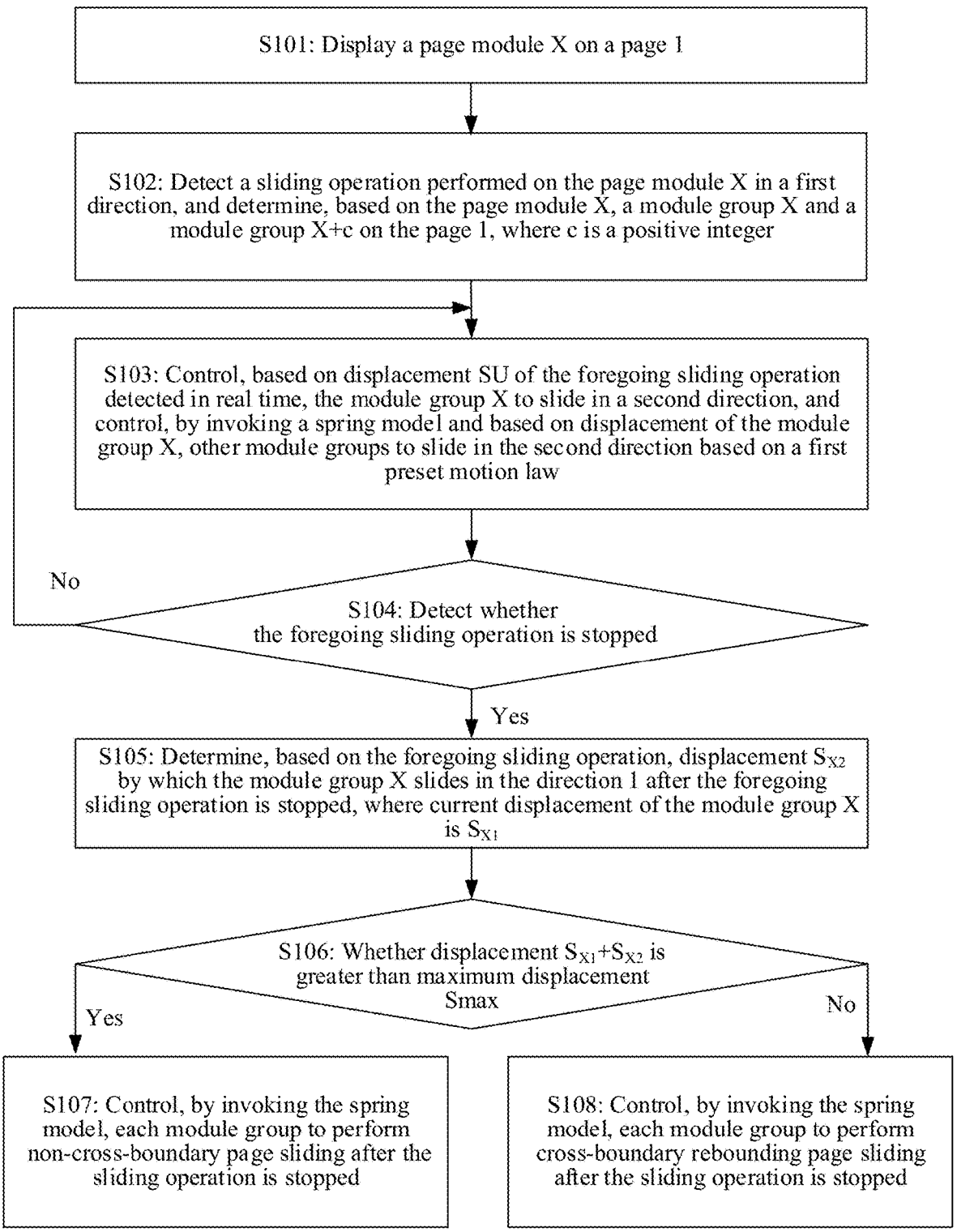
FIG. 9A is a schematic flowchart of a page sliding processing method according to an embodiment of this application.

FIG. 9A shows a page sliding processing method according to an embodiment of this application. The foregoing page sliding processing method includes but is not limited to operations S101 to S111.

S101: An electronic device 100 displays a page module X on a page 1.

S102: The electronic device 100 detects a sliding operation performed on the page module X in a first direction, and determines, based on the page module X, a module group X and a module group X+c on the page 1, where c is a positive integer.

Each module group on the page 1 includes at least one page module on the page 1. The module group X+c is determined based on a position relationship between a page module in the module group X+c and the page module X. In some embodiments, position distributions of module groups around the page module X present a first-type distribution. The electronic device 100 may number each module group X+c based on a distance between each module group and the page module. A farther distance from the page module X indicates larger c.

The foregoing first-type distribution includes but is not limited to: The first-type distribution includes: a circular distribution, an elliptical distribution, a rectangular distribution, a square distribution, and the like.

Specifically, for how to determine the module group X and the module group X+c on the page 1 based on the page module X, refer to related embodiments of FIG. 3A to FIG. 3G. Details are not described herein again.

S103: The electronic device 100 controls, based on displacement SU of the foregoing sliding operation detected in real time, the module group X to slide in a second direction, and controls, by invoking a spring model and based on displacement of the module group X, other module groups to slide in the second direction based on a first preset motion law.

For how to determine the second direction in which the module group slides based on the first direction of the sliding operation, refer to related embodiments of FIG. 4A and FIG. 4B. Details are not described herein again. If the electronic device 100 may slide the page module in any direction, the first direction and the second direction are the same. For example, the first direction and the second direction are a direction 1 shown in FIG. 5A, or may be a direction 2 shown in FIG. 5B.

For example, refer to related embodiments of FIG. 5E to FIG. 5G, FIG. 7B to FIG. 7D, FIG. 8C, FIG. 8E, and FIG. 8G. The foregoing first preset motion law may be an elastic force motion law in a critical damping state.

S104: The electronic device 100 detects whether the foregoing sliding operation is stopped; and continues to perform S103 if the foregoing sliding operation is not stopped; or performs S105 if the foregoing sliding operation is stopped.

S105: The electronic device 100 determines, based on the foregoing sliding operation, displacement $S_{X2}$ by which the module group X slides in the direction 1 after the foregoing sliding operation is stopped, where current displacement of the module group X is $S_{X1}$.

In some embodiments of this application, the electronic device 100 determines, based on at least one of a sliding velocity of the foregoing sliding operation, a friction model, maximum displacement, and a limited distance of a limit layout, the displacement $S_{X2}$ of the module group X after a user stops the sliding operation. For details, refer to the foregoing embodiments. Details are not described herein again. For example, refer to FIG. 5E, FIG. 5D, FIG. 7B to FIG. 7D, FIG. 8C, and FIG. 8G. When the electronic device 100 detects that the sliding operation is stopped, the current displacement of the module group X is $S_{X1}$, and the electronic device 100 controls the module group X to continue to slide by $S_{X2}$ in the direction 1.

In some embodiments of this application, after detecting that the user stops the sliding operation, the electronic device 100 determines that the module group X no longer continues to slide in the direction 1, in other words, the displacement $S_{X2}$ is equal to 0. For example, in a non-cross-boundary non-rebounding page sliding effect shown in FIG. 5D and FIG. 5G, at a moment t12a, after detecting that the user stops the sliding operation, the electronic device 100 controls the module group X to stop sliding, and total displacement of the module group X is $S_{X1}$. For example, in a following-hand cross-boundary rebounding page sliding effect shown in FIG. 8D and FIG. 8E, at a moment t53a, after detecting that the user stops the sliding operation, the electronic device 100 controls the module group X to no longer slide in the direction 1, and controls each module group to rebound in an opposite direction of the direction 1 after displacement of each module group in the direction 1 reaches $S_{X1}$.

S106: The electronic device 100 determines whether displacement $S_{X1}+S_{X2}$ is greater than maximum displacement Smax; and performs S107 if $S_{X1}+S_{X2}$ is less than or equal to the maximum displacement Smax; performs S108 if $S_{X1}+S_{X2}$ is greater than the maximum displacement Smax.

It may be understood that, if displacement $SXt+S_{X2}$ of the module group X in the direction 1 is greater than the maximum displacement Smax, each module group crosses a boundary in a sliding process, to be specific, a distance between an edge page module and an edge of a display screen is greater than a preset value 1.

S107: The electronic device 100 controls, by invoking the spring model, each module group to perform non-cross-boundary page sliding after the sliding operation is stopped.

For example, refer to related embodiments of FIG. 5E to FIG. 5G and FIG. 7B to FIG. 7C. $S_{X1}+S_{X2}$ is less than or equal to the maximum displacement Smax. After detecting that the foregoing sliding operation is stopped, the electronic device 100 controls the page to perform non-cross-boundary non-rebounding page sliding.

S108: The electronic device 100 controls, by invoking the spring model, each module group to perform cross-boundary rebounding page sliding after the sliding operation is stopped.

For example, refer to related embodiments of FIG. 8C, FIG. 8E, and FIG. 8G. $S_{X1}+S_{X2}$ is greater than the maximum displacement Smax. After detecting that the foregoing sliding operation is stopped, the electronic device 100 controls the page to perform page sliding with one cross-boundary rebound. Not limited to one rebound, when $S_{X1}+S_{X2}$ is greater than the maximum displacement Smax, the electronic device 1000 may control each page module to rebound for a plurality of times from $S_{X1}+S_{X2}$ to Smax.

The following describes in detail the page sliding processing method provided in embodiments of this application by using a non-cross-boundary non-rebounding page sliding effect shown in FIG. 5A and FIG. 5E as an example.

Figures 1, 9B:
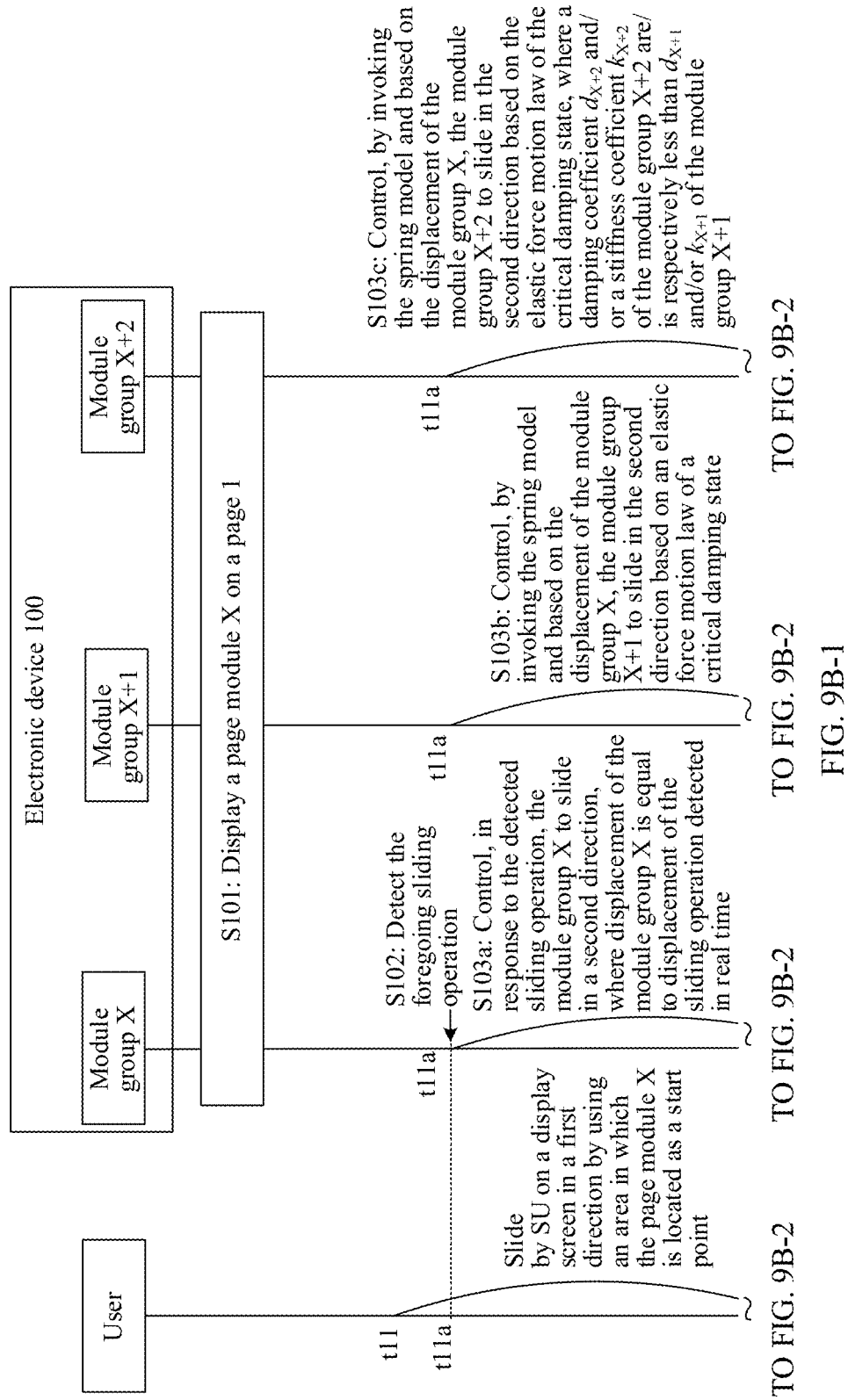
Figures 2, 9B:
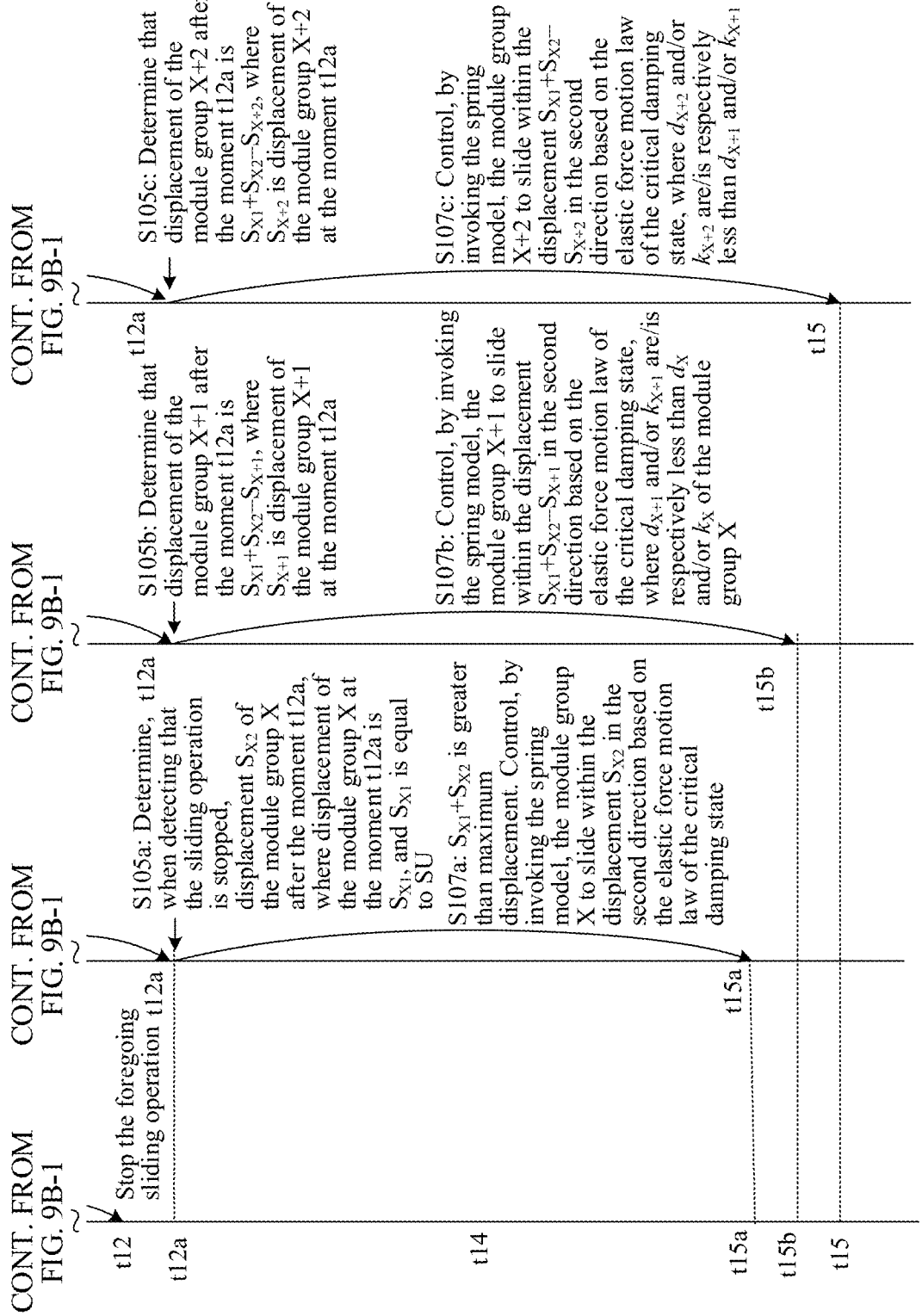

For example, FIG. 9B-1 and FIG. 9B-2 are a sequence diagram of a page sliding processing method according to an embodiment of this application. In FIG. 9B-1 and FIG. 9B-2, a module group X+1 and a module group X+2 use the foregoing sliding manner 1.

As shown in FIG. 9B-1 and FIG. 9B-2, in some embodiments, S103 may specifically include S103a, S103b, and S103c, S105 may specifically include S105a, S105b, and S105c, and S107 may specifically include S107a, S107b, and S107c.

S103a: Control, from a moment t11a to a moment t12a in response to the detected sliding operation, the module group X to slide in the second direction, where displacement of the module group X is equal to the displacement of the sliding operation detected in real time.

S103b: Control, from the moment t11a to the moment t12a by invoking the spring model and based on the displacement of the module group X, the module group X+1 to slide in the second direction based on the elastic force motion law of the critical damping state.

S103c: Control, from the moment t11a to the moment t12a by invoking the spring model and based on the displacement of the module group X, the module group X+2 to slide in the second direction based on the elastic force motion law of the critical damping state, where a damping coefficient $d_{X+2}$ and/or a stiffness coefficient $k_{X+2}$ of the module group X+2 are/is respectively less than $d_{X+1}$ and/or $k_{X+1}$ of the module group X+1.

S105a: Determine, at the moment t12a when detecting that the sliding operation is stopped, displacement $S_{X2}$ of the module group X after t12a, where displacement of the module group X at the moment t12a is $S_{X1}$.

S105b: Determine, at the moment t12a, that displacement of the module group X+1 after t12a is $S_{X1}+S_{X2}-S_{X+1}$, where $S_{X+1}$ is displacement of the module group X+1 at the moment t12a.

S105c: Determine, at the moment t12a, that displacement of the module group X+2 after t12a is $S_{X1}+S_{X2}-S_{X+2}$, where $S_{X+2}$ is displacement of the module group X+2 at the moment t12a.

S107a: $S_{X1}+S_{X2}$ is greater than the maximum displacement. Control, from the moment t12a to a moment t15a by invoking the spring model, the module group X to slide within the displacement $S_{X2}$ in the second direction based on the elastic force motion law of the critical damping state.

S107b: Control, from the moment t12a to a moment $t_{15}b$ by invoking the spring model, the module group X+1 to slide within the displacement $S_{X1}+S_{X2}-S_{X+1}$ in the second direction based on the elastic force motion law of the critical damping state, where $d_{X+1}$ and/or $k_{X+1}$ are/is respectively less than $d_X$ and/or $k_X$ of the module group X.

S107c: Control, from the moment t12a to a moment t15 by invoking the spring model, the module group X+2 to slide within the displacement $S_{X1}+S_{X2}-S_{X+2}$ in the second direction based on the elastic force motion law of the critical damping state, where $d_{X+2}$ and/or $k_{X+2}$ are/is respectively less than $d_{X+1}$ and/or $k_{X+1}$.

In some embodiments, the moment t15a is earlier than the moment t15b, and the moment t15b is earlier than the moment t15. In some embodiments, the moment t15a, the moment t15b, and the moment t15 are a same moment.

The following describes in detail the page sliding processing method provided in embodiments of this application by using a non-cross-boundary non-rebounding page sliding effect shown in FIG. 5A and FIG. 5F as an example.

Figures 1, 9C:
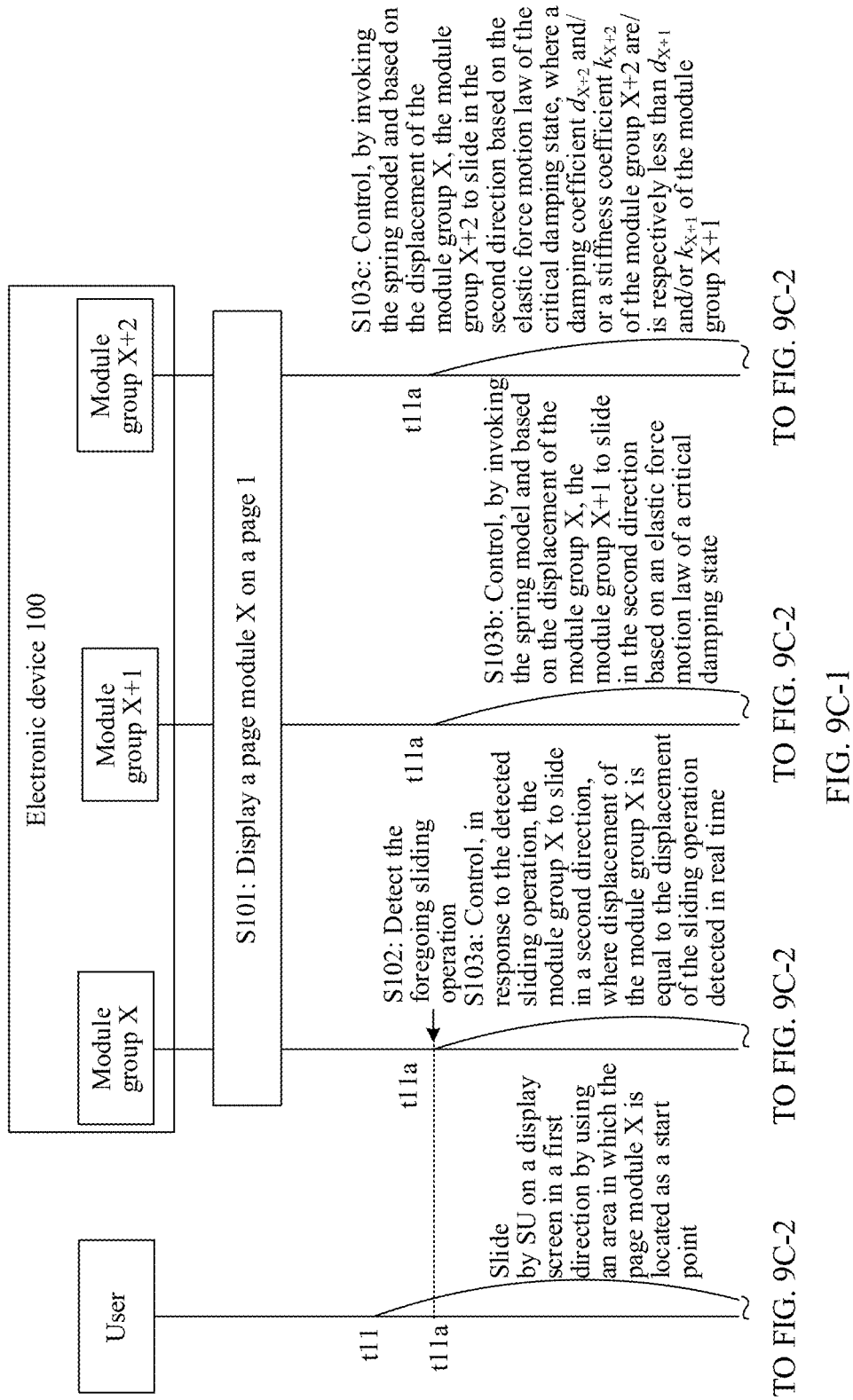

For example, FIG. 9C-1 and FIG. 9C-2 are a sequence diagram of a page sliding processing method according to an embodiment of this application. In FIG. 9C-1 and FIG. 9C-2, a module group X+1 and a module group X+2 use the foregoing sliding manner 2.

Different from FIG. 9B-1 and FIG. 9B-2, as shown in FIG. 9C-1 and FIG. 9C-2, in some embodiments, S105 may specifically include S105a, S105d, and S105e.

S105d: Control, from the moment t12a to a moment t12b, the module group X+1 to slide to $S_{X1}$ within the displacement of the sliding operation detected in real time based on the elastic force motion law of the critical damping state.

S105e: Control, from the moment t12a to a moment t12c, the module group X+2 to slide to $S_{X1}$ within the displacement of the sliding operation detected in real time based on the elastic force motion law of the critical damping state.

S107d: Control, from the moment t12b to a moment t15b by invoking the spring model, the module group X+1 to slide within the displacement $S_{X2}$ in the second direction based on the elastic force motion law of the critical damping state, where $d_{X+1}$ and/or $k_{X+1}$ are/is respectively less than $d_X$ and/or $k_X$ of the module group X.

S107e: Control, from the moment t12c to a moment t15 by invoking the spring model, the module group X+2 to slide within the displacement $S_{X2}$ in the second direction based on the elastic force motion law of the critical damping state, where $d_{X+2}$ and/or $k_{X+2}$ are/is respectively less than $d_{X+1}$ and/or $k_{X+1}$.

It should be noted that, in some embodiments, at a moment t11a, after detecting that the sliding operation is stopped, there is a time difference between sliding start moments of adjacent module groups. The electronic device 100 controls the module group X to start sliding at the moment t11a, controls the module group X+1 to start sliding at a moment tub separated by $\Delta t_1$ from t11a, and controls the module group X+2 to start sliding at a moment t11c separated by $\Delta t_2$ from t11b.

The following describes in detail the page sliding processing method provided in embodiments of this application by using a following-hand cross-boundary rebounding page sliding effect shown in FIG. 8B as an example.

Figures 1, 9D:
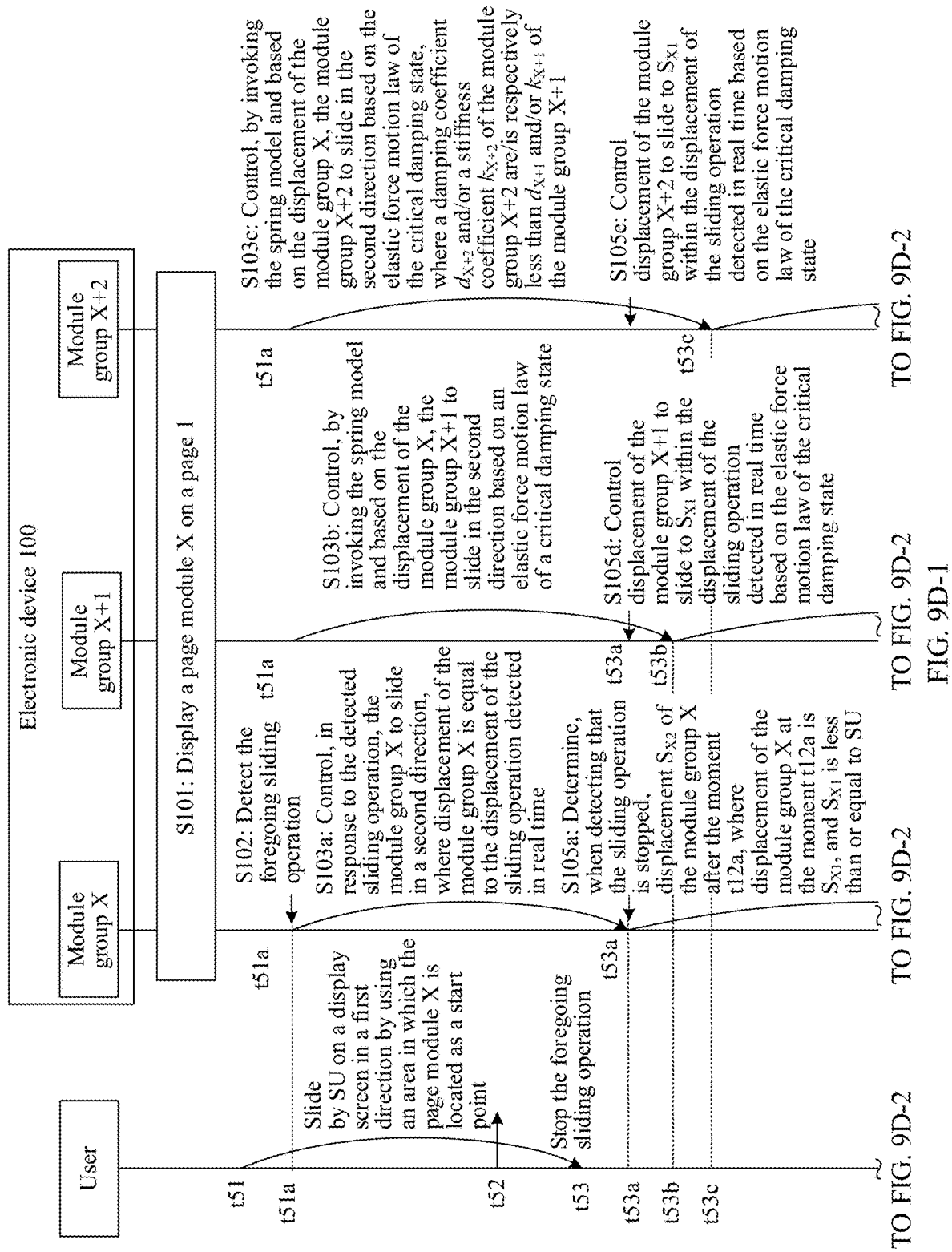
Figures 2, 9D:
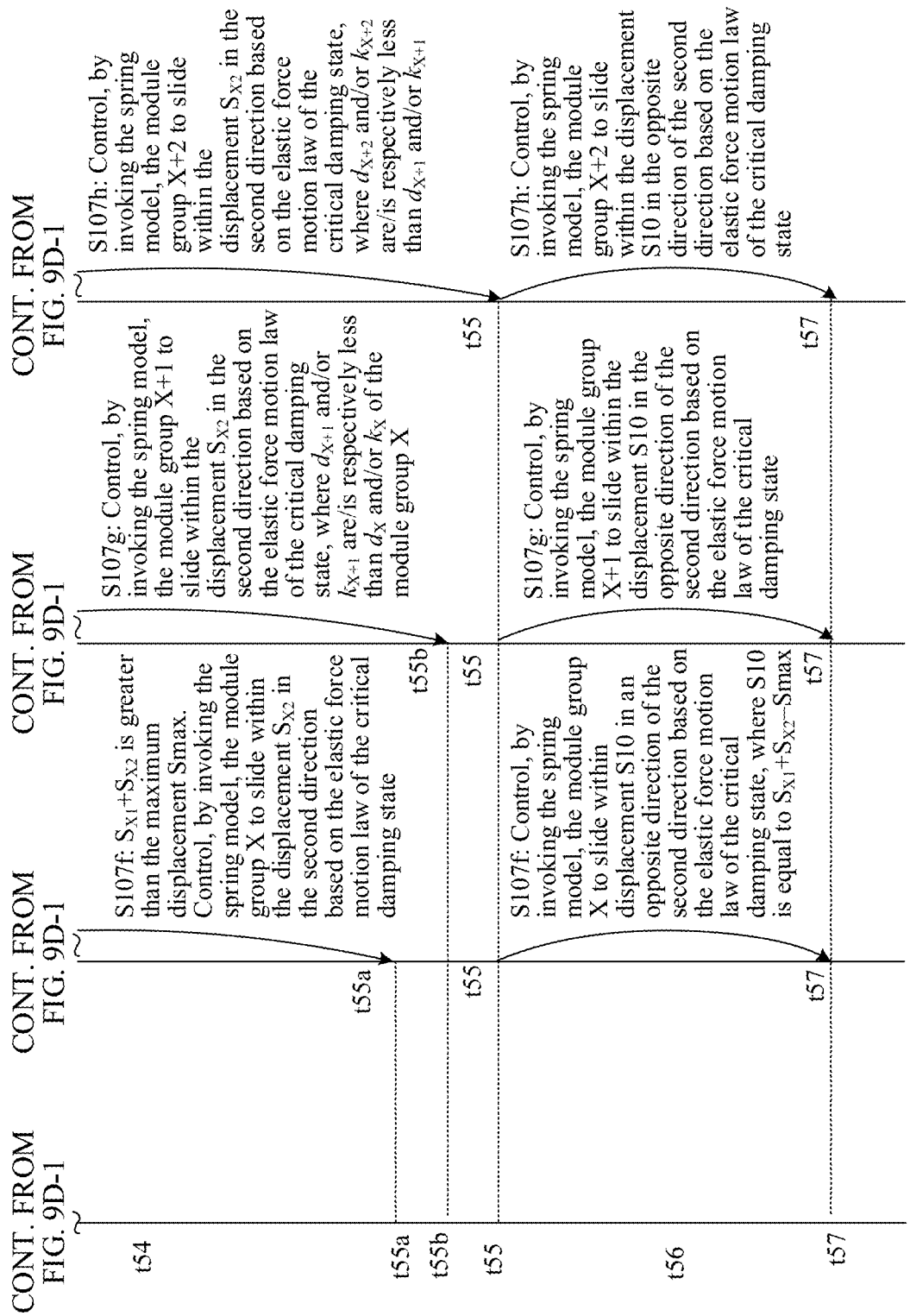

For example, FIG. 9D-1 and FIG. 9D-2 are a sequence diagram of a page sliding processing method according to an embodiment of this application. In FIG. 9D-1 and FIG. 9D-2, a module group X+1 and a module group X+2 use the foregoing sliding manner 2.

Different from FIG. 9C-1 and FIG. 9C-2, as shown in FIG. 9D-1 and FIG. 9D-2, in some embodiments, S107 may specifically include S107f, S107g, and S107h.

S107f: $S_{X1}+S_{X2}$ is greater than the maximum displacement Smax. Control, from a moment t53a to a moment t55a by invoking the spring model, the module group X to slide within the displacement $S_{X2}$ in the second direction based on the elastic force motion law of the critical damping state; and after displacement of the module groups in the first direction reaches $S_{X1}+S_{X2}$, control, from a moment t55 to a moment t57 by invoking the spring model, the module group X to slide within displacement S7 in an opposite direction of the second direction based on the elastic force motion law of the critical damping state.

S107g: Control, from the moment t53b to the moment t55b by invoking the spring model, the module group X+1 to slide within the displacement $S_{X2}$ in the second direction based on the elastic force motion law of the critical damping state, where $d_{X+1}$ and/or $k_{X+1}$ are/is respectively less than $d_X$ and/or $k_X$ of the module group X; and after the displacement of the module groups in the first direction reaches $S_{X1}+S_{X2}$, control, from the moment t55 to the moment t57 by invoking the spring model, the module group X+1 to slide within the displacement S7 in the opposite direction of the second direction based on the elastic force motion law of the critical damping state.

S107h: Control, from the moment t53c to the moment t55 by invoking the spring model, the module group X+2 to slide within the displacement $S_{X2}$ in the second direction based on the elastic force motion law of the critical damping state, where $d_{X+2}$ and/or $k_{X+2}$ are/is respectively less than $d_{X+1}$ and/or $k_{X+1}$; and after the displacement of the module groups in the first direction reaches $S_{X1}+S_{X2}$, control, from the moment t55 to the moment t57 by invoking the spring model, the module group X+2 to slide within the displacement S7 in the opposite direction of the second direction based on the elastic force motion law of the critical damping state.

The following describes a page sliding system provided in an embodiment of this application. For example, as shown in FIG. 10, the sliding system includes a friction model and an elastic force model.

Figure 10:
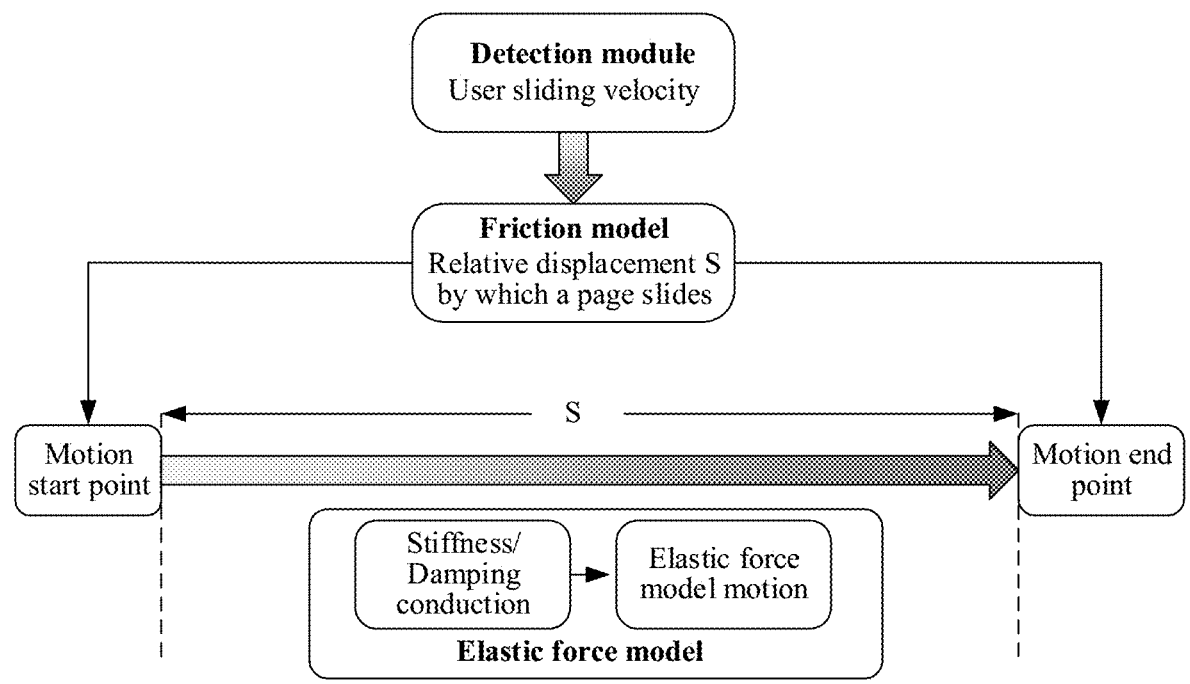
FIG. 10 is a schematic diagram of a page sliding system according to an embodiment of this application.

In some embodiments of this application, as shown in FIG. 10, an electronic device 100 detects, by using a detection module, a sliding operation performed by a user on a module group X and a sliding velocity of the sliding operation. The electronic device 100 may determine, by using the friction model, total displacement S by which a page slides based on the foregoing sliding velocity, to determine a motion start point and a motion end point of a page. In addition, the electronic device 100 may determine, based on a spring parameter (for example, a spring stiffness coefficient and a spring damping coefficient) of the module group X, a spring parameter of each module group through a damping conduction algorithm, to control, in a page sliding process within the foregoing total displacement, each module group to perform elastic force model motion based on the spring parameter of each module group.

The following describes a friction model provided in an embodiment of this application.

The friction model provided in this embodiment of this application is a friction model based on an exponential function. The following Formula (1) and Formula (2) are functional relationships among a velocity V (velocity), displacement S, and time t in the friction model.

$$V(t) = V_0 * e^{-4.2*f*t} \tag{1}$$

$$S(t) = \left(\frac{V_0}{-4.2*f}\right) * \left(e^{-4.2*f*t} - 1\right) \tag{2}$$

$V_0$ is an initial velocity of motion of an object, t is time of the motion of the object, and f is friction (friction) subjected to in a motion process of the object.

It may be understood that, larger friction indicates that the object is easier to stop and the object has a shorter motion distance. Conversely, the object has a longer motion distance. In this embodiment of this application, the friction may be a factory default setting of the electronic device 100, or may be set by the user.

Figure 11A:
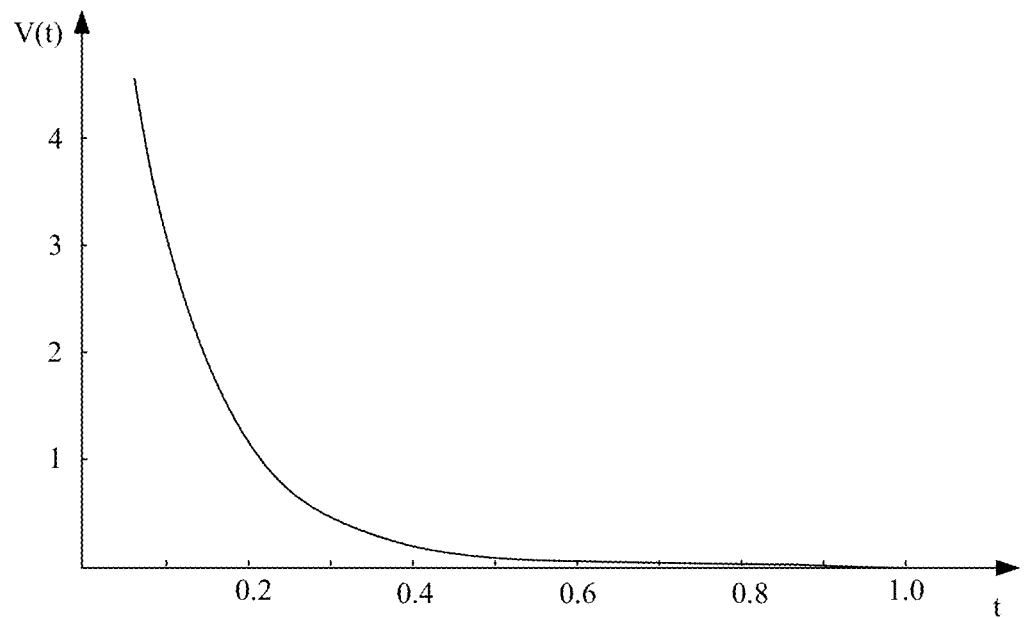
FIG. 11A is a curve diagram of a velocity V and time tin a friction model according to an embodiment of this application.
Figure 11B:
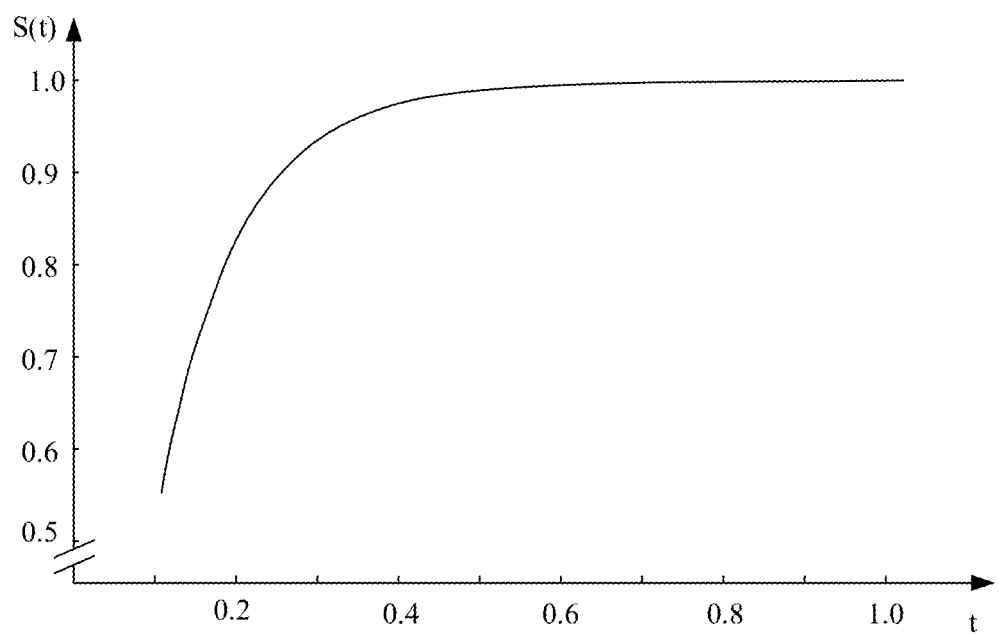
FIG. 11B is a curve diagram of a velocity V and time tin a friction model according to an embodiment of this application.

FIG. 11A is a curve diagram of a velocity V and time t in a friction model according to an embodiment of this application. FIG. 11B is a curve diagram of displacement S(t) and time t in a friction model according to an embodiment of this application.

In some embodiments of this application, the electronic device 100 may fit the sliding velocity of the user on a display screen 194 by using a velocity detection technology (for example, a VelocityTracker algorithm), and set the sliding velocity as $V_0$; and then determine the total displacement by which the page slides by using at least one of Formula (1) and Formula (2). The sliding velocity may be measured in pixels per second.

The following describes how to determine the displacement by which the page slides based on the friction model and the sliding velocity of the user.

In some embodiments of this application, the sliding velocity of the user is set as $V_0$. Refer to Formula (1). As t increases, V(t) tends to zero. When a velocity difference between a moment t81 and a moment t81−ε1 is less than a preset value λ1, in other words, when V(t81)−V(t81−ε1) <λ1, the electronic device 100 determines that S(t81) corresponding to the moment t81 in Formula (2) is relative displacement by which the page slides. Both a preset value ε1 and the preset value λ1 are preset minimum values. For example, ε1 is equal to 0.1, and λ1 is equal to 0.01. In some embodiments, the electronic device 100 may further determine, by using the friction model, that sliding duration by which the page slides is t81.

In some embodiments of this application, refer to Formula (2). As t increases, S(t) tends to a specific value. When a displacement difference between a moment t81 and a moment t81−ε2 is less than a preset value 22, in other words, when S(t81)−S(t81−ε)<λ2, the electronic device 100 determines that S(t81) corresponding to the moment t81 is relative displacement by which the page slides. In some embodiments, the electronic device 100 further determines, by using the friction model, that sliding duration by which the page slides is t81.

The following describes an elastic force model provided in an embodiment of this application. The elastic force motion conforms to damping vibration formulas of Hooke's law shown in Formula (3) and Formula (4).

$$f = ma \qquad (3)$$

$$-kx - d\frac{dx}{dt} = m\frac{d^2x}{dt^2} \qquad (4)$$

f is force in a vibration process, m is a mass, a is an acceleration, k is a stiffness (stiffness) coefficient, x is a deformation of a spring, d is a damping (damping) coefficient, and t is time.

The stiffness coefficient is an amount of an elastic force required by a unit deformation of the spring. A larger stiffness coefficient k indicates shorter time for the spring to return from maximum amplitude to an equilibrium position. Conversely, time is longer. In some embodiments, a value range of the stiffness coefficient k may be 1 to 999, and a recommended value range of the stiffness coefficient k may be 150 to 400.

The damping coefficient is a quantitative representation of damping force (for example, fluid resistance or friction) of the spring in the vibration process. The foregoing damping force can cause amplitude of the spring to gradually decrease until the spring stops at the equilibrium position. A larger damping coefficient indicates that the spring is easier to stop at the equilibrium position. Conversely, the spring is harder to stop at the equilibrium position. In some embodiments, a value range of the damping coefficient d may be 1 to 99, and the electronic device 100 may set the damping coefficient based on a specific scenario.

Figure 12A:
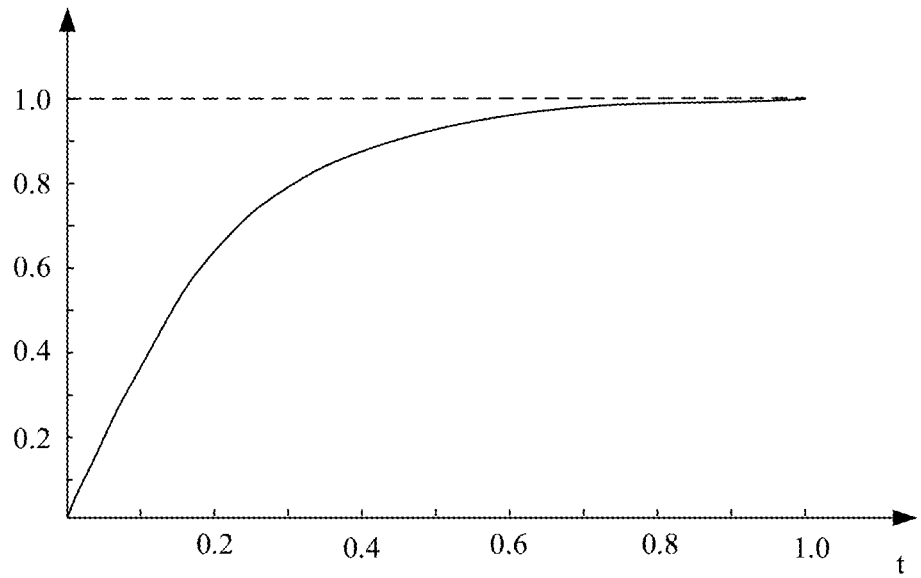
FIG. 12A is a schematic diagram of a critical damping motion state of a spring according to an embodiment of this application.
Figure 12B:
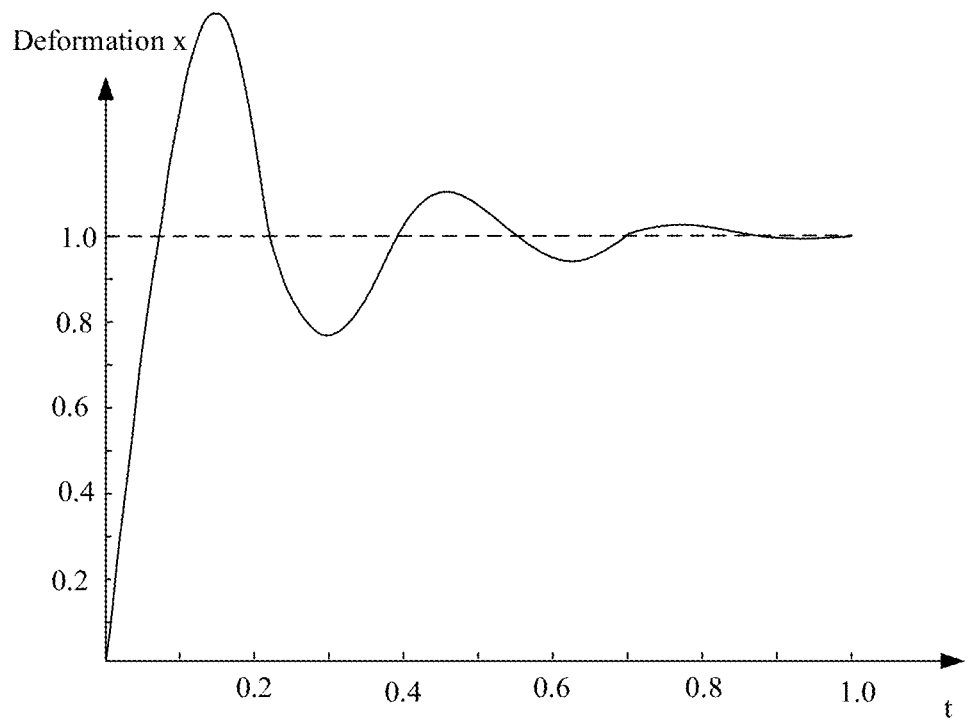
FIG. 12B is a schematic diagram of an underdamping motion state of a spring according to an embodiment of this application.
Figure 12C:
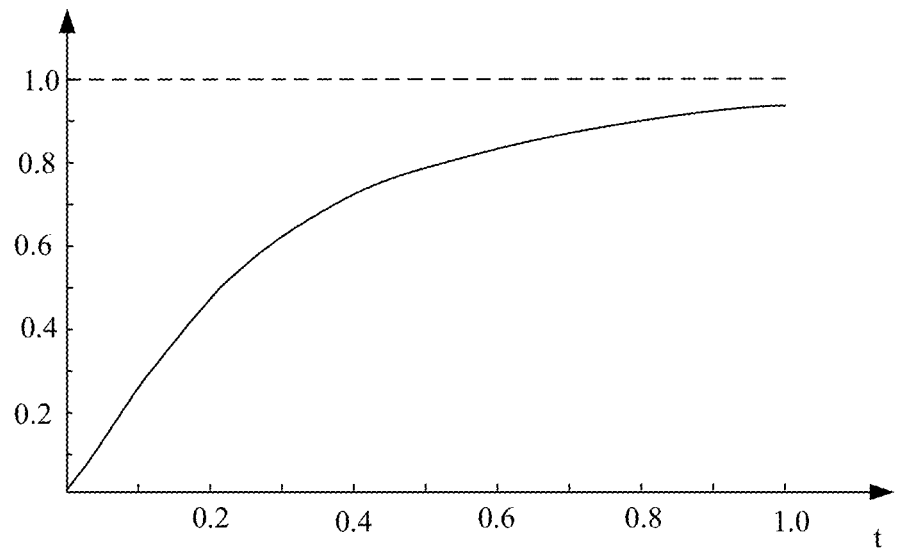
FIG. 12C is a schematic diagram of an overdamping motion state of a spring according to an embodiment of this application.

Based on damping features of the spring, motion states of the spring may be divided into three states: critical damping, underdamping and overdamping. For example, FIG. 12A to FIG. 12C are curve diagrams of a deformation x of a spring and time t in the foregoing three states according to an embodiment of this application. Refer to FIG. 12A. In the critical damping state, the spring stops moving after returning to the equilibrium position at a most stable velocity and no longer vibrates. Refer to FIG. 12B. In the underdamping state, the spring slowly decreases the amplitude through a plurality of vibrations and finally returns to the equilibrium position. Refer to FIG. 12C. In the overdamping state, the spring hardly vibrates, and the amplitude is gradually decreased to reach the equilibrium position. In some embodiments, when $d^2=4*m*k$, the spring is in the critical damping state; when $d^2<4*m*k$, the spring is in the underdamping state; and when $d^2>4*m*k$, the spring is in the overdamping state.

In this embodiment of this application, a page module may simulate a motion law of the spring, in other words, a change law of displacement S of the page module may simulate a change law of the deformation x of the spring. By adjusting a damping coefficient and/or a stiffness coefficient, the change law of the displacement of the page module may be adjusted, so that the page module simulates an elastic force motion law of the critical damping state, the overdamping state, or the underdamping state.

In this embodiment of this application, by adjusting a damping coefficient or a stiffness coefficient of each module group through a damping conduction algorithm, an electronic device 100 controls each module group to present a different motion trend in an elastic force motion law of a same state, and creates a dynamic effect in which a forward interval between module groups in a sliding direction of a user's finger is compressed and then restored to an initial value and a reverse interval between the module groups in an opposite direction of the sliding direction of the user's finger is stretched and then restored to an initial value, thereby increasing dynamic feedback on a sliding operation of the user.

In some embodiments of this application, the electronic device 100 may set the damping coefficient and the stiffness coefficient of the module group X, and determine, based on the damping coefficient and the stiffness coefficient of the module group X through the damping conduction algorithm, a damping coefficient and a stiffness coefficient corresponding to another module group. The damping coefficient and the stiffness coefficient of the module group X may be set by the electronic device 100 by default, or may be set by the user, or may be determined by the electronic device 100 based on a specific scenario. For example, refer to FIG. 5A. The electronic device 100 detects a sliding operation of the user; determines, based on the sliding operation, the module group X on which the user performs; and divides, with the module group X as a reference based on a position relationship between page modules and the module group X, the page modules into a module group X+c (for example, a module group X+1 or a module group X+2) from near to far, where c is a positive integer. The stiffness coefficient of the module group X is represented as $k_X$, a stiffness coefficient of the module group X+c is represented as $k_{X+c}$, the damping coefficient of the module group X is represented as $d_X$, and a damping coefficient of the module group X+c is represented as $d_{X+c}$.

In some embodiments, refer to Formula (5) and Formula (6). A relationship between the stiffness coefficient $k_X$ and the stiffness coefficient $k_{X+c}$ and a relationship between the damping coefficient $d_X$ and the damping coefficient $d_{X+c}$ may be represented as follows:

$$k_{X+c} = k_X * (c+1)^{-0.18*g} \quad (5)$$

$$d_{X+c} = d_X * (c+1)^{-0.18*g} \quad (6)$$

g is a conductivity coefficient.

In some embodiments, refer to Formula (7) and Formula (8). A relationship between the stiffness coefficient $k_X$ and the stiffness coefficient $k_{X+c}$ and a relationship between the damping coefficient $d_X$ and the damping coefficient $d_{X+c}$ may be represented as follows:

$$k_{X+c} = k_{X-c} * g \quad (7)$$

$$d_{X+c} = d_{X-c} * g \quad (8)$$

In some embodiments, a ratio of the damping coefficient to the stiffness coefficient of the module group X is represented as $p_X$, and a ratio of the damping coefficient to the stiffness coefficient of the module group X+c is represented as $p_{X+c}$. Refer to a damping conduction algorithm shown in Formula (9). A relationship between a parameter $p_X$ and a parameter $p_{X+c}$ may be represented as follows:

$$p_{X+c} = p_X * (c+1)^{-0.18*g} \quad (9)$$

For example, a value of g is 0.9, a value of $k_X$ is 30, and a value of $d_X$ is 228.

It can be learned from the damping conduction algorithm shown in any one of Formula (5) to Formula (9) that, a larger conductivity coefficient g indicates a larger difference between spring features corresponding to adjacent module groups, leading to a larger elastic force motion difference between the adjacent module groups. Conversely, a smaller difference between spring features corresponding to adjacent module groups leads to a smaller elastic force motion difference between the adjacent module groups. When the conductivity coefficient g is 0, the damping coefficient of each module group is equal, the stiffness coefficient of each module group is also equal, and spring features corresponding to adjacent module groups are the same.

In addition, it can be learned from Formula (5) to Formula (9) that, when g is greater than 0, the damping coefficient and the stiffness coefficient of the module group X are largest, and a damping coefficient and a stiffness coefficient of a module group farther away from the module group X are smaller. Smaller damping coefficient and stiffness coefficient of a module group indicate that elastic force motion of the module group is harder to return to an equilibrium position, in other words, sliding duration of the module group is longer.

In this embodiment of this application, by adjusting a damping coefficient or a stiffness coefficient of each module group through a damping conduction algorithm, an electronic device 100 controls each module group to present a different motion trend within total displacement based on an elastic force motion law, and creates a dynamic effect in which a forward interval between module groups in a sliding direction of a user's finger is compressed and a reverse interval between the module groups in an opposite direction of the sliding direction of the user's finger is stretched, thereby increasing dynamic feedback on a sliding operation of the user, improving interestingness of the sliding operation, and effectively improving user experience.

Figure 13A:
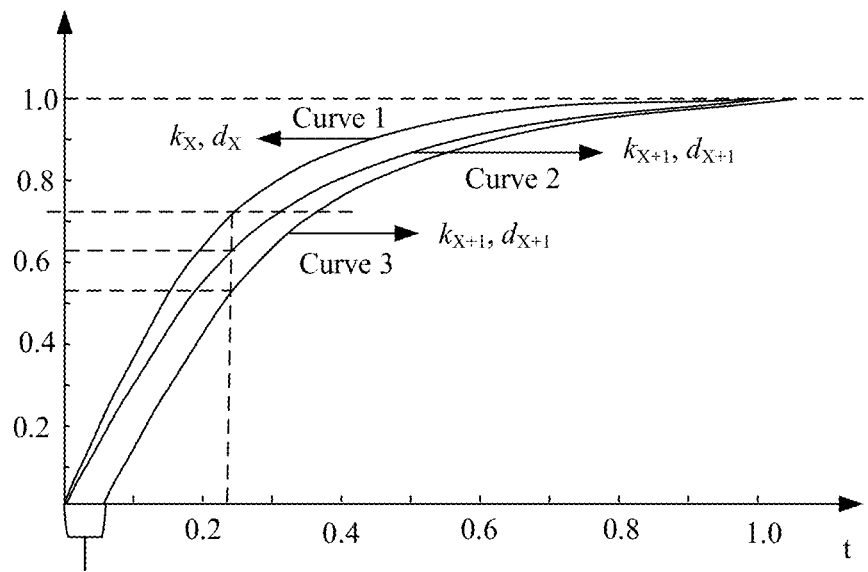
FIG. 13A and FIG. 13B are schematic curve diagrams of displacement changes according to an embodiment of this application.

For example, a curve 1 shown in FIG. 13A is a motion curve diagram of the module group X, a curve 2 is a motion curve diagram of a module group X+1, and the conductivity coefficient g of the module group is greater than 0. It can be learned from FIG. 13A that, at a same moment, displacement corresponding to the module group X is greater than displacement of the module group X+1, and a displacement difference between the module group X and the module group X+1 increases from 0 and then decreases to 0.

Refer to FIG. 6A and FIG. 6C. There may be a time difference $\Delta t$ between sliding start moments of adjacent module groups. For example, a curve 3 shown in FIG. 13A is another motion curve diagram of the module group X+1, and a sliding start moment of the module group X+1 corresponding to the curve 3 is $\Delta t$ later than that of the module group X. It can be learned from FIG. 13A that, at a same moment, when $\Delta t$ is greater than 0, a displacement difference between the module group X and the module group X+1 is greater.

Figure 13B:
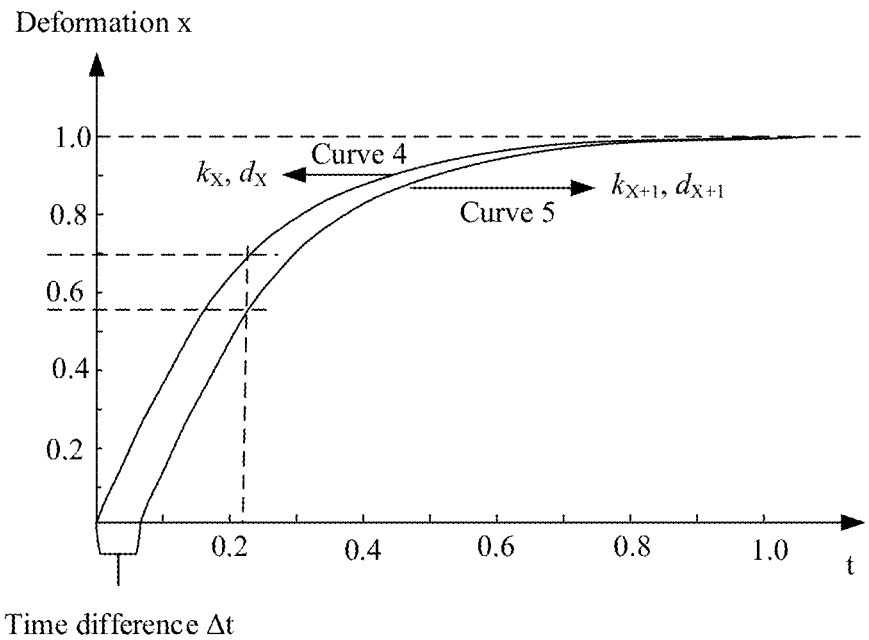

For example, a curve 4 shown in FIG. 13B is a motion curve diagram of the module group X, a curve 5 is a motion curve diagram of the module group X+1, a conductivity coefficient g of the module group is equal to 0, and a sliding start moment of the module group X+1 is $\Delta t$ later than that of the module group X. It can be learned from FIG. 13B that, at a same moment, displacement of the module group X is greater than displacement of the module group X+1, and a displacement difference between the module group X and the module group X+1 increases from 0 and then decreases to 0.

It can be learned from FIG. 13A and FIG. 13B that, the displacement difference between the module group X and the module group X+1 first increases and then decreases, and total displacement is equal. Therefore, as sliding time t increases, a forward interval $F_{(X+1, X)}$ between the module group X and the module group X+1 decreases from an initial value and then increases to the initial value; and a reverse interval between the module group X and the module group X+1 increases from an initial value and then decreases to the initial value. Therefore, both values of g and $\Delta t$ shown in FIG. 13A and FIG. 13B can implement a dynamic effect similar to stretching and compression of a spring between page modules provided in this embodiment of this application.

FIG. 14A to FIG. 14D are schematic diagrams of sliding duration of module groups under different values of g and $\Delta t$.

Figure 14A:
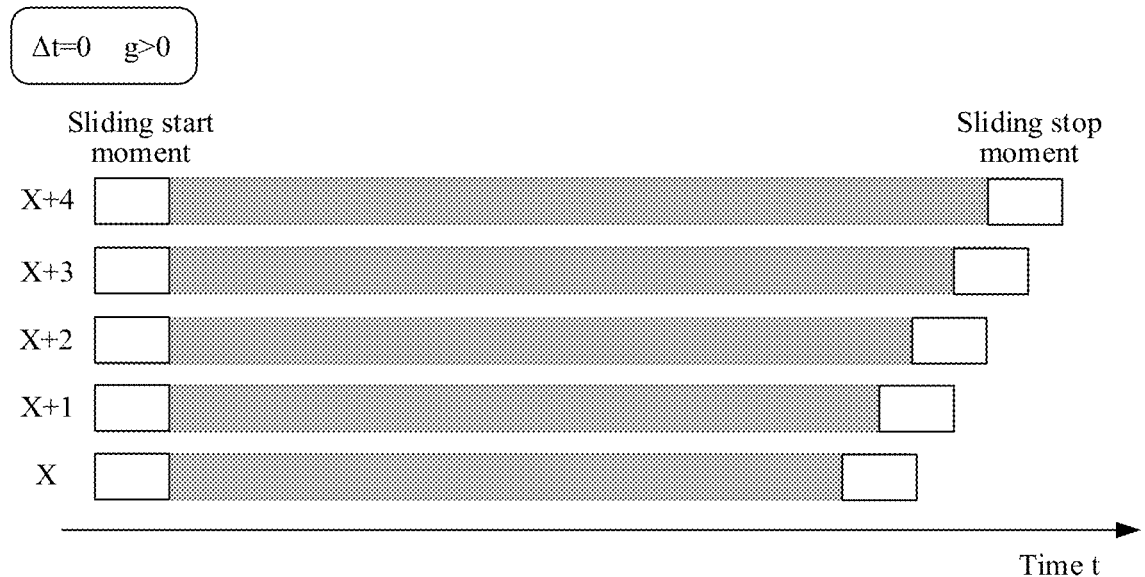
FIG. 14A to FIG. 14D are schematic diagrams of sliding time of page modules according to an embodiment of this application.
Figure 14B:
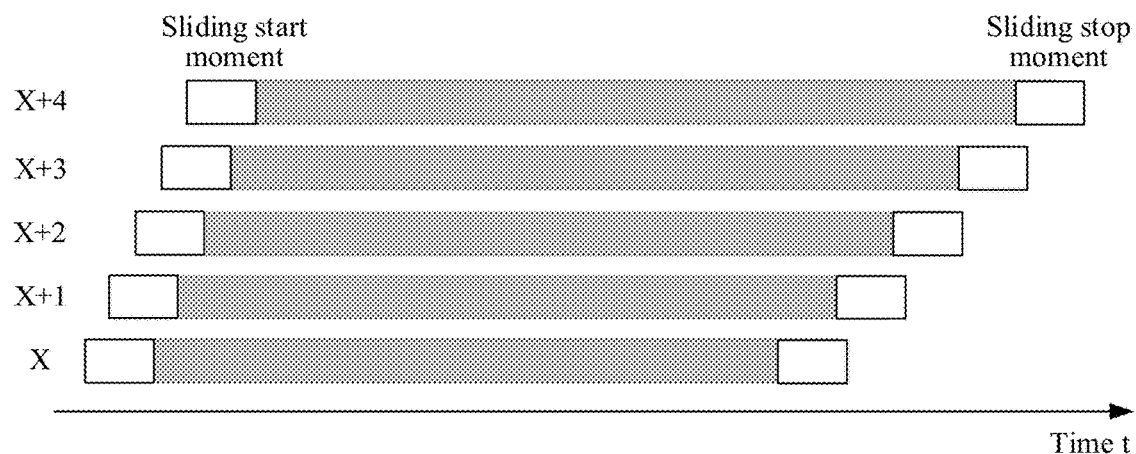
Figure 14C:
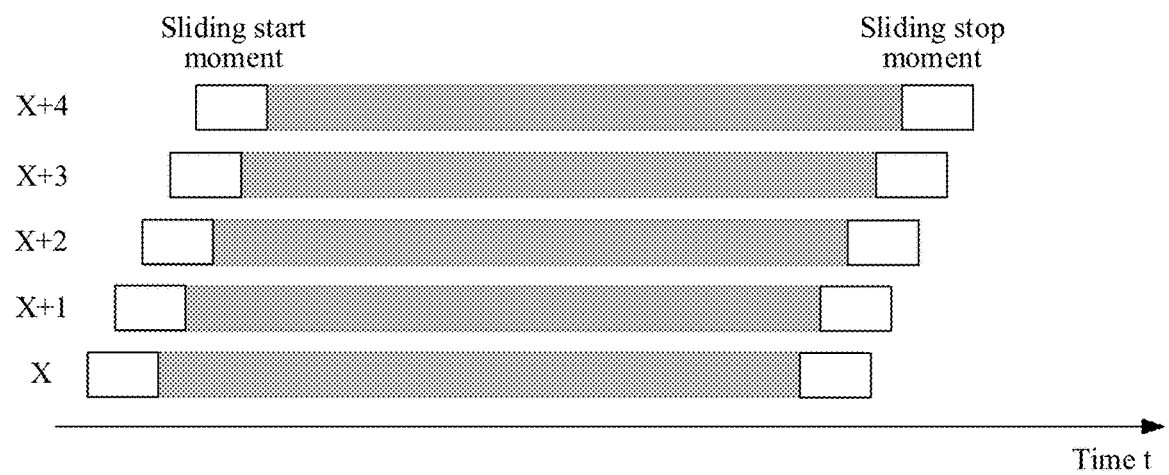
Figure 14D:
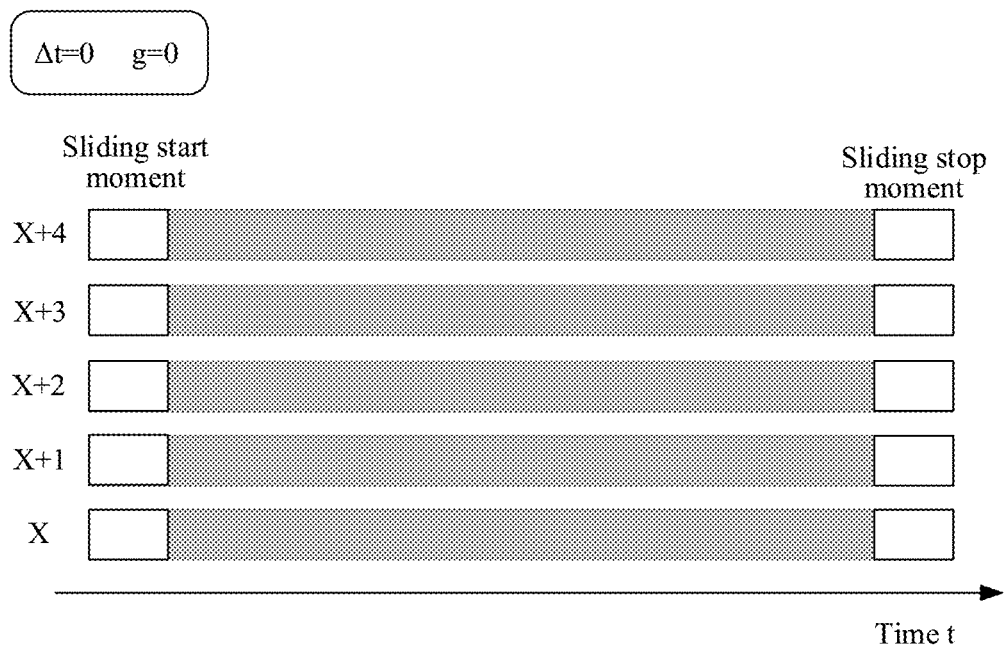

As shown in FIG. 14A, when $\Delta t=0$, there is no time difference between sliding start moments of adjacent module groups, and the module groups simultaneously move. When g>0, a larger elastic force motion difference between adjacent module groups indicates longer sliding duration of a module group farther away from the module group X. As shown in FIG. 14B, when $\Delta t>0$ and g>0, compared with FIG. 14A, a later sliding start moment of a module group farther away from the module group X indicates a later sliding stop moment of the module group farther away from the module group X. As shown in FIG. 14C, when $\Delta t>0$ and g=0, sliding duration of the module groups is the same, and a time difference between sliding start moments of adjacent module groups is equal to a time difference between sliding stop moments of the foregoing adjacent module groups. As shown in FIG. 14D, when $\Delta t=0$ and g=0, sliding duration of the module groups is the same, and sliding start moments of adjacent module groups are also the same, that is, motion trends of the module groups are the same, and forward intervals and reverse intervals between the module groups remain unchanged.

By using a page 10 as an example, the following describes drawing and refreshing of the page in a page sliding process.

In this embodiment of this application, when displaying display content 1 on the page 10, an electronic device 100 receives a sliding operation 1 performed on the page 10. In response to the foregoing sliding operation 1, the electronic device 100 displays display content 2 on the page 10.

In some embodiments of this application, in response to a received user operation 1, the electronic device 100 draws the display content 1 on the page 10 in a refresh periodicity 1, and stores the display content 1 in a cache area. Then, the electronic device 100 displays the foregoing display content 1 in a refresh periodicity 2 based on image data of the display content 1 drawn in the cache area. In response to the received sliding operation 1, the electronic device 100 draws the display content 2 on the page 10 in a refresh periodicity 3, and stores the display content 2 in the cache area. Then, the electronic device 100 displays the foregoing display content 2 in a refresh periodicity 4 based on image data of the display content 2 drawn in the cache area.

In some embodiments of this application, in response to a received user operation 1, the electronic device 100 draws all content on the page 10 in a refresh periodicity 1, and stores all the content in a cache area. Then, the electronic device 100 displays the foregoing display content 1 in a refresh periodicity 2 based on image data of the display content 1 drawn in the cache area. In response to the received sliding operation 1, the electronic device 100 displays the foregoing display content 2 in a refresh periodicity 4 based on image data of the display content 2 drawn in the cache area.

In some embodiments of this application, in response to a received user operation 1, the electronic device 100 may draw, in a refresh periodicity 1, the display content 1 on a page 10 and one or more page modules closest to the display content 1 on the page 10, and store them in a cache area. Then, the electronic device 100 displays the foregoing display content 1 in a refresh periodicity 2 based on image data of the drawn display content 1 in the cache area. When determining that the image data drawn in the cache area includes the display content 2, in response to the received sliding operation 1, the electronic device 100 displays the foregoing display content 2 in a refresh periodicity 4 based on image data of the display content 2 drawn in the cache area. When the image data drawn in the cache area includes part content of the display content 2, in response to the received sliding operation 1, the electronic device 100 draws the display content 2 in a refresh periodicity 3 based on the foregoing part content, and stores the display content 2 in the cache area; and then displays the foregoing display content 2 in a refresh periodicity 4 based on image data of the display content 2 drawn in the cache area. When the image data drawn in the cache area does not include content of the display content 2, in response to the received sliding operation 1, the electronic device 100 draws the display content 2 in a refresh periodicity 3, and stores the display content 2 in the cache area; and then displays the foregoing display content 2 in a refresh periodicity 4 based on image data of the display content 2 drawn in the cache area.

The following describes an animation embodiment principle of page sliding provided in this embodiment of this application.

Figure 15:
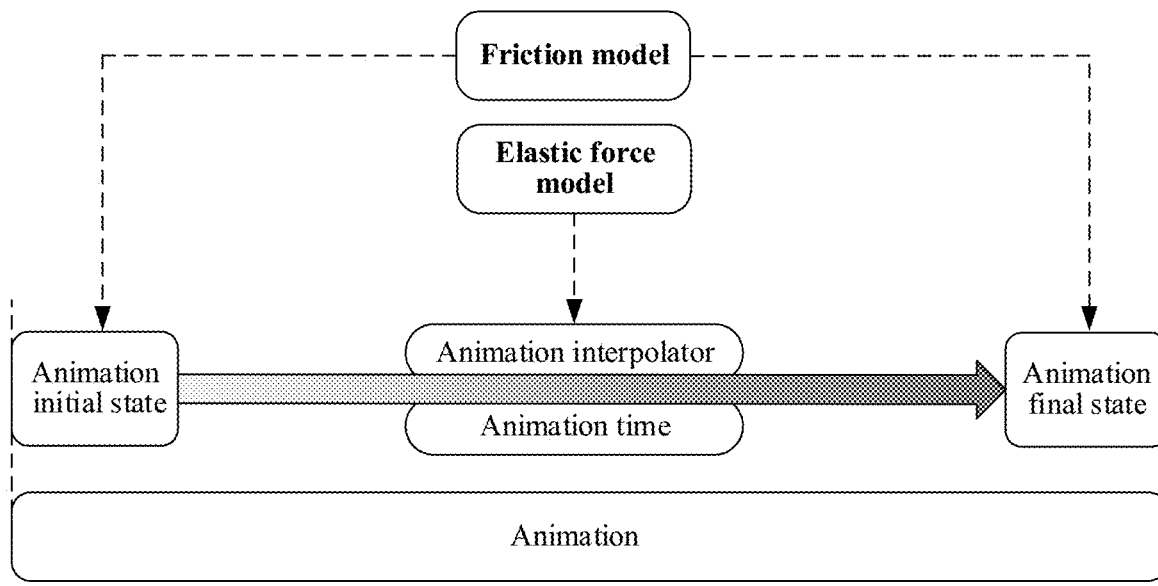
FIG. 15 is a diagram of an animation embodiment principle according to an embodiment of this application.

For example, FIG. 15 is a diagram of an animation embodiment principle according to an embodiment of this application. As shown in FIG. 15, elements for implementing an animation include an animation initial state, an animation final state, animation duration, and an interpolator (Interpolator) of the animation. The interpolator is configured to set change logic for transitioning animation property values from the initial state to the final state, to control a change rate of the animation, so that an animation effect can change at one or more rates of a uniform velocity, an acceleration, a deceleration, and a parabolic rate.

In some embodiments of this application, the electronic device 100 may determine the animation duration, the animation initial state, and the animation final state based on a friction model; and set the change logic of the animation property values through a system interpolator or a customized interpolator (for example, an elastic force interpolator or a friction interpolator). When the animation is run, when determining, based on the change logic, that the foregoing animation property values change, the electronic device 100 draws a frame image based on the foregoing animation property values, and refreshes a displayed page. For the animation effect of page sliding provided in this embodiment of this application, refer to pages shown in FIG. 5A to FIG. 8C.

In some embodiments of this application, when determining, based on the change logic of the interpolator, that the animation property values change, the electronic device 100 invokes, based on the foregoing animation property values, an invalidate( ) function to refresh a view, that is, invokes an onDraw( ) function to redraw and display the view.

In some embodiments of this application, the electronic device 100 customizes the elastic force interpolator. In an embodiment, parameters of a function of the elastic force interpolator include at least a stiffness coefficient (stiffness) and a damping coefficient (damping). For example, code of the function of the elastic force interpolator may be represented as one of the following: "SpringInterpolator(float stiffness, float damping)", "SpringInterpolator(float stiffness, float damping, float endPos)", "SpringInterpolator (float stiffness, float damping, float endPos, float velocity)", and "SpringInterpolator(float stiffness, float damping, float endPos, float velocity, float valueThreshold)".

A parameter endPos represents relative displacement, namely, a difference between an initial position and a rest position of a spring. In this embodiment of this application, endPos may represent relative displacement of page sliding.

A parameter valueThreshold represents a threshold for determining that the animation stops. When a displacement (or another property) difference between two adjacent frames is less than the threshold, the animation stops being run. A larger threshold indicates that the animation is easier to stop and running time is shorter. Conversely, the running time of the animation is longer. A value of the threshold may be set based on specific animation properties. In some embodiments, a parameter FloatValueHold of the elastic force interpolator is 1/1000 by default, and in another construction method, a value of the threshold is 1. In some embodiments, when the threshold is customized, recommended values shown in Table 1 may be used based on the animation properties.

TABLE 1

| Animation properties | valueThreshold |
|---|---|
| ROTATION/ROTATION_X/ROTATION_Y | 1/10 |
| ALPHA | 1/256 |
| SCALE_X/SCALE_Y | 1/500 |
| TRANSLATION_Y/TRANSLATION_X | 1 |

In addition, the threshold may also directly use the following constants provided by a DynamicAnimation type: MIN_VISIBLE_CHANGE_PIXELS, MIN_VISIBLE_CHANGE_ROTATION_DEGREES, MIN_VISIBLE_CHANGE_ALPHA, and MIN_VISIBLE_CHANGE_SCALE.

For example, specific code of an animation type of the customized elastic force interpolator may be represented as follows:

"PhysicalInterpolatorBase interpolator=new SpringInterpolator(400 F, 40F, 200 F, 2600 F, 1 F);
ObjectAnimator animator=ObjectAnimator.ofFloat(listView, "translationY", 0, 346);
animator.setDuration(interpolator.getDuration( ); //obtain animation duration
animator. setInterpolator(interpolator); //set the customized interpolator for the animation type
animator. start( ); //run the animation".

In some embodiments of this application, the electronic device 100 customizes the friction interpolator. For example, code of a function of the friction interpolator may be represented as "FlingInterpolator(float initVelocity,float friction)". initVelocity represents an initial velocity.

For example, specific code of an animation type using the friction interpolator may be represented as follows:

"PhysicalInterpolatorBase interpolator=new FlingInterpolator(600F, 0.5 F);
ObjectAnimator animator=ObjectAnimator.ofFloat(listView, "translationY", 0, interpolator.getEndOffset( );
animator.setDuration(interpolator.getDuration( ); //obtain animation duration
animator.setInterpolator(interpolator); //set the customized interpolator for the animation type
animator.start( ) //run the animation".

In some embodiments of this application, the electronic device 100 may set the animation duration (Duration) and a start position by itself; and may also invoke an engine model to obtain the animation duration and an end position, and then set them for the animation type (Animator type).

For example, code for the electronic device 100 to invoke the engine model to obtain the animation duration may be represented as "com.huawei.dynamicanimation.interpolator.PhysicalInterpolatorBase#getDuration".

For example, code for invoking the engine model to obtain the end position of the spring may be represented as "com.huawei.dynamicanimation.interpolator.PhysicalInterpolatorBase#getEndOffset".

For example, code for setting the parameter valueThreshold may be represented as "com.huawei.dynamicanimation.interpolator.PhysicalInterpolatorBase#setValueThreshold".

In some embodiments of this application, code of an animation type using an elastic engine may be represented as one of the following code: "HWSpringAnimation(K object, FloatPropertyCompat<K> property, float stiffness, float damping, float startValue, float endValue, float velocity)", and "HWSpringAnimation(K object, FloatPropertyCompat<K> property, float stiffness, float damping, float endValue, float velocity)".

A parameter object represents an animation object. Property represents the animation type or a property object on which the interpolator performs. Refer to Table 1. The parameter may be for indirectly setting valueThreshold. In an interpolator version, the parameter is optional. If valueThreshold has been set in another manner, the parameter is not set. In other words, a construction method without a property parameter is directly used. In an animation type version, the parameter is a mandatory parameter. The DynamicAnimation type has provided the following constants that can be used directly: "TRANSLATION_X, TRANSLATION_Y, TRANSLATION_Z, SCALE_X, SCALE_Y, ROTATION, ROTATION_X, ROTATION_Y, X, Y, Z, ALPHA, SCROLL_X, and SCROLL_Y". The electronic device 100 may also customize to implement a ViewProperty interface.

For example, specific code of an animation type using a spring interpolator may be represented as follows:

"HWSpringAnimation animation=HWSpringAnimation (listView, DynamicAnimation.TRANSLATION_Y, 400F, 40 F, 0, 1000 F);
animation. start( );"

In some embodiments of this application, code of an animation type using a friction engine may be represented as: "HWFlingAnimation (K object, FloatPropertyCompat<K> property, float initVelocity, float friction)".

For example, specific code of an animation type using friction may be represented as follows:

"HWFlingAnimation animation=HWFlingAnimation (listView, DynamicAnimation.TRANSLATION_Y, 2000F, 0.5 F);
animation. start( )".

Based on the foregoing embodiments, the following describes a procedure of a page sliding processing method according to an embodiment of this application.

FIG. 16 is a schematic flowchart of a page sliding processing method according to an embodiment of this application. As shown in FIG. 16, the page sliding processing method includes but is not limited to operation S201 to operation S204.

S201: An electronic device detects a sliding operation performed on a first module on a first page in a first direction.

In some embodiments, the foregoing first page may be a page shown in FIG. 5A, FIG. 6A, FIG. 7A, FIG. 8B, FIG. 8D, or FIG. 8F, the first module may be a focus module X (namely, a page module X) on the page shown in the foregoing figure, the first direction may be a direction 1 shown in the foregoing figure, and the foregoing sliding operation may be that a user's finger shown in the foregoing figure slides on a display screen in the direction 1 by using an area in which the focus module X is located as a start point. In some embodiments, the foregoing first page may be a page shown in FIG. 5B, the first module may be a focus module X shown in FIG. 5B, the first direction may be a direction 2 shown in FIG. 5B, and the foregoing sliding operation may be that a user's finger shown in the foregoing figure slides on a display screen in the direction 2 by using an area in which the focus module X is located as a start point.

Not limited to the foregoing page, the first page may alternatively be another page that includes a plurality of page modules. For example, refer to pages shown in FIG. 3A to FIG. 3H.

S202: The electronic device controls, in a first time period in response to the sliding operation, a first module group to slide in a second direction based on detected displacement of the sliding operation in the second direction, and controls, based on displacement of the first module group, a second module group to slide in the second direction based on a first preset motion law, where the first module group includes the first module, the second module group includes at least one module other than the first module group on the first page, the second module group is determined by the electronic device based on a position relationship between a module in the second module group and the first module, and the second direction is determined based on the first direction; and the displacement of the first module group is greater than or equal to displacement of the second module group in the first time period, and a first displacement difference between the first module group and the second module group is greater than zero at an end moment of the first time period.

In some embodiments of this application, the method further includes: The electronic device controls, in the first time period in response to the sliding operation based on the displacement of the first module group, a third module group to slide in the second direction based on the first preset motion law, where the third module group includes at least one module other than the first module group and the second module group on the first page, and the third module group is determined by the electronic device based on a position relationship between a module in the third module group and the first module; and the displacement of the second module group is greater than or equal to displacement of the third module group in the first time period, and a second displacement difference between the first module group and the second module group is greater than zero at the end moment of the first time period.

In some embodiments, the foregoing first page may be a page shown in FIG. 5A, FIG. 6A, FIG. 7A, FIG. 8B, FIG. 8D, or FIG. 8F, the first module may be a focus module X (namely, a page module X) on the page shown in the foregoing figure, the first direction may be a direction 1 shown in the foregoing figure, and the second direction may also be the direction 1 shown in the foregoing figure. The first module group may be the module group X shown in the foregoing figure, the second module group may be a module group X+1 shown in the foregoing figure, and the third module group may be a module group X+2 shown in the foregoing figure. The first displacement difference may be a displacement difference between the module group X and the module group X+1, and the second displacement difference may be a displacement difference between the module group X+1 and the module group X+2.

In some embodiments, position distributions of the module in the second module group and the module in the third module group around the first module present a first-type distribution, and the second module group is closer to the first module group than the third module group. For example, the first-type distribution includes: a circular distribution, an elliptical distribution, a rectangular distribution, a square distribution, and the like. In addition, the electronic device may also determine the first module group, the second module group, and the third module group on the page in another manner. For details, refer to related embodiments of FIG. 3A to FIG. 3H. Details are not described herein again.

It should be noted that, the first page may include only two module groups, or may include more module groups. This is not specifically limited herein. For example, refer to FIG. 3A to FIG. 3H. One page may include more module groups. In addition, for how to determine the second direction in which the module group slides based on the first direction in which the sliding operation slides, refer to related embodiments of FIG. 4A and FIG. 4B for details. Details are not described herein again.

In some embodiments, refer to related descriptions of FIG. 5E, FIG. 5F, FIG. 5G, and FIG. 6C. The first time period may be from a moment t11a to a moment t12a, a start moment of the first time period may be the moment t11a, and the end moment of the first time period may be the moment t12a. The electronic device controls, from the moment t11a to the moment t12a in response to the sliding operation of the user, the module group X to slide in the direction 1 based on detected displacement of the sliding operation of the user's finger in the direction 1, and controls, based on displacement of the module group X, the module group X+1 to slide in the direction 1 based on the first preset motion law. From the moment t11a to the moment t12a, the displacement of the module group X is greater than or equal to displacement of the module group X+1. At the moment t12a, a displacement difference between the module group X and the module group X+1 is greater than zero. In some embodiments, refer to the related descriptions of FIG. 5E, FIG. 5F, FIG. 5G, and FIG. 6C. From the moment t11a to the moment t12a, the electronic device controls, based on the displacement of the module group X, the module group X+2 to slide in the direction 1 based on the first preset motion law. From the moment t11a to the moment t12a, the displacement of the module group X+1 is greater than or equal to displacement of the module group X+2. At the moment t12a, a displacement difference between the module group X+1 and the module group X+2 is greater than zero.

Figure 7D:
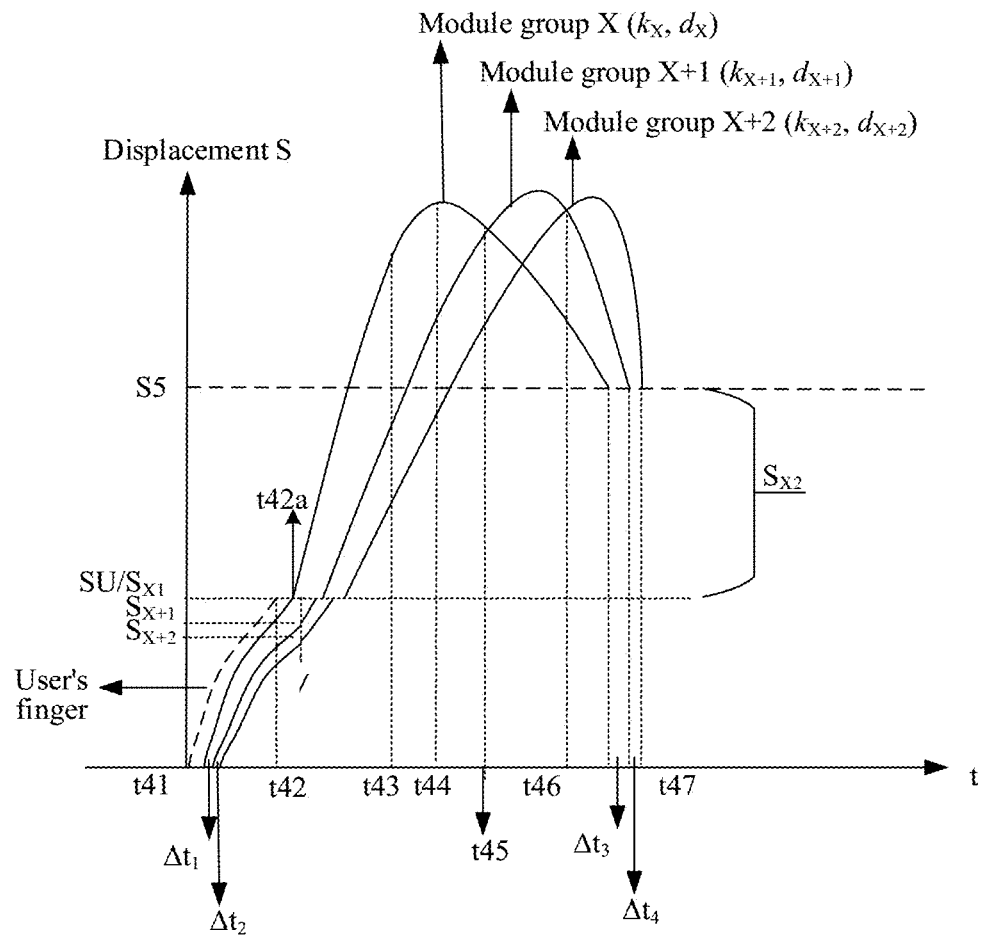

In some embodiments, refer to related descriptions of FIG. 7B to FIG. 7D. The first time period may be from a moment t41a to a moment t42a, a start moment of the first time period may be the moment t41a, and the end moment of the first time period may be the moment t42a. The electronic device controls, from the moment t41a to the moment t42a in response to the sliding operation of the user, the module group X to slide in the direction 1 based on detected displacement of the sliding operation of the user's finger in the direction 1, and controls, based on displacement of the module group X, the module group X+1 to slide in the direction 1 based on the first preset motion law. From the moment t41a to the moment t42a, the displacement of the module group X is greater than or equal to displacement of the module group X+1. At the moment t42a, a displacement difference between the module group X and the module group X+1 is greater than zero. In some embodiments, refer to the related descriptions of FIG. 7B to FIG. 7D. From the moment t41a to the moment t42a, the electronic device controls, based on the displacement of the module group X, the module group X+2 to slide in the direction 1 based on the first preset motion law. From the moment t41a to the moment t42a, the displacement of the module group X+1 is greater than or equal to displacement of the module group X+2. At the moment t42a, a displacement difference between the module group X+1 and the module group X+2 is greater than zero.

In some embodiments, refer to related descriptions of FIG. 8C and FIG. 8E. The first time period may be from a moment t51a to a moment t53a, a start moment of the first time period may be the moment t51a, and the end moment of the first time period may be the moment t53a. From the moment t51a to the moment t53a, the displacement of the module group X is greater than or equal to displacement of the module group X+1. At the moment t53a, a displacement difference between the module group X and the module group X+1 is greater than zero. In some embodiments, refer to the related descriptions of FIG. 8C and FIG. 8E. From the moment t51a to the moment t53a, the electronic device controls, based on the displacement of the module group X, the module group X+2 to slide in the direction 1 based on the first preset motion law. From the moment t51a to the moment t53a, the displacement of the module group X+1 is greater than or equal to displacement of the module group X+2. At the moment t53a, a displacement difference between the module group X+1 and the module group X+2 is greater than zero.

In some embodiments, refer to related descriptions of FIG. 8G. The first time period may be from a moment t61a to a moment t62a, a start moment of the first time period may be the moment t61a, and the end moment of the first time period may be the moment t62a. From the moment t61a to the moment t62a, the displacement of the module group X is greater than or equal to displacement of the module group X+1. At the moment t62a, a displacement difference between the module group X and the module group X+1 is greater than zero. In some embodiments, refer to the related descriptions of FIG. 8G. From the moment t61a to the moment t62a, the electronic device controls, based on the displacement of the module group X, the module group X+2 to slide in the direction 1 based on the first preset motion law. From the moment t61a to the moment t62a, the displacement of the module group X+1 is greater than or equal to displacement of the module group X+2. At the moment t62a, a displacement difference between the module group X+1 and the module group X+2 is greater than zero.

In an embodiment, that the electronic device controls a first module group to slide in a second direction based on detected displacement of the sliding operation in the second direction, and controls, based on displacement of the first module group, a second module group to slide in the second direction based on a first preset motion law includes: The electronic device controls, based on the detected displacement of the sliding operation in the second direction, the first module group to start sliding in the second direction at a start moment of the first time period, and controls, at a moment separated by a first time difference from the start moment of the first time period based on the displacement of the first module group, the second module group to start sliding in the second direction based on the first preset motion law.

In an embodiment, that the electronic device controls, in the first time period based on the displacement of the first module group, a third module group to slide in the second direction based on the first preset motion law includes: The electronic device controls, in the first time period based on the displacement of the first module group, the third module group to start sliding in the second direction based on the first preset motion law at a moment separated by a third time difference from the start moment of the first time period, where the third time difference is greater than the first time difference.

For example, refer to related descriptions of FIG. 6C. The first time difference may be a time difference between a sliding start moment (namely, t11a) of the module group X and a sliding start moment (namely, t11b) of the module group X+1. The third time difference may be a time difference between the sliding start moment (namely, t11a) of the module group X and a sliding start moment (namely, t11c) of the module group X+2.

For example, refer to related descriptions of FIG. 7A and FIG. 7D. The first time difference may be a time difference, namely, $\Delta t_1$, between a sliding start moment of the module group X and a sliding start moment of the module group X+1. The third time difference may be a time difference, namely, $\Delta t_1 + \Delta t_1$, between the sliding start moment of the module group X and a sliding start moment of the module group X+2.

It should be noted that, in FIG. 8B, FIG. 8D, and FIG. 8F, there is a time difference between sliding start moments of adjacent module groups, the module group X slides at the earliest, and a module group farther away from the module group X slides later. Details are not described herein again.

In an embodiment, that the electronic device controls a first module group to slide in a second direction based on detected displacement of the sliding operation in the second direction, and controls, based on displacement of the first module group, a second module group to slide in the second direction based on a first preset motion law includes: The electronic device controls, in a first refresh periodicity in the first time period, the first module group to slide by fourth displacement in the second direction based on third displacement of the sliding operation in the second direction in a previous refresh periodicity of the first refresh periodicity; and controls, based on the fourth displacement by which the first module group slides in the previous refresh periodicity, the second module group to slide by fifth displacement based on the first preset motion law, where the fourth displacement is equal to h times the third displacement, h is greater than 0 and less than or equal to 1, and the fifth displacement is less than or equal to the fourth displacement.

In an embodiment, that the electronic device controls, in the first time period based on the displacement of the first module group, a third module group to slide in the second direction based on the first preset motion law includes: The electronic device controls, in the first refresh periodicity in the first time period, the first module group to slide by the fourth displacement in the second direction based on the third displacement of the sliding operation in the second direction in the previous refresh periodicity of the first refresh periodicity; and controls, based on the fourth displacement by which the first module group slides in the previous refresh periodicity, the third module group to slide by eleventh displacement based on the first preset motion law, where the fourth displacement is equal to h times the third displacement, h is greater than 0 and less than or equal to 1, and the eleventh displacement is less than or equal to the fifth displacement.

In some embodiments, refer to related embodiments of FIG. 5E and FIG. 5F. The previous refresh periodicity of the first refresh periodicity may be a second refresh periodicity, the fourth displacement may be displacement $\Delta sx$ of the module group X in the second refresh periodicity, the foregoing fifth displacement may be displacement of the module group X+1 in the first refresh periodicity, the foregoing eleventh displacement may be displacement of the module group X+2 in the first refresh periodicity, the fifth displacement of the module group X+1 is less than $\Delta sx$, and the eleventh displacement of the module group X+2 is less than the fifth displacement of the module group X+1.

In an embodiment, when displacement of the first module group at a start moment of the first refresh periodicity is less than or equal to maximum displacement in the second direction, h is equal to 1; and when the displacement of the first module group at the start moment of the first refresh periodicity is greater than the maximum displacement in the second direction, h is greater than zero and less than 1, where the maximum displacement in the second direction is determined based on a position of a first edge module in an opposite direction of the second direction on the first page at the start moment of the first time period.

In some embodiments, refer to FIG. 8G. In the first time period (namely, from the moment t61a to the moment t62a), the page does not cross a boundary, to be specific, displacement of the user's finger in the direction 1 is less than maximum displacement Smax, and an electronic device 100 controls displacement (namely, the fourth displacement) of the module group X in a refresh periodicity (for example, the first refresh periodicity) to be equal to detected displacement (namely, the third displacement) of the sliding operation in the direction 1 in a previous refresh periodicity. At the moment t62a, the electronic device 100 detects that the user stops the sliding operation, and displacement of the module group X is equal to displacement SU of the user's finger. In some embodiments, refer to FIG. 8C. From the moment t52 to the moment t53, the page crosses a boundary, to be specific, displacement of the user's finger in the direction 1 (namely, current displacement of the module group X) is greater than maximum displacement Smax. From the moment t52 to the moment t53, the electronic device 100 controls displacement (namely, the fourth displacement) of the module group X in a refresh periodicity (for example, the refresh periodicity) to be less than detected displacement (namely, the third displacement) of the sliding operation in the direction 1 in a previous refresh periodicity, in other words, h is less than 1. At the moment t53, the electronic device 100 detects that the user stops the sliding operation, and displacement of the module group X is less than displacement SU of the user's finger.

In an embodiment, maximum displacement in the first direction is equal to displacement of the first edge module sliding to a first preset position of a display screen of the electronic device in the second direction. For example, refer to related descriptions of FIG. 4C. Details are not described herein again.

S203: The electronic device determines, based on first displacement of the first module group at the end moment of the first time period, second displacement of the second module group in the second direction in a second time period after the first time period.

For example, refer to related descriptions of the four types of page sliding effects in the foregoing embodiments. The first displacement at the end moment of the first time period is $S_{X1}$.

In some embodiments of this application, the electronic device determines, based on the first displacement of the first module group at the end moment of the first time period, twelfth displacement of the third module group in the second direction in the second time period after the first time period.

In an embodiment, the determining, based on first displacement of the first module group at the end moment of the first time period, second displacement of the second module group in the second direction in a second time period after the first time period includes: determining sixth displacement of the first module group in the second direction in the second time period based on the sliding operation; and determining that the second displacement is equal to the sixth displacement plus the first displacement minus seventh displacement, where the seventh displacement is displacement of the second module group at the end moment of the first time period, where from the start moment of the first time period to the end moment of the second time period, displacement of the first module group and the second module group in the second direction is equal to the first displacement plus the sixth displacement.

In an embodiment, the determining, based on the first displacement of the first module group at the end moment of the first time period, twelfth displacement of the third module group in the second direction in the second time period after the first time period includes: determining that the twelfth displacement is equal to the sixth displacement plus the first displacement minus thirteenth displacement, where the thirteenth displacement is displacement of the third module group at the end moment of the first time period; and at the end moment of the second time period, displacement of the third module group in the second direction is equal to the first displacement plus the sixth displacement.

For example, refer to related descriptions of FIG. 5E, FIG. 5F, FIG. 6C, FIG. 7B, FIG. 7C, FIG. 8C, and FIG. 8E. The electronic device 100 determines, at the end moment of the first time period, the sixth displacement by which the module group X continues to slide in the direction 1, where the sixth displacement may be $S_{X2}$ in the foregoing figure.

In some embodiments, refer to FIG. 5E, FIG. 5F, and FIG. 6C. The second time period may be from the moment t12a to a moment t15. The second displacement may be displacement of the module group X+1 in the direction 1 in the time period from the moment t12a to the moment t15, and the seventh displacement may be displacement of the module group X+1 at the moment t12a. In some embodiments, refer to FIG. 5E, FIG. 5F, and FIG. 6C. The second time period may be from the moment t12a to the moment t15. The twelfth displacement may be displacement of the module group X+2 in the direction 1 in the time period from the moment t12a to the moment t15, and the thirteenth displacement may be displacement of the module group X+2 at the moment t12a.

In some embodiments, refer to FIG. 7B and FIG. 7D. The second time period may be from the moment t42a to a moment t47. The second displacement may be displacement of the module group X+1 in the direction 1 in the time period from the moment t42a to the moment t47, and the seventh displacement may be displacement of the module group X+1 at the moment t42a. In some embodiments, refer to FIG. 7B and FIG. 7D. The second time period may be from the moment t42a to the moment t47. The twelfth displacement may be displacement of the module group X+2 in the direction 1 in the time period from the moment t42a to the moment t47, and the thirteenth displacement may be displacement of the module group X+2 at the moment t42a.

In some embodiments, refer to FIG. 8C. The second time period may be from the moment t53a to a moment t55. The second displacement may be displacement of the module group X+1 in the direction 1 in the time period from the moment t53a to the moment t55, and the seventh displacement may be displacement of the module group X+1 at the moment t53a. In some embodiments, refer to FIG. 8C. The second time period may be from the moment t53a to the moment t55. The twelfth displacement may be displacement of the module group X+2 in the direction 1 in the time period from the moment t53a to the moment t55, and the thirteenth displacement may be displacement of the module group X+2 at the moment t53a.

In some embodiments, refer to FIG. 8G. The second time period may be from the moment t62a to a moment t65. The second displacement may be displacement of the module group X+1 in the direction 1 in the time period from the moment t62a to the moment t65, and the seventh displacement may be displacement of the module group X+1 at the moment t62a. In some embodiments, refer to FIG. 8G. The second time period may be from the moment t62a to the moment t65. The twelfth displacement may be displacement of the module group X+2 in the direction 1 in the time period from the moment t62a to the moment t65, and the thirteenth displacement may be displacement of the module group X+2 at the moment t62a.

In an embodiment, the determining sixth displacement by which the first module group slides in the first direction in the second time period based on the sliding operation includes: determining the sixth displacement based on at least one of a sliding velocity of the sliding operation, a friction model, and the maximum displacement, where the sliding velocity of the sliding operation is an instantaneous velocity before the sliding operation is stopped, or the sliding velocity of the sliding operation is an average velocity of the sliding operation; a larger sliding velocity of the sliding operation indicates larger sixth displacement; a larger friction coefficient of the friction model indicates smaller sixth displacement; and larger maximum displacement indicates smaller sixth displacement. Refer to related descriptions of FIG. 5E, FIG. 5F, FIG. 6C, FIG. 7B, FIG. 7C, FIG. 8C, and FIG. 8E. The sixth displacement may be $S_{X2}$ in the foregoing figure. Specifically, for how to determine $S_{X2}$ based on at least one of the sliding velocity of the sliding operation, the friction model, and the maximum displacement, refer to the foregoing embodiments. Details are not described herein again.

In an embodiment, the determining, based on first displacement of the first module group at the end moment of the first time period, second displacement of the second module group in the second direction in a second time period after the first time period includes: determining, based on the first displacement of the first module group at the end moment of the first time period, that the second displacement of the second module group in the second direction in the second time period after the first time period is the first displacement minus the seventh displacement.

In an embodiment, the determining, based on the first displacement of the first module group at the end moment of the first time period, twelfth displacement of the third module group in the second direction in the second time period after the first time period includes: determining, based on the first displacement of the first module group at the end moment of the first time period, that the twelfth displacement of the third module group in the second direction in the second time period after the first time period is the first displacement minus the thirteenth displacement.

In some embodiments, refer to FIG. 5G. The second time period may be from the moment t12a to a moment t17. The second displacement may be displacement of the module group X+1 in the direction 1 in the time period from the moment t12a to the moment t17, and the seventh displacement may be displacement of the module group X+1 at the moment t12a. In some embodiments, refer to FIG. 5G. The second time period may be from the moment t12a to the moment t17. The twelfth displacement may be displacement of the module group X+2 in the direction 1 in the time period from the moment t12a to the moment t17, and the thirteenth displacement may be displacement of the module group X+2 at the moment t12a.

In some embodiments, refer to FIG. 8E. The second time period may be from the moment t53a to a moment t58. The second displacement may be displacement of the module group X+1 in the direction 1 in the time period from the moment t53a to the moment t58, and the seventh displacement may be displacement of the module group X+1 at the moment t53a. In some embodiments, refer to FIG. 8E. The second time period may be from the moment t53a to the moment t58. The twelfth displacement may be displacement of the module group X+2 in the direction 1 in the time period from the moment t53a to the moment t58, and the thirteenth displacement may be displacement of the module group X+2 at the moment t53a.

In an embodiment, the first module group stops sliding after the first time period, and the second module group stops sliding after the second time period. In an embodiment, the first module group stops sliding after the first time period, the second module group and the third module group stop sliding after the second time period, and a sliding stop moment of the third module group is later than a sliding stop moment of the second module group. In some embodiments, refer to FIG. 5G. The first time period is from the moment t11a to the moment t12a, the second time period is from the moment t12a to the moment t17, the module group X stops sliding after the moment t12a, and the module group X+1 and the module group X+2 stop sliding after the moment t17.

In an embodiment, the first module group and the second module group stop sliding after the second time period. In an embodiment, the third module group stops sliding after the second time period. For example, refer to FIG. 5E, FIG. 5F, and FIG. 6C. The first time period is from the moment t11a to the moment t12a, the second time period is from the moment t12a to the moment t15, and the module group X, the module group X+1, and the module group X+2 stop sliding after the moment t15.

S204: The electronic device controls, in the second time period, the second module group to slide within the second displacement based on a second preset motion law, where the first displacement difference decreases at an end moment of the second time period compared with a start moment of the second time period.

In some embodiments of this application, in the second time period, the third module group is controlled to slide within the twelfth displacement based on the second preset motion law, where the second displacement difference decreases at the end moment of the second time period compared with the start moment of the second time period.

In some embodiments, refer to related descriptions of FIG. 5E to FIG. 5G, FIG. 6C, FIG. 7B to FIG. 7D, FIG. 8C, FIG. 8E, and FIG. 8G. Compared with the start moment of the second time period, at the end moment of the second time period, the displacement difference between the module group X and the module group X+1 decreases, and the displacement difference between the module group X+1 and the module group X+2 decreases.

In an embodiment, the method further includes: controlling, in the second time period, the first module group to slide within the sixth displacement based on the second preset motion law. For example, refer to related descriptions of FIG. 5E, FIG. 5F, FIG. 6C, FIG. 7B to FIG. 7D, FIG. 8C, and FIG. 8G. The sixth displacement is $S_{X2}$, and the electronic device 100 slides within the sixth displacement based on the second preset motion law.

In an embodiment, the second time period successively includes a third time period and a fourth time period, and the controlling, in the second time period, the second module group to slide within the second displacement based on a second preset motion law specifically includes: controlling, in the third time period, the second module group to slide within eighth displacement based on the first preset motion law, where the eighth displacement is equal to the first displacement minus the seventh displacement; and controlling, in the fourth time period, the second module group to slide within the sixth displacement based on the second preset motion law.

In an embodiment, the second time period successively includes a seventh time period and an eighth time period, and the controlling, in the second time period, the third module group to slide within the twelfth displacement based on the second preset motion law specifically includes: controlling, in the seventh time period, the third module group to slide within fourteenth displacement based on the first preset motion law, where the fourteenth displacement is equal to the first displacement minus the thirteenth displacement; and controlling, in the eighth time period, the third module group to slide within the sixth displacement based on the second preset motion law.

In some embodiments, refer to FIG. 5F. The second time period may be from the moment t12a to the moment t15, the third time period may be from the moment t12a to the moment t12b, and the fourth time period may be from the moment t12b to the moment t15. The seventh displacement may be displacement of the module group X+1 at the moment t12a, and the eighth displacement is $S_{X1}$ (namely, displacement of the module group X at the moment t12a) minus the seventh displacement. In some embodiments, refer to FIG. 5F. The second time period may be from the moment t12a to the moment t15, the seventh time period may be from the moment t12a to the moment t12c, and the eighth time period may be from the moment t12c to the moment t15. The thirteenth displacement may be displacement of the module group X+2 at the moment t12a, and the fourteenth displacement is $S_{X1}$ minus the thirteenth displacement.

In an embodiment, in the second time period, velocities of the first module group and the second module group in the second direction are greater than or equal to zero, and displacement of the first module group is greater than or equal to displacement of the second module group; the first displacement difference increases from the start moment of the second time period to a first moment of the second time period; the first displacement difference decreases from the first moment to the end moment of the second time period; and the first displacement difference is equal to zero at the end moment of the second time period.

In an embodiment, in the second time period, a velocity of the third module group in the second direction is greater than or equal to zero, and displacement of the second module group is greater than or equal to displacement of the third module group; the second displacement difference increases from the start moment of the second time period to a third moment of the second time period; and the second displacement difference decreases from the third moment to the end moment of the second time period.

In some embodiments, refer to related descriptions of FIG. 5E, FIG. 5F, FIG. 6C, FIG. 8C, and FIG. 8G. In the second time period, velocities of the module group X, the module group X+1, and the module group X+2 in the direction 1 are greater than or equal to zero, displacement of the module group X is greater than or equal to displacement of the module group X+1, and the displacement of module group X+1 is greater than or equal to displacement of the module group X+2. In the second time period, the first displacement difference between the module group X and the module group X+1 first increases and then decreases, and the second displacement difference between the module group X+1 and the module group X+2 first increases and then decreases. At the end moment of the second time period, the first displacement difference and the second displacement difference are equal to zero.

In an embodiment, from the start moment of the second time period to a second moment of the second time period, displacement of the first module group in the second direction is greater than or equal to displacement of the second module group in the second direction, and the first displacement difference first increases and then decreases to zero; and from the second moment to the end moment of the second time period, displacement of the first module group in the second direction is less than or equal to displacement of the second module group in the second direction, and the first displacement difference first increases and then decreases to zero.

In an embodiment, from the start moment of the second time period to a fourth moment of the second time period, displacement of the second module group in the second direction is greater than or equal to displacement of the third module group in the second direction, and the second displacement difference first increases and then decreases to zero; and from the fourth moment to the end moment of the second time period, displacement of the second module group in the second direction is less than or equal to displacement of the third module group in the second direction, and the second displacement difference first increases and then decreases to zero.

In some embodiments, refer to related descriptions of FIG. 7B to FIG. 7D. The second time period may be from the moment t42a to the moment t47, and the second moment may be the moment t45. From the moment t42a to the moment t45, displacement of the module group X is greater than or equal to displacement of the module group X+1, and the first displacement difference between the module group X and the module group X+1 first increases and then decreases to zero. From the moment t45 to the moment t47, displacement of the module group X is less than or equal to displacement of the module group X+1, and the first displacement difference first increases and then decreases to zero. In some embodiments, refer to related descriptions of FIG. 7B to FIG. 7D. The fourth moment may be the moment t46. From the moment t42a to the moment t46, displacement of the module group X+1 is greater than or equal to displacement of the module group X+2, and the second displacement difference between the module group X+1 and the module group X+2 first increases and then decreases to zero. From the moment t46 to the moment t47, displacement of the module group X+1 is less than or equal to displacement of the module group X+2, and the second displacement difference first increases and then decreases to zero.

In an embodiment, the first displacement plus the sixth displacement is greater than the maximum displacement, and the method further includes: controlling, in a fifth time period after the second time period, the first module group and the second module group to move by ninth displacement in the opposite direction of the second direction based on the first preset motion law, where in the fifth time period, displacement of the first module group in the second direction is less than displacement of the second module group in the second direction, and the first displacement difference first increases and then decreases to zero; the first module group and the second module group stop sliding after the fifth time period; and the ninth displacement is equal to the first displacement plus the sixth displacement minus the maximum displacement.

In an embodiment, the first displacement plus the sixth displacement is greater than the maximum displacement, and the method further includes: controlling, in the fifth time period after the second time period, the third module group to move by the ninth displacement in the opposite direction of the second direction based on the first preset motion law, where in the fifth time period, the displacement of the second module group in the second direction is less than displacement of the third module group in the second direction, and the second displacement difference first increases and then decreases to zero; the third module group stops sliding after the fifth time period; and the ninth displacement is equal to the first displacement plus the sixth displacement minus the maximum displacement.

In some embodiments, refer to FIG. 8C. The first displacement ($S_{X1}$) plus the sixth displacement ($S_{X2}$) is greater than the maximum displacement Smax, the fifth time period may be from the moment t55 to a moment t57, and the ninth displacement may be S7 shown in the figure. From the moment t55 to the moment t57, displacement of the module group X is less than displacement of the module group X+1, the displacement of the module group X+1 is less than displacement of the module group X+2, and the first displacement difference (namely, the displacement difference between module group X and module group X+1) and the second displacement difference (namely, the displacement difference between module group X+1 and module group X+2) first increase and then decrease to zero. The module group X, the module group X+1, and the module group X+2 stop sliding after the moment t57.

In some embodiments, refer to FIG. 8G. The first displacement ($S_{X1}$) plus the sixth displacement ($S_{X2}$) is greater than the maximum displacement Smax, the fifth time period may be from the moment t65 to a moment t67, and the ninth displacement may be S9 shown in the figure. From the moment t65 to the moment t67, displacement of the module group X is less than displacement of the module group X+1, the displacement of the module group X+1 is less than displacement of the module group X+2, and the first displacement difference (namely, the displacement difference between module group X and module group X+1) and the second displacement difference (namely, the displacement difference between module group X+1 and module group X+2) first increase and then decrease to zero. The module group X, the module group X+1, and the module group X+2 stop sliding after the moment t67.

In an embodiment, the controlling, in the fifth time period after the second time period, the first module group and the second module group to move by the ninth displacement in the opposite direction of the second direction based on the first preset motion law includes: controlling, at a start moment of the fifth time period, the first module group to start moving by the ninth displacement in the opposite direction of the second direction based on the first preset motion law; and controlling, at a moment separated by a second time difference from the start moment of the fifth time period, the second module group to start moving by the ninth displacement in the opposite direction of the second direction based on the first preset motion law.

In an embodiment, the controlling, in the fifth time period after the second time period, the third module group to move by the ninth displacement in the opposite direction of the second direction based on the first preset motion law includes: controlling, at a moment separated by a fourth time difference from the start moment of the fifth time period, the third module group to start moving by the ninth displacement in the opposite direction of the second direction based on the first preset motion law, where the fourth time difference is greater than the second time difference.

In some embodiments, refer to FIG. 8B. From a moment t55, there may be a time difference between sliding start moments of module groups. Refer to FIG. 8D. From a moment t58, there may be a time difference between sliding start moments of module groups. Refer to FIG. 8F. From a moment t65, there may be a time difference between sliding start moments of module groups. A sliding start moment of the module group X is earlier than a sliding start moment of the module group X+1, and the sliding start moment of the module group X+1 is earlier than a sliding start moment of the module group X+2. The second time difference may be the time difference between the module group X and the module group X+1, and the fourth time difference may be a time difference between the module group X and the module group X+2.

In an embodiment, the first displacement is greater than the maximum displacement, and the method further includes: controlling, in a sixth time period after the second time period, the first module group and the second module group to move tenth displacement in the opposite direction of the second direction based on the first preset motion law, where in the sixth time period, displacement of the first module group in the second direction is less than displacement of the second module group in the second direction, and the first displacement difference first increases and then decreases to zero; and the first module group and the second module group stop sliding after the sixth time period.

In an embodiment, the first displacement is greater than the maximum displacement, and the method further includes: controlling, in the sixth time period after the second time period, the third module group to move by the tenth displacement in the opposite direction of the second direction based on the first preset motion law, where in the sixth time period, the displacement of the second module group in the second direction is less than displacement of the third module group in the second direction, and the first displacement difference first increases and then decreases to zero; and the third module group stops sliding after the sixth time period.

In some embodiments, refer to FIG. 8E. The sixth time period may be from the moment t58 to a moment t60, and the tenth displacement may be S8 shown in the figure. From the moment t58 to the moment t60, displacement of the module group X is less than displacement of the module group X+1, the displacement of the module group X+1 is less than displacement of the module group X+2, and the first displacement difference (namely, the displacement difference between module group X and module group X+1) and the second displacement difference (namely, the displacement difference between module group X+1 and module group X+2) first increase and then decrease to zero. The module group X, the module group X+1, and the module group X+2 stop sliding after the moment t60.

In an embodiment, sliding stop moments of the first module group and the second module group are same; or a sliding stop moment of the first module group is earlier than a sliding stop moment of the second module group; or a sliding stop moment of the first module group is later than a sliding stop moment of the second module group.

In an embodiment, sliding stop moments of the first module group, the second module group, and the second module group are same; or a sliding stop moment of the first module group is earlier than a sliding stop moment of the second module group, and the sliding stop moment of the second module group is earlier than a sliding stop moment of the third module group; or a sliding stop moment of the first module group is later than a sliding stop moment of the second module group, and the sliding stop moment of the second module group is later than a sliding stop moment of the third module group.

In some embodiments, refer to FIG. 6C. A sliding stop moment of the module group X may be the moment t14$a$, a sliding stop moment of the module group X+1 may be the moment t14$b$, and a sliding stop moment of the module group X+1 may be the moment t15. In other words, the sliding stop moment of the module group X is earlier than the sliding stop moment of the module group X+1, and the sliding stop moment of the module group X+1 is earlier than the sliding stop moment of the module group X+2. For page sliding effects shown in FIG. 5A, FIG. 7A, FIG. 8B, FIG. 8D, and FIG. 8E, there may be three cases for final sliding stop moments of the module group X, the module group X+1, and the module group X+2. For details, refer to the foregoing embodiments. Details are not described herein again.

In an embodiment, both the first preset motion law and the second preset motion law are elastic force motion laws in a critical damping state; or the first preset motion law is an elastic force motion law in a critical state, and the second preset motion law is an elastic force motion law in an underdamping state, where an elastic force motion law of each module group is determined by an elastic force parameter of the module group.

In an embodiment, the first time difference, the second time difference, the third time difference, and the fourth time difference are greater than zero; and an elastic force parameter of the first module group, an elastic force parameter of the second module group, and an elastic force parameter of the third module group are equal; or an elastic force parameter of the first module group is greater than an elastic force parameter of the second module group, and the elastic force parameter of the second module group is greater than an elastic force parameter of the third module group. In an embodiment, the first time difference and the second time difference are equal to zero, an elastic force parameter of the first module group is greater than an elastic force parameter of the second module group, and the elastic force parameter of the second module group is greater than an elastic force parameter of the third module group. For example, refer to FIG. 14A to FIG. 14D. It can be learned that, when sliding start moments of module groups are the same, a displacement difference change of adjacent module groups can be formed by adjusting elastic force parameters of the module groups by using a conductivity coefficient g; when the elastic force parameters of the module groups are the same, the displacement difference change of the adjacent module groups can be formed by adjusting the sliding start moments of the module groups; and when both the elastic force parameters and the sliding start moments of the module groups are different, the displacement difference change of the adjacent module groups can also be formed.

In an embodiment, the elastic force parameter of the first module group is greater than the elastic force parameter of the second module group, the elastic force parameter of the second module group is greater than the elastic force parameter of the third module group, and the elastic force parameters of the second module group and the third module group are determined based on the elastic force parameter of the first module group and a conductivity coefficient, where a larger conductivity coefficient indicates a larger elastic force parameter difference between the first module group and the second module group and a larger elastic force parameter difference between the first module and the second module group; and a larger elastic force parameter of the first module group indicates larger elastic force parameters of the first module group and the second module group. In an embodiment, the elastic force parameter includes a ratio of a stiffness coefficient to a damping coefficient; or the elastic force parameter includes a stiffness coefficient and/or a damping coefficient. For details, refer to related descriptions of the damping conduction algorithm in the foregoing embodiments. Details are not described herein again.

In an embodiment, a value of the conductivity coefficient is 0.9.

In an embodiment, a value range of the stiffness coefficient is 150 to 400, and a value range of the damping coefficient is 1 to 99.

In an embodiment, a value of the stiffness coefficient is 228, and a value of the damping coefficient is 30.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable media are integrated.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

What is claimed is:

1. A page sliding processing method, comprising:
    detecting, by an electronic device, a sliding operation performed on a first module on a first page in a first direction;
    after detecting the sliding operation, the method further comprising:
    controlling, by the electronic device in a first time period in response to the sliding operation, a first module group to slide in a second direction based on a detected displacement of the sliding operation in the second direction, and controlling, based on a displacement of the first module group, a second module group to slide in the second direction based on a first preset motion law, wherein
    the first module group comprises the first module, the second module group comprises at least one module other than modules of the first module group on the first page, the second module group is determined by the electronic device based on a position relationship between a module in the second module group and the first module, and the second direction is determined based on the first direction and sliding directions that modules on the first page can slide to; and the displacement of the first module group is greater than or equal to displacement of the second module group in the first time period, and a first displacement difference between the first module group and the second module group is greater than zero at an end moment of the first time period;

determining, based on a first displacement of the first module group at the end moment of the first time period, a second displacement of the second module group in the second direction in a second time period after the first time period; and controlling, in the second time period, the second module group to slide within the second displacement based on a second preset motion law, wherein the first displacement difference decreases at an end moment of the second time period compared with a start moment of the second time period.

2. The method according to claim 1, wherein the controlling, by the electronic device, the first module group to slide in a second direction based on detected displacement of the sliding operation in the second direction, and controlling, based on displacement of the first module group, the second module group to slide in the second direction based on the first preset motion law comprises:

controlling, by the electronic device based on the detected displacement of the sliding operation in the second direction, the first module group to start sliding in the second direction at a start moment of the first time period, and controlling, at a moment separated by a first time difference from the start moment of the first time period based on the displacement of the first module group, the second module group to start sliding in the second direction based on the first preset motion law.

3. The method according to claim 1, wherein the controlling, by the electronic device, the first module group to slide in the second direction based on the detected displacement of the sliding operation in the second direction, and controlling, based on the displacement of the first module group, the second module group to slide in the second direction based on the first preset motion law comprises:

controlling, by the electronic device in a first refresh periodicity in the first time period, the first module group to slide by a fourth displacement in the second direction based on a third displacement of the sliding operation in the second direction in a previous refresh periodicity of the first refresh periodicity; and controlling, based on the fourth displacement by which the first module group slides in the previous refresh periodicity, the second module group to slide by a fifth displacement based on the first preset motion law, wherein the fourth displacement is equal to h times the third displacement, h is greater than 0 and less than or equal to 1, and the fifth displacement is less than or equal to the fourth displacement.

4. The method according to claim 3, wherein;

when displacement of the first module group at a start moment of the first refresh periodicity is less than or equal to a maximum displacement in the second direction, h is equal to 1; and when the displacement of the first module group at the start moment of the first refresh periodicity is greater than the maximum displacement in the second direction, h is greater than zero and less than 1, wherein the maximum displacement in the second direction is determined based on a position of a first edge module in an opposite direction of the second direction on the first page at a start moment of the first time period.

5. The method according to claim 4, wherein a maximum displacement in the first direction is equal to displacement of the first edge module sliding to a first preset position of a display screen of the electronic device in the second direction.

6. The method according to claim 5, wherein the determining, based on the first displacement of the first module group at the end moment of the first time period, the second displacement of the second module group in the second direction in the second time period after the first time period comprises:

determining a sixth displacement of the first module group in the second direction in the second time period based on the sliding operation; and determining that the second displacement is equal to the sixth displacement plus the first displacement minus a seventh displacement, wherein the seventh displacement is a displacement of the second module group at the end moment of the first time period, wherein from the start moment of the first time period to the end moment of the second time period, displacement of the first module group and the second module group in the second direction is equal to the first displacement plus the sixth displacement.

7. The method according to claim 6, wherein the method further comprises:

controlling, in the second time period, the first module group to slide within the sixth displacement based on the second preset motion law.

8. The method according to claim 7, wherein the second time period successively comprises a third time period and a fourth time period, and the controlling, in the second time period, the second module group to slide within the second displacement based on the second preset motion law comprises:

controlling, in the third time period, the second module group to slide within an eighth displacement based on the first preset motion law, wherein the eighth displacement is equal to the first displacement minus the seventh displacement; and controlling, in the fourth time period, the second module group to slide within the sixth displacement based on the second preset motion law.

9. The method according to claim 1, wherein in the second time period, velocities of the first module group and the second module group in the second direction are greater than or equal to zero, and displacement of the first module group is greater than or equal to displacement of the second module group; the first displacement difference increases from the start moment of the second time period to a first moment of the second time period; the first displacement difference decreases from the first moment to the end moment of the second time period; and the first displacement difference is equal to zero at the end moment of the second time period.

10. The method according to claim 1, wherein from the start moment of the second time period to a second moment of the second time period, displacement of the first module group in the second direction is greater than or equal to displacement of the second module group in the second direction, and the first displacement difference first increases and then decreases to zero; and from the second moment to the end moment of the second time period, displacement of the first module group in the second direction is less than or equal to displacement of the second module group in the second direction, and the first displacement difference first increases and then decreases to zero.

11. The method according to claim 9, wherein the first module group and the second module group stop sliding after the second time period.

12. The method according to claim 6, wherein
the first displacement plus the sixth displacement is greater than the maximum displacement, and the method further comprises:
controlling, in a fifth time period after the second time period, the first module group and the second module group to move by a ninth displacement in the opposite direction of the second direction based on the first preset motion law, wherein in the fifth time period, displacement of the first module group in the second direction is less than displacement of the second module group in the second direction, and the first displacement difference first increases and then decreases to zero; the first module group and the second module group stop sliding after the fifth time period; and the ninth displacement is equal to the first displacement plus the sixth displacement minus the maximum displacement.

13. The method according to claim 12, wherein the controlling, in the fifth time period after the second time period, the first module group and the second module group to move by the ninth displacement in the opposite direction of the second direction based on the first preset motion law comprises:
controlling, at a start moment of the fifth time period, the first module group to start moving by the ninth displacement in the opposite direction of the second direction based on the first preset motion law; and
controlling, at a moment separated by a second time difference from the start moment of the fifth time period, the second module group to start moving by the ninth displacement in the opposite direction of the second direction based on the first preset motion law.

14. The method according to claim 1, wherein the determining, based on the first displacement of the first module group at the end moment of the first time period, the second displacement of the second module group in the second direction in the second time period after the first time period comprises:
determining, based on the first displacement of the first module group at the end moment of the first time period, that the second displacement of the second module group in the second direction in the second time period after the first time period is the first displacement minus a seventh displacement.

15. The method according to claim 14, wherein the first module group stops sliding after the first time period, and the second module group stops sliding after the second time period.

16. The method according to claim 14, wherein;
the first displacement is greater than a maximum displacement, and the method further comprises:
controlling, in a sixth time period after the second time period, the first module group and the second module group to move by a tenth displacement in an opposite direction of the second direction based on the first preset motion law, wherein in the sixth time period, the displacement of the first module group in the second direction is less than the displacement of the second module group in the second direction, and the first displacement difference first increases and then decreases to zero; and the first module group and the second module group stop sliding after the sixth time period.

17. The method according to claim 1, wherein the method further comprises:
controlling, by the electronic device in the first time period in response to the sliding operation based on the displacement of the first module group, a third module group to slide in the second direction based on the first preset motion law, wherein
the third module group comprises at least one module other than the first module group and the second module group on the first page, and the third module group is determined by the electronic device based on a position relationship between a module in the third module group and the first module; and the displacement of the second module group is greater than or equal to displacement of the third module group in the first time period, and a second displacement difference between the second module group and the third module group is greater than zero at the end moment of the first time period;
determining, based on the first displacement of the first module group at the end moment of the first time period, a twelfth displacement of the third module group in the second direction in the second time period after the first time period; and
controlling, in the second time period, the third module group to slide within the twelfth displacement based on the second preset motion law, wherein the second displacement difference decreases at the end moment of the second time period compared with the start moment of the second time period.

18. The method according to claim 17, wherein the controlling, by the electronic device in the first time period based on the displacement of the first module group, the third module group to slide in the second direction based on the first preset motion law comprises:
controlling, by the electronic device in the first time period based on the displacement of the first module group, the third module group to start sliding in the second direction based on the first preset motion law at a moment separated by a third time difference from the start moment of the first time period, wherein the third time difference is greater than the first time difference.

19. An electronic device, comprising a touchscreen, a non-transitory memory, one or more processors, a plurality of application programs, and one or more programs, wherein the one or more programs are stored in the non-transitory memory; and when the one or more processors execute the one or more programs, the electronic device is enabled to implement the method according to claim 1.

20. A non-transitory computer storage medium, comprising computer instructions, wherein when the computer instructions are run on an electronic device, the electronic device is enabled to perform the method according to claim 1.

* * * * *